United States Patent
Yamada

(10) Patent No.: US 10,183,516 B2
(45) Date of Patent: Jan. 22, 2019

(54) INFORMATION PROCESSING APPARATUS, COMMUNICATIONS SYSTEM, AND COMMUNICATIONS METHOD

(71) Applicant: Tsuyoshi Yamada, Kanagawa (JP)

(72) Inventor: Tsuyoshi Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 11 days.

(21) Appl. No.: 15/546,761

(22) PCT Filed: Feb. 23, 2016

(86) PCT No.: PCT/JP2016/000954
§ 371 (c)(1),
(2) Date: Jul. 27, 2017

(87) PCT Pub. No.: WO2016/136238
PCT Pub. Date: Sep. 1, 2016

(65) Prior Publication Data
US 2018/0015755 A1    Jan. 18, 2018

(30) Foreign Application Priority Data

Feb. 25, 2015 (JP) ................................. 2015-035826
Jan. 29, 2016 (JP) ................................. 2016-015931

(51) Int. Cl.
*G06F 3/12* (2006.01)
*G06K 15/02* (2006.01)
(Continued)

(52) U.S. Cl.
CPC ............. *B41J 29/393* (2013.01); *B41J 29/00* (2013.01); *B41J 29/38* (2013.01); *G06F 3/1222* (2013.01);
(Continued)

(58) Field of Classification Search
None
See application file for complete search history.

(56) References Cited

U.S. PATENT DOCUMENTS

| 6,600,930 B1* | 7/2003 | Sakurai | H04L 51/38 |
| | | | 455/414.3 |
| 7,916,707 B2* | 3/2011 | Fontaine | H04W 8/183 |
| | | | 370/328 |

(Continued)

FOREIGN PATENT DOCUMENTS

| JP | 2011-035457 | 2/2011 |
| JP | 5121212 | 1/2013 |
| JP | 2016-027454 | 2/2016 |

OTHER PUBLICATIONS

International Search Report dated May 10, 2016 in PCT/JP2016/000954 filed on Feb. 23, 2016.

*Primary Examiner* — Beniyam Menberu
(74) *Attorney, Agent, or Firm* — IPUSA, PLLC

(57) ABSTRACT

An information processing apparatus receiving a process request from a terminal via networks includes a storage to store first communications information for connecting via a first network and second communications information for connecting via a second network, an identification information receiver to receive identification information from the terminal, the identification information identifying a user of the terminal, a determination unit to determine the first or second network based on the identification information to receive the process request from the terminal, a communications information transmitter to transmit the first or second communications information via the determined first or second network, and a request receiver to accept connection via the determined first or second network based on the transmitted communications information transmitted by the communications information transmitter from the terminal (Continued)

to receive the process request via the accepted the first or second network.

15 Claims, 24 Drawing Sheets

(51) Int. Cl.
  *H04N 1/00* (2006.01)
  *H04W 12/06* (2009.01)
  *H04W 4/80* (2018.01)
  *H04W 76/10* (2018.01)
  *B41J 29/393* (2006.01)
  *B41J 29/00* (2006.01)
  *B41J 29/38* (2006.01)

(52) U.S. Cl.
  CPC .......... *G06F 3/1236* (2013.01); *G06F 3/1292* (2013.01); *H04N 1/00* (2013.01); *H04W 4/80* (2018.02); *H04W 12/06* (2013.01); *B41J 2029/3937* (2013.01); *H04W 76/10* (2018.02)

(56) References Cited

U.S. PATENT DOCUMENTS

| | | | | |
|---|---|---|---|---|
| 8,139,564 B1* | 3/2012 | Weaver | ............... | H04L 29/1216 370/352 |
| 8,335,489 B2 | 12/2012 | Hamada | | |
| 8,655,993 B1* | 2/2014 | Mixter | ............... | H04L 63/126 709/220 |
| 8,799,989 B1* | 8/2014 | Liu | ............... | H04L 63/20 709/219 |
| 9,730,269 B2* | 8/2017 | Iyer | ............... | H04W 84/12 |
| 2005/0238033 A1* | 10/2005 | Sakamoto | ............... | H04L 67/2823 370/401 |
| 2006/0064589 A1* | 3/2006 | Taniguchi | ............... | H04L 29/12009 713/170 |
| 2006/0117104 A1* | 6/2006 | Taniguchi | ............... | H04L 63/0272 709/225 |
| 2009/0034731 A1* | 2/2009 | Oshima | ............... | G06F 21/608 380/270 |
| 2011/0119745 A1* | 5/2011 | Bremner | ............... | H04L 63/0853 726/7 |
| 2013/0063759 A1* | 3/2013 | Kutoh | ............... | H04N 1/4406 358/1.14 |
| 2013/0201979 A1* | 8/2013 | Iyer | ............... | H04W 84/12 370/338 |
| 2013/0260683 A1* | 10/2013 | Suzuki | ............... | H04W 4/008 455/41.1 |
| 2013/0309968 A1 | 11/2013 | Suzuki | | |
| 2014/0115663 A1* | 4/2014 | Fujishima | ............... | H04L 63/1408 726/3 |
| 2014/0359738 A1* | 12/2014 | Nakajima | ............... | H04L 63/08 726/7 |
| 2015/0082222 A1 | 3/2015 | Yamada | | |
| 2017/0099570 A1 | 4/2017 | Yamada | | |

* cited by examiner

[Fig. 1A]
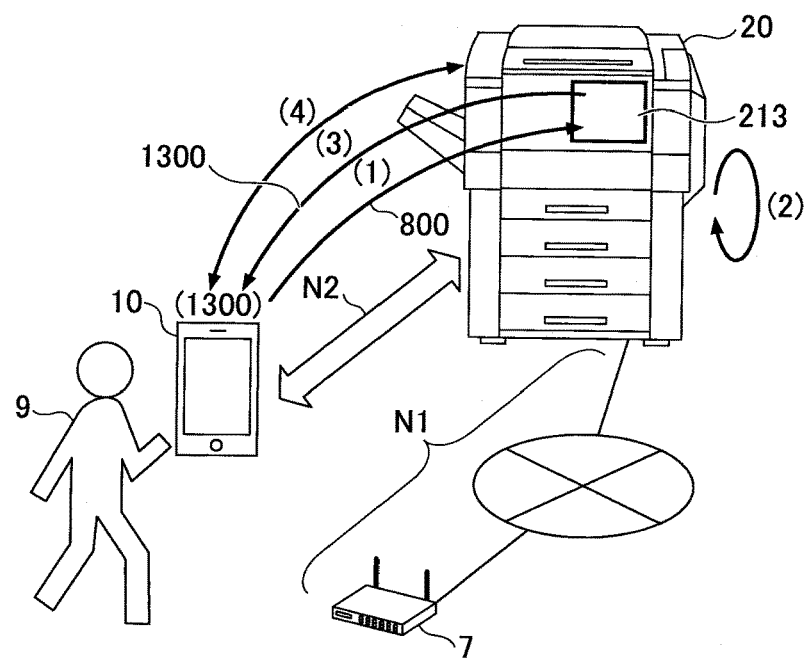
[Fig. 1B]
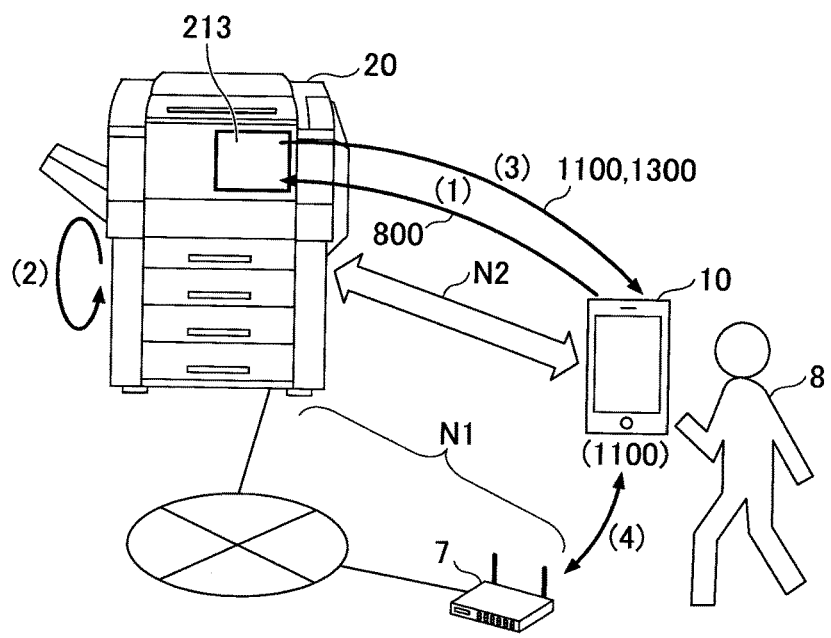

[Fig. 2]
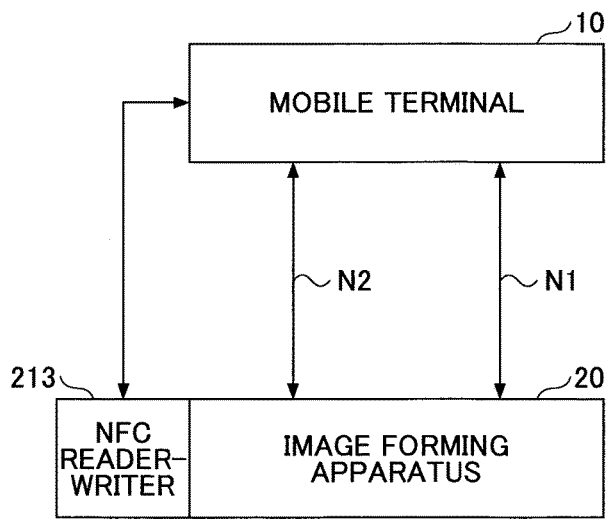
[Fig. 3]
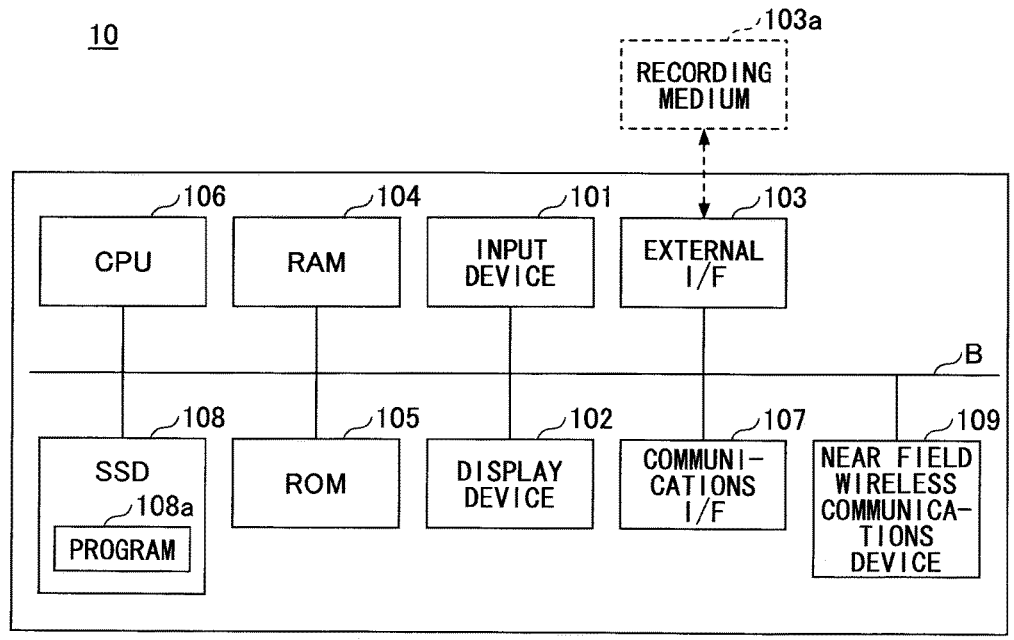

[Fig. 4]
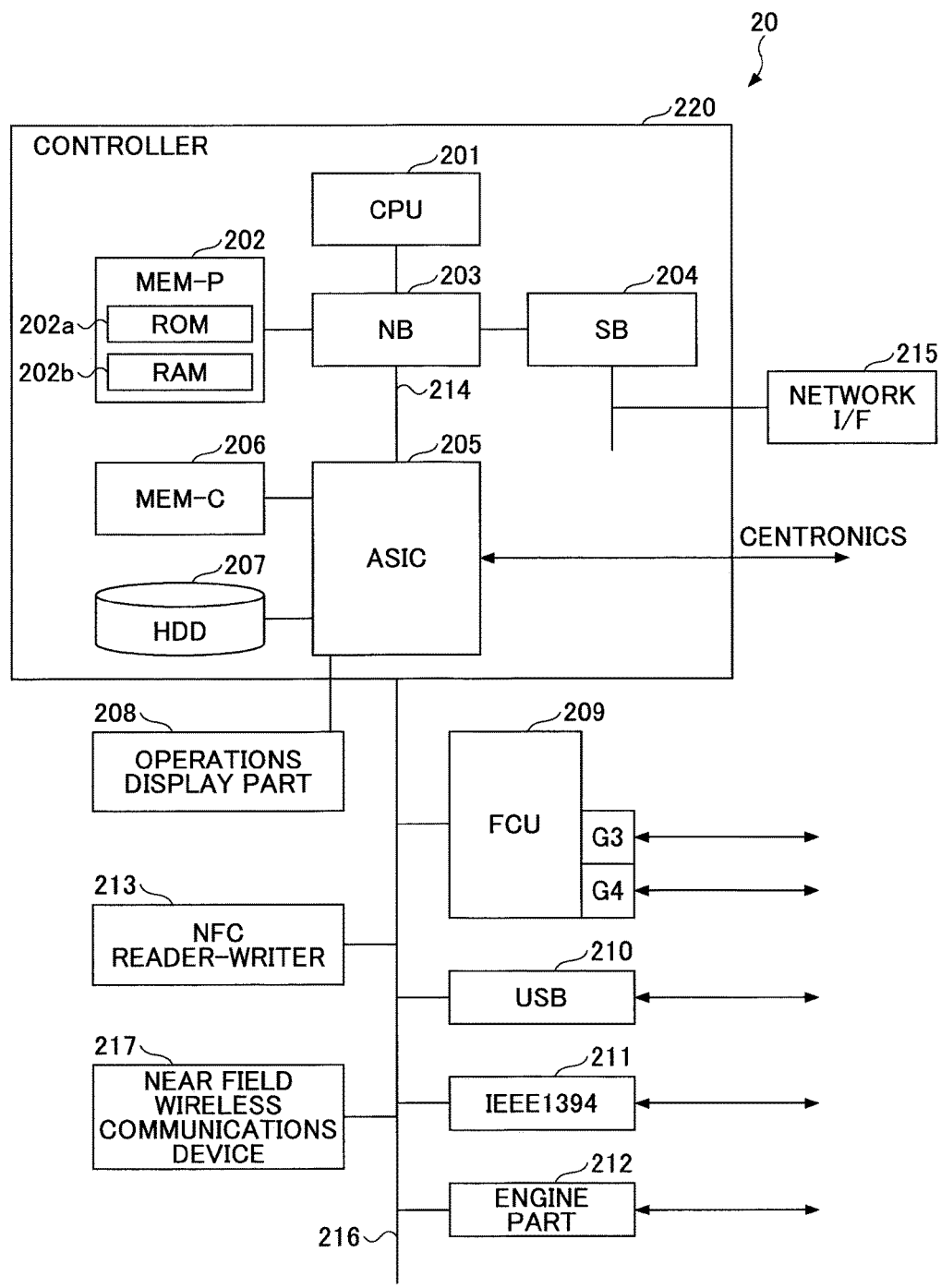

[Fig. 5]
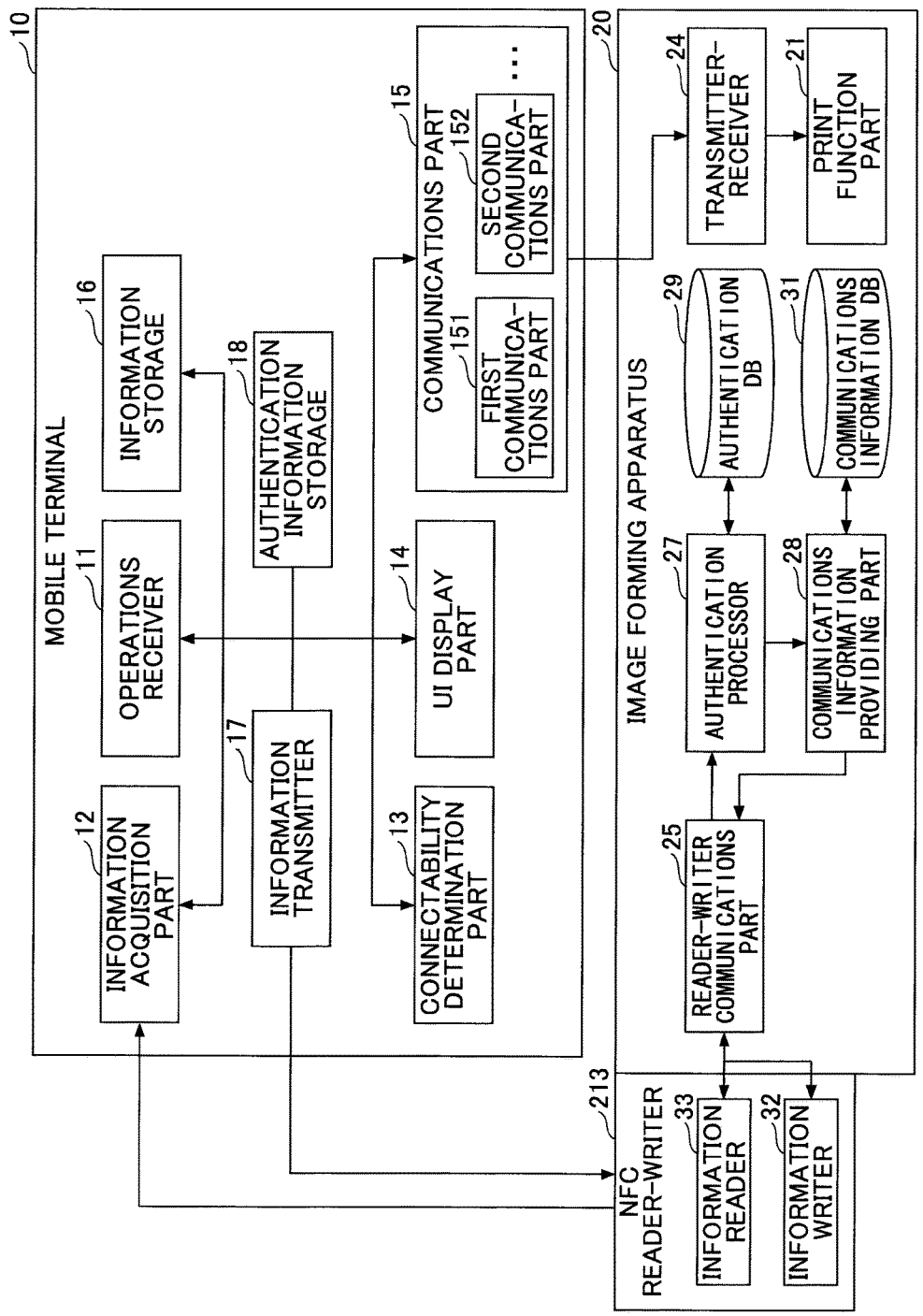

[Fig. 6]
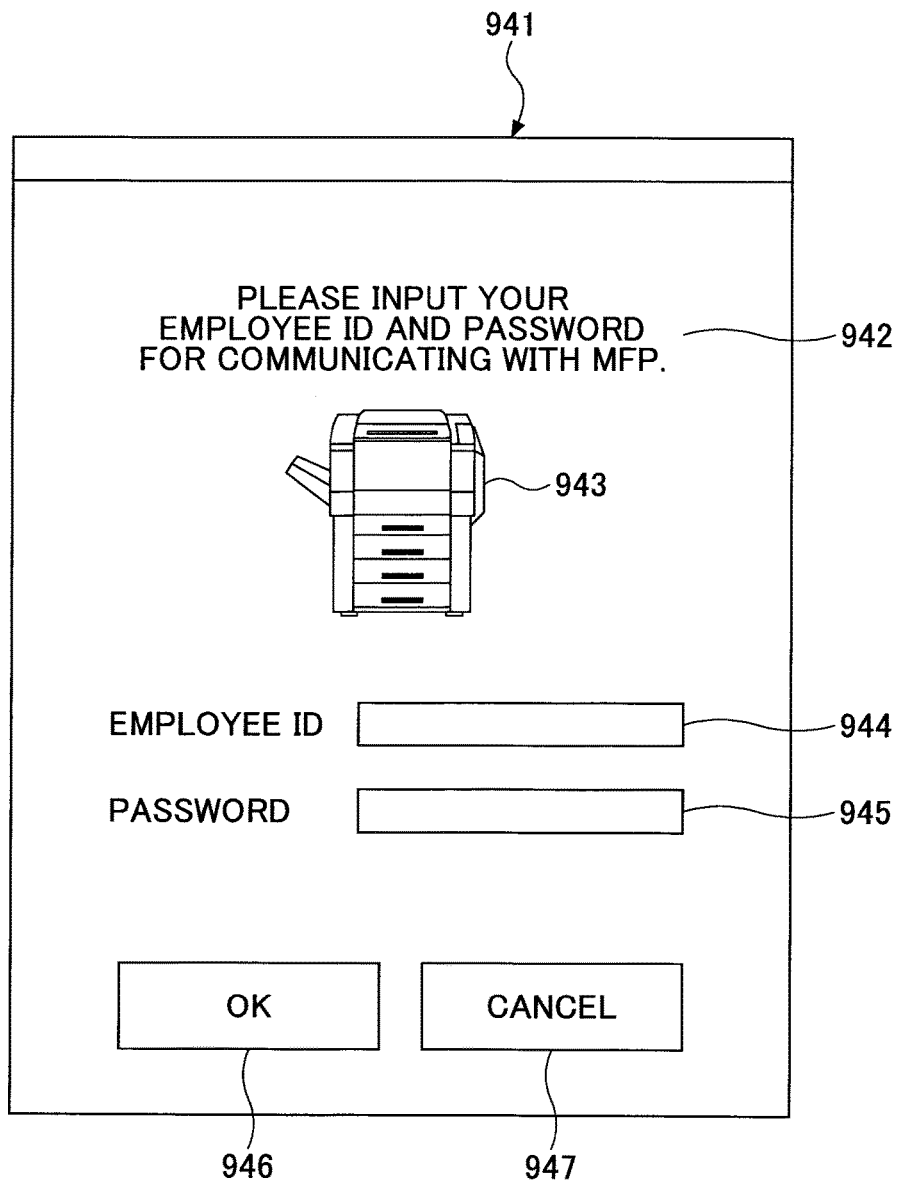

[Fig. 7]
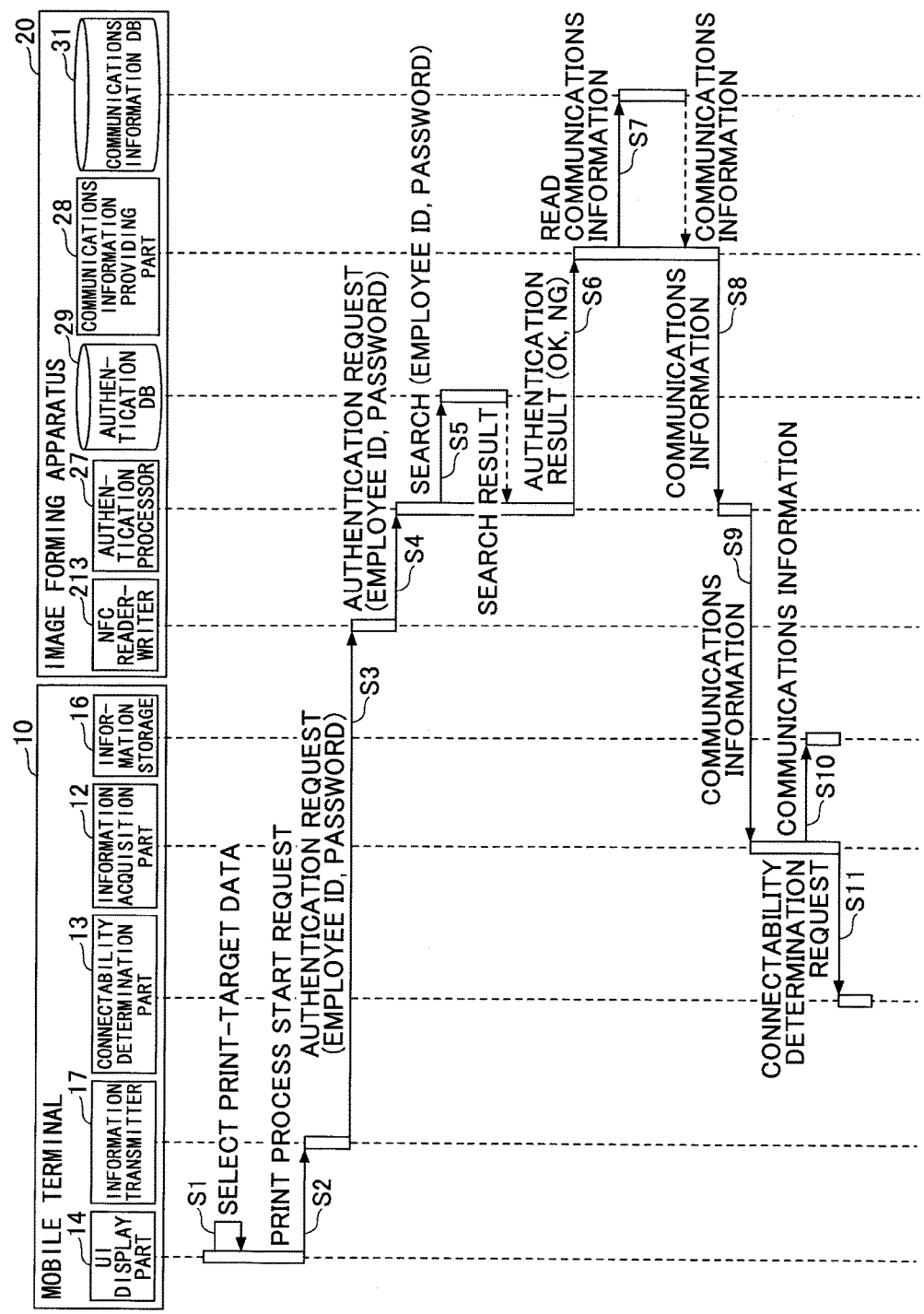

[Fig. 8]
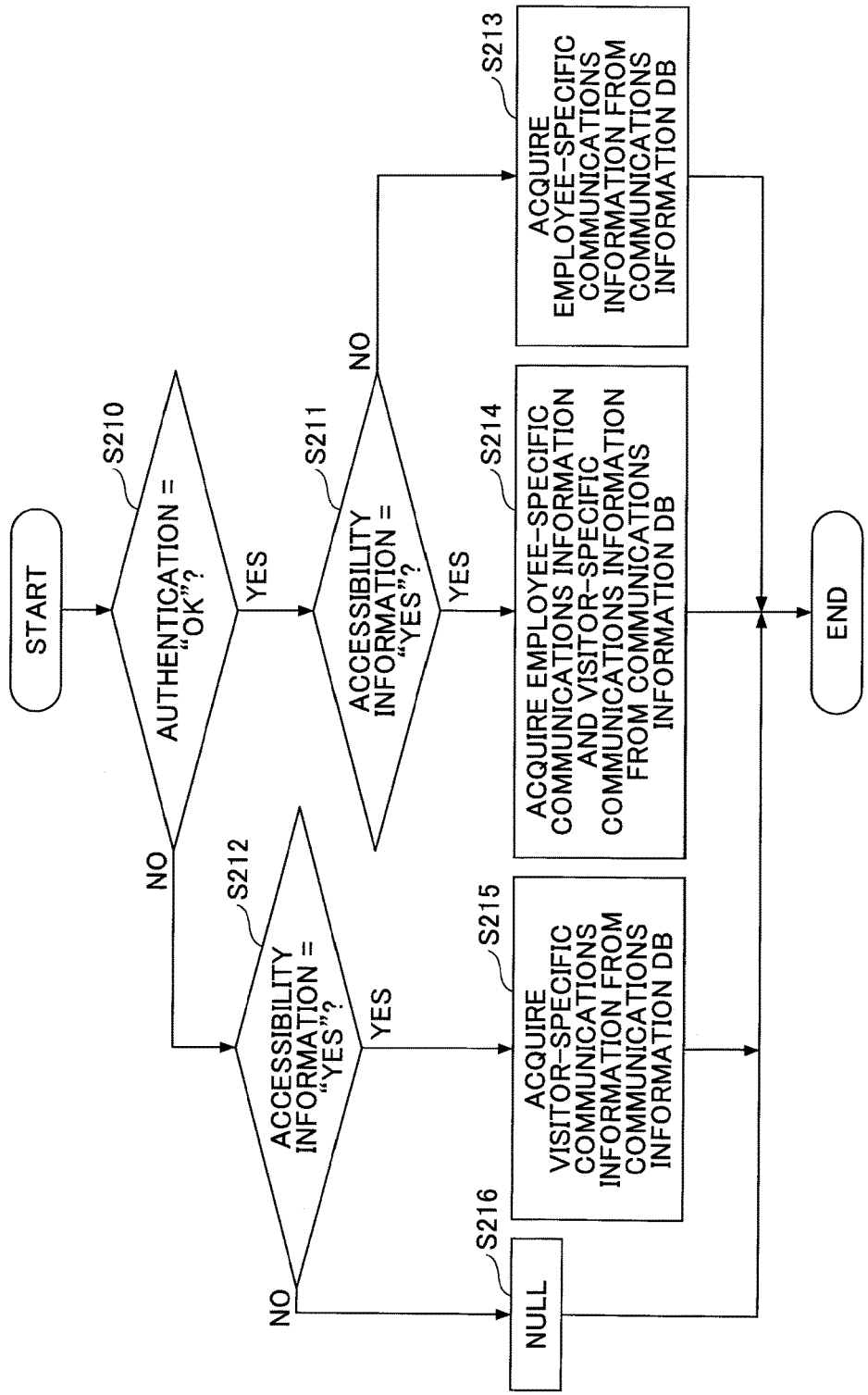

[Fig. 9]
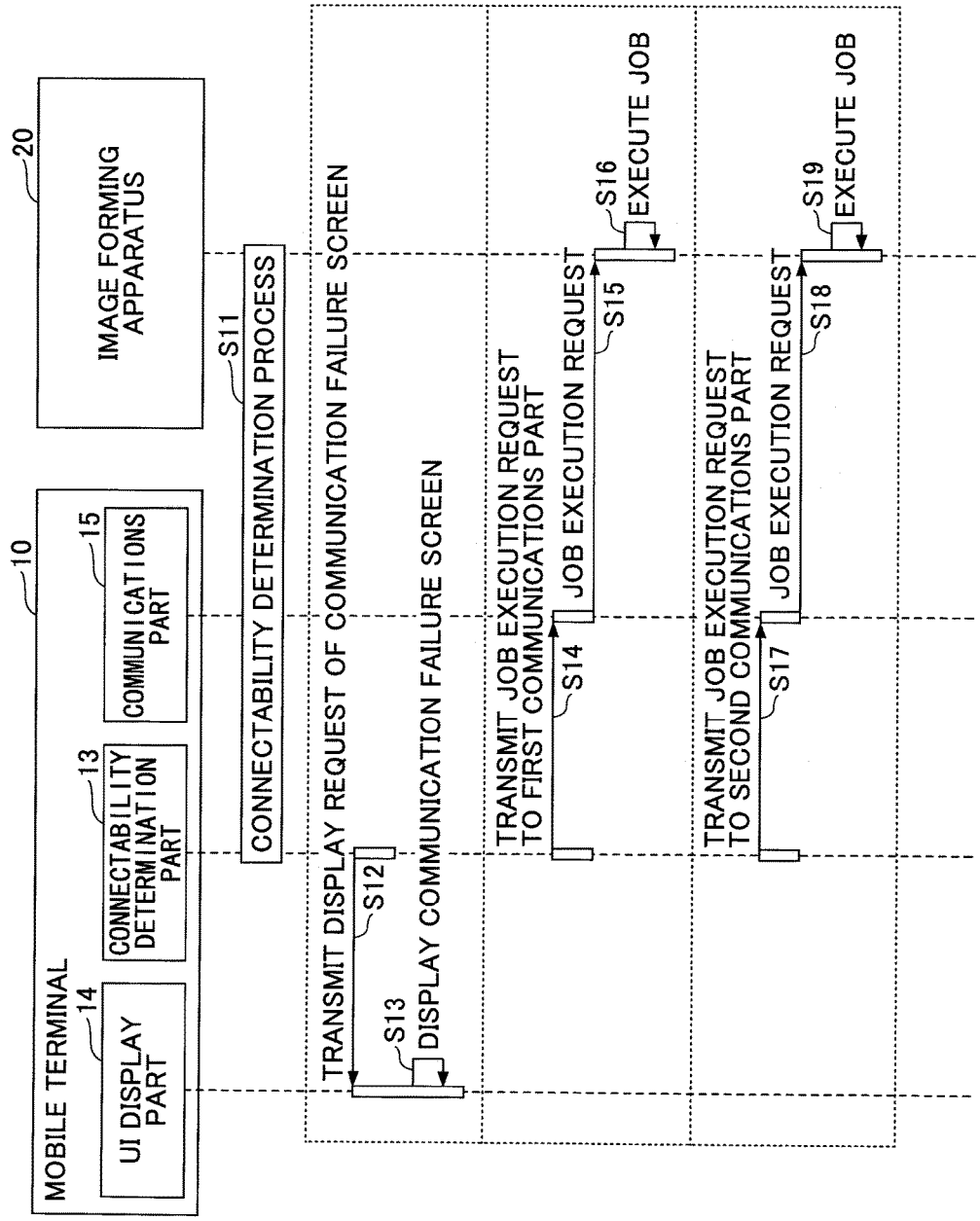

[Fig. 10]
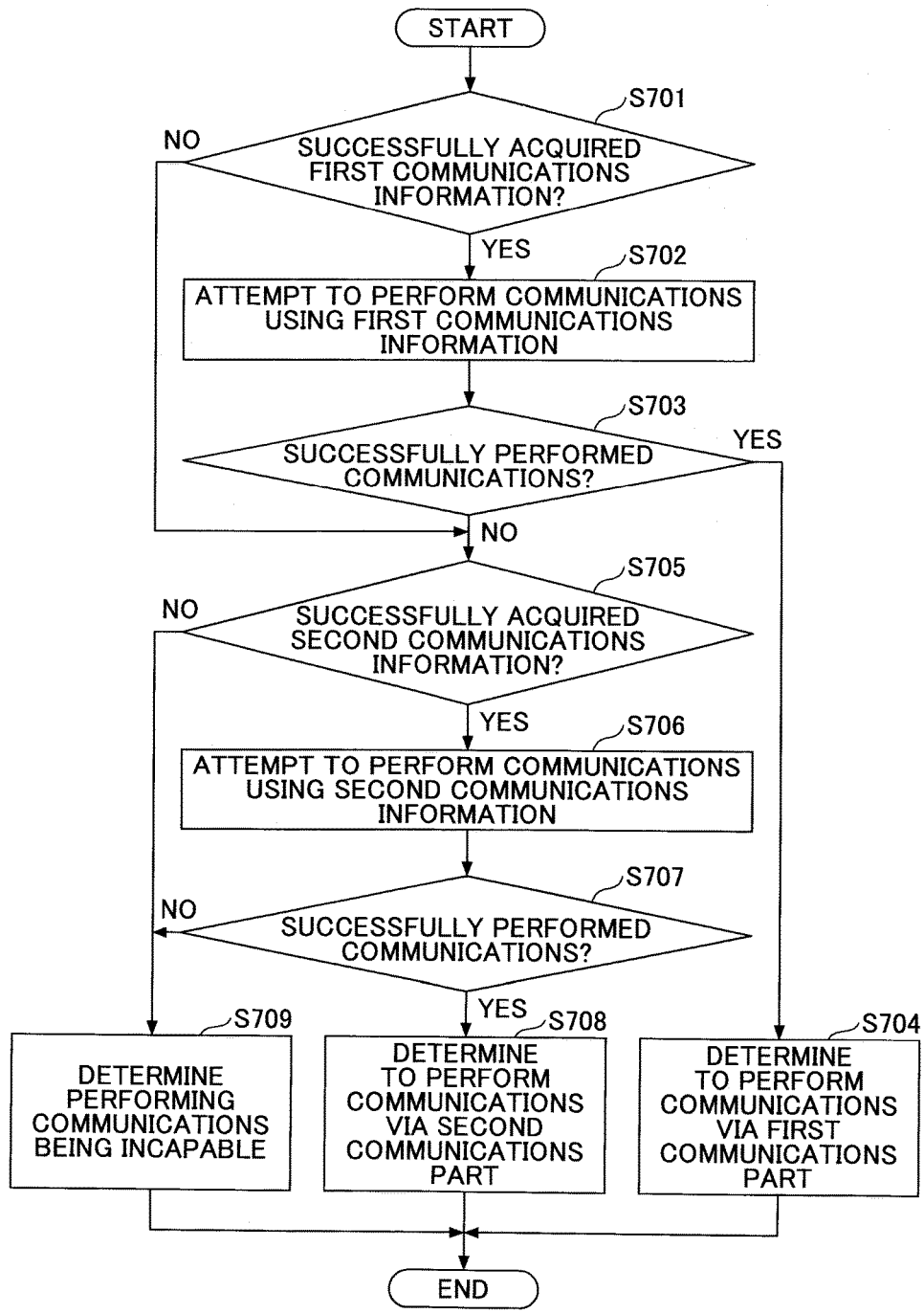

[Fig. 11A]
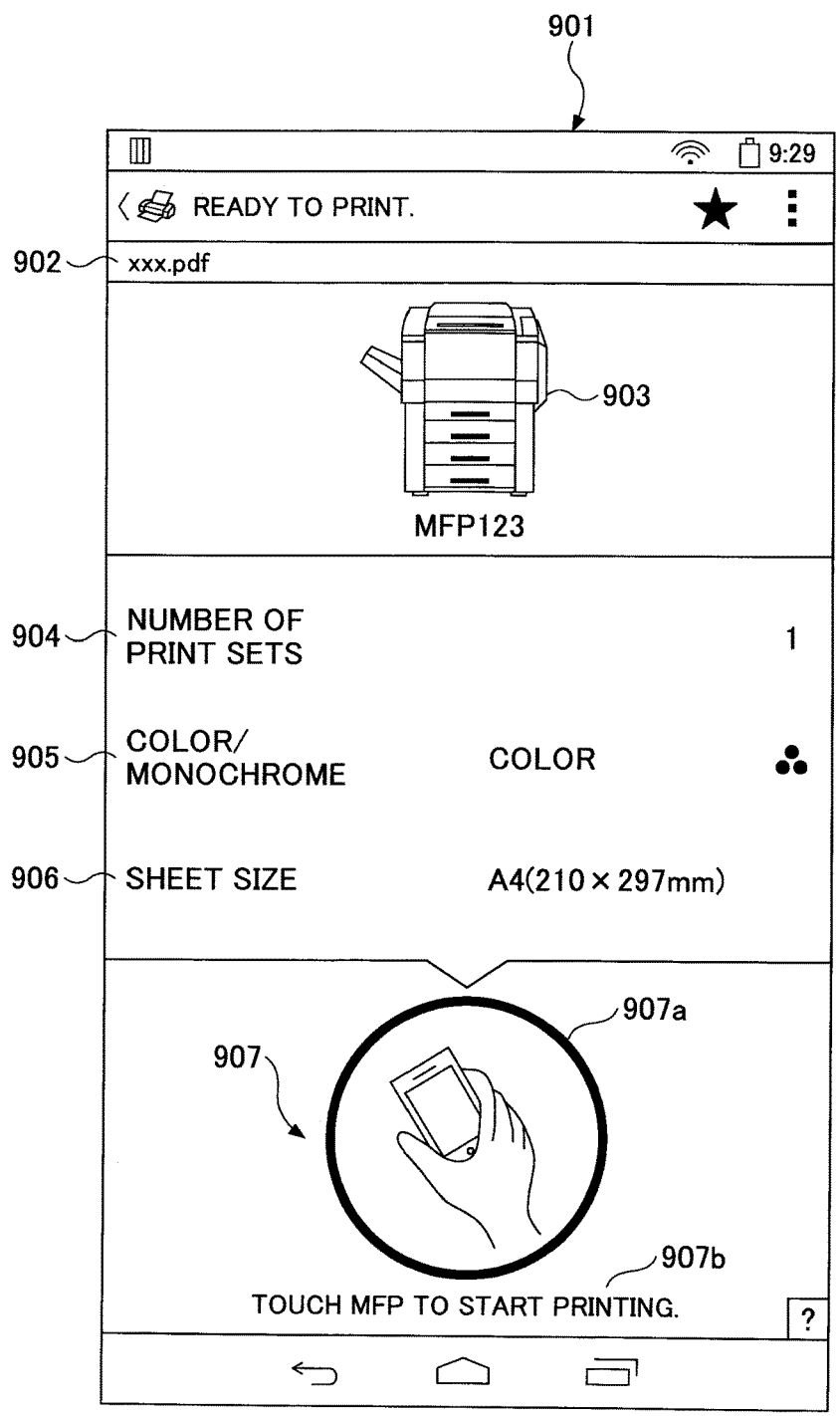

[Fig. 11B]
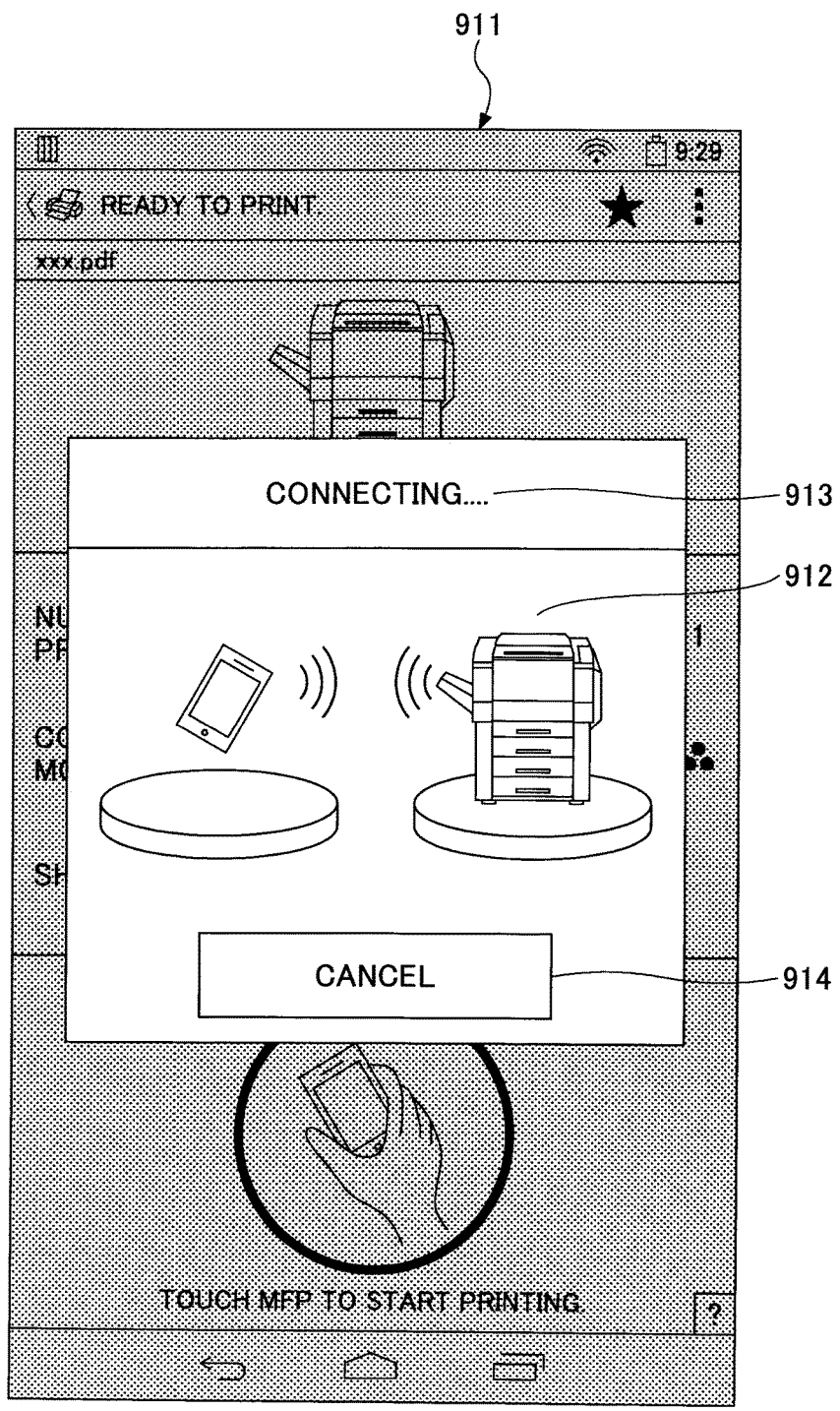

[Fig. 12A]
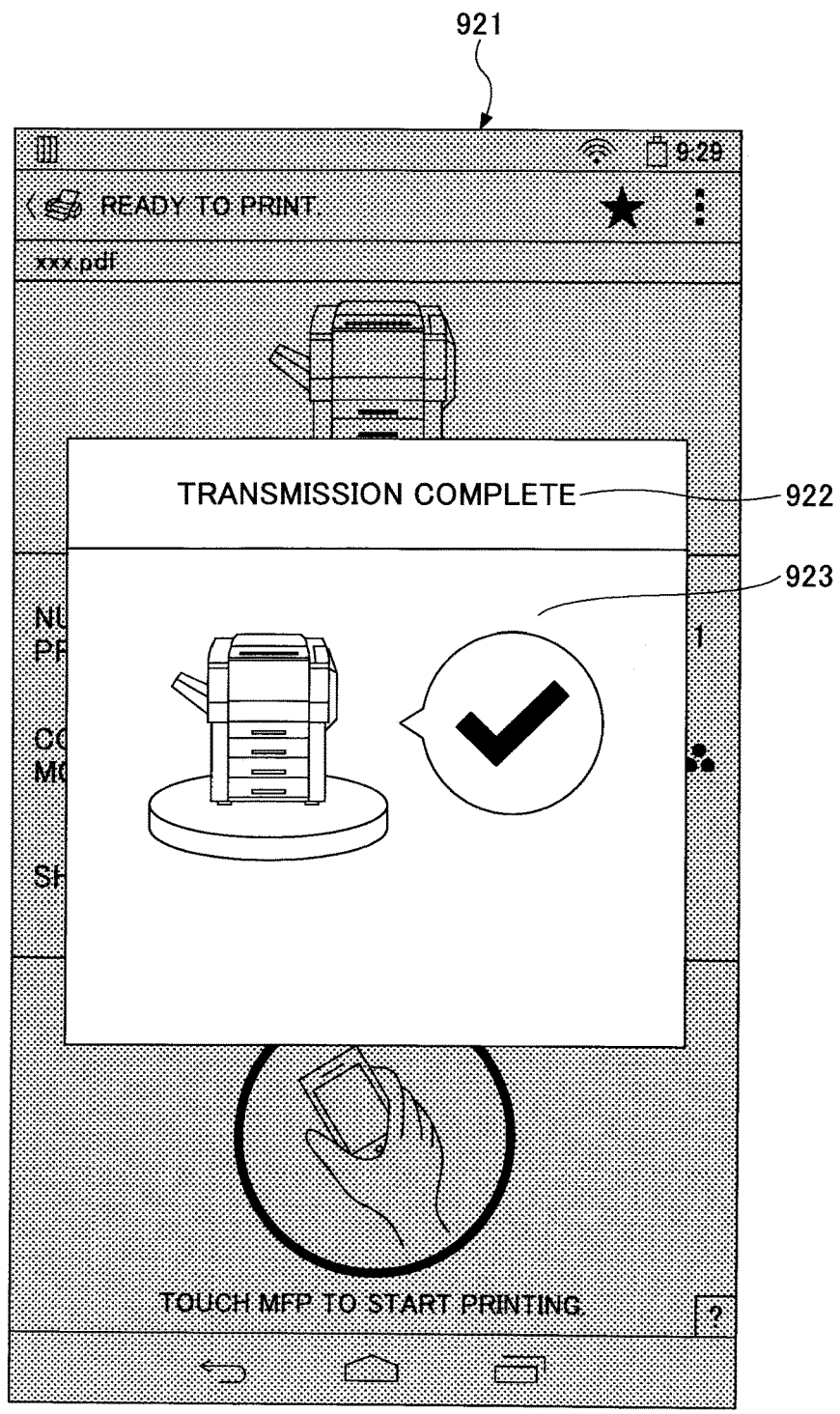

[Fig. 12B]
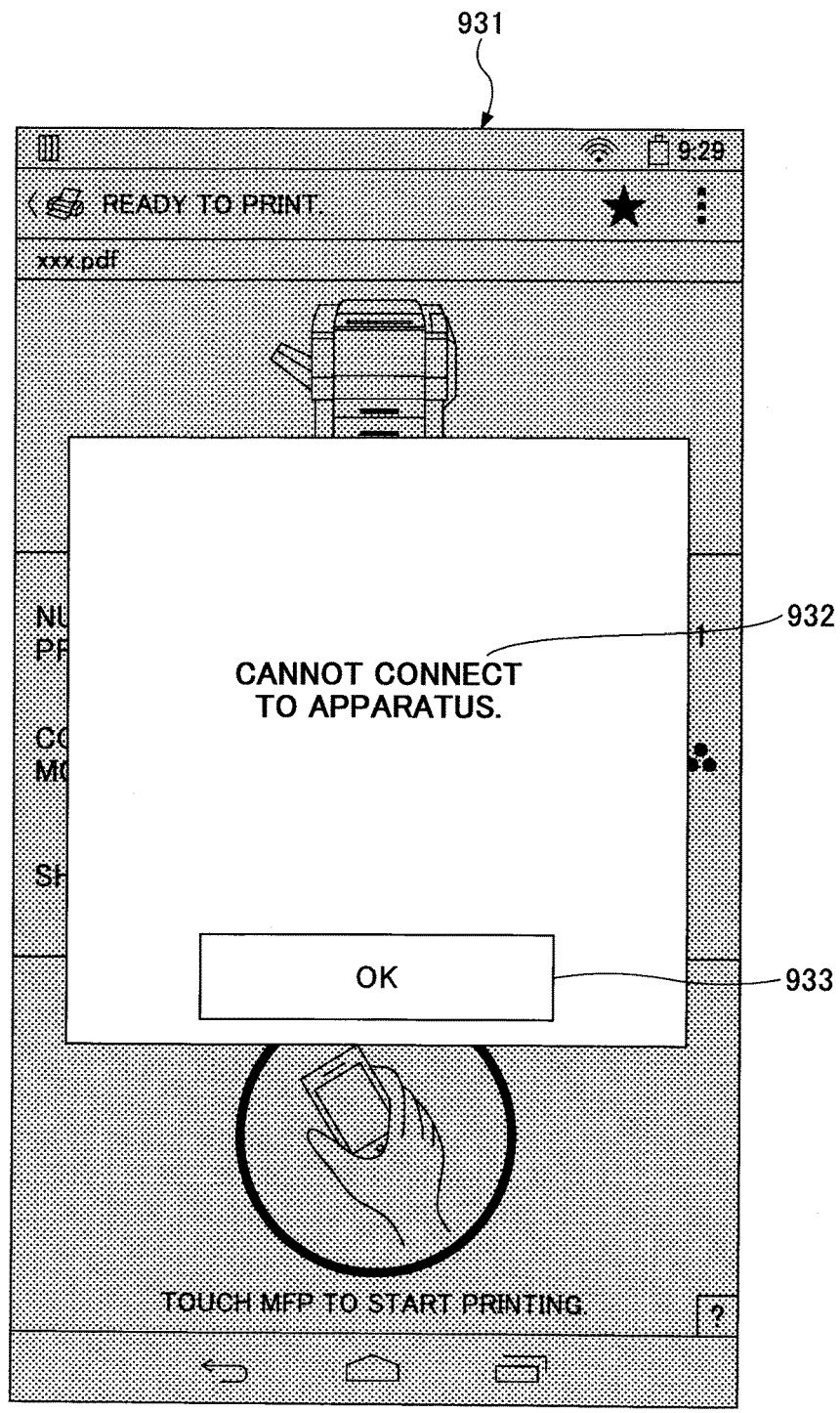

[Fig. 13]
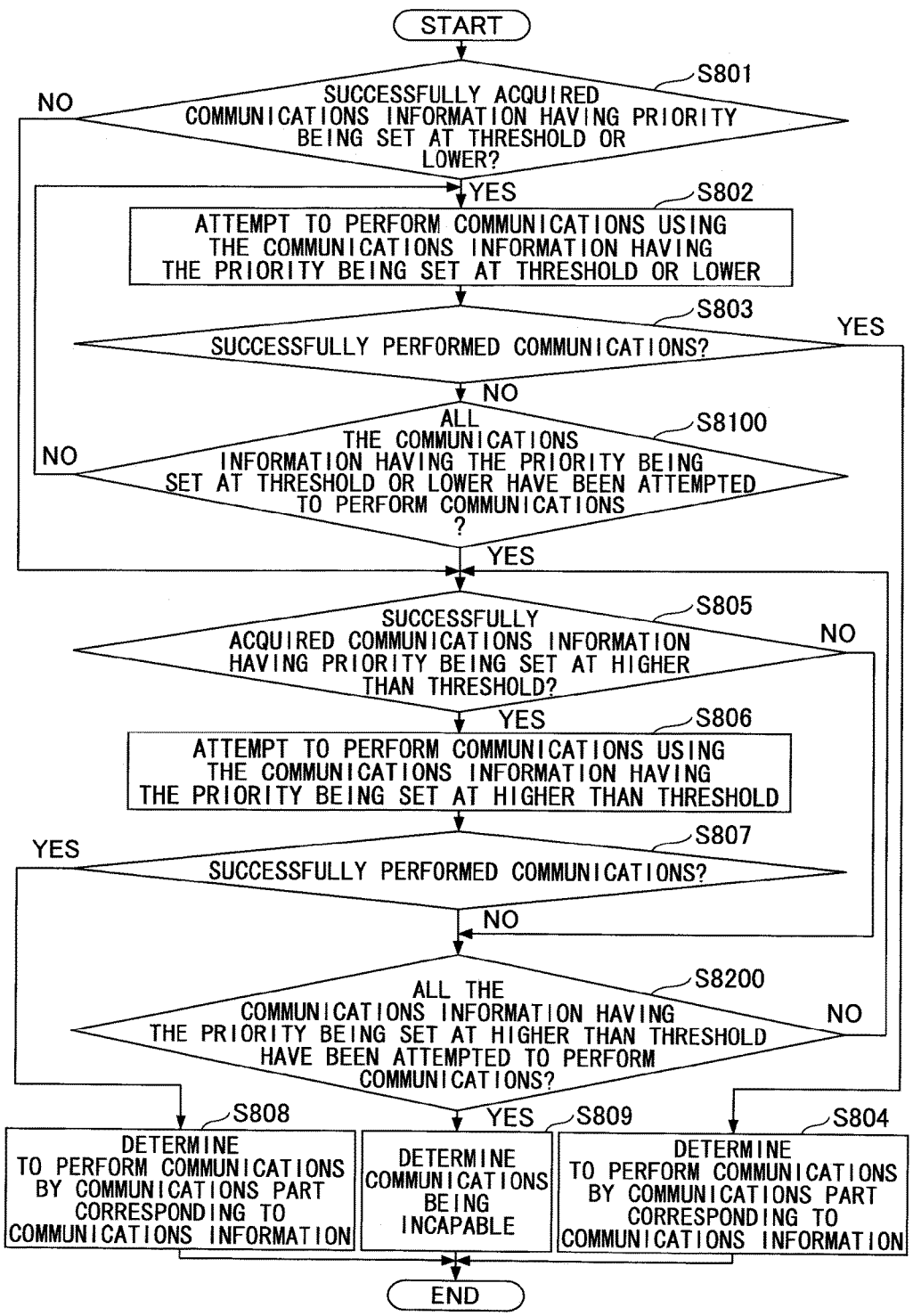

[Fig. 14]
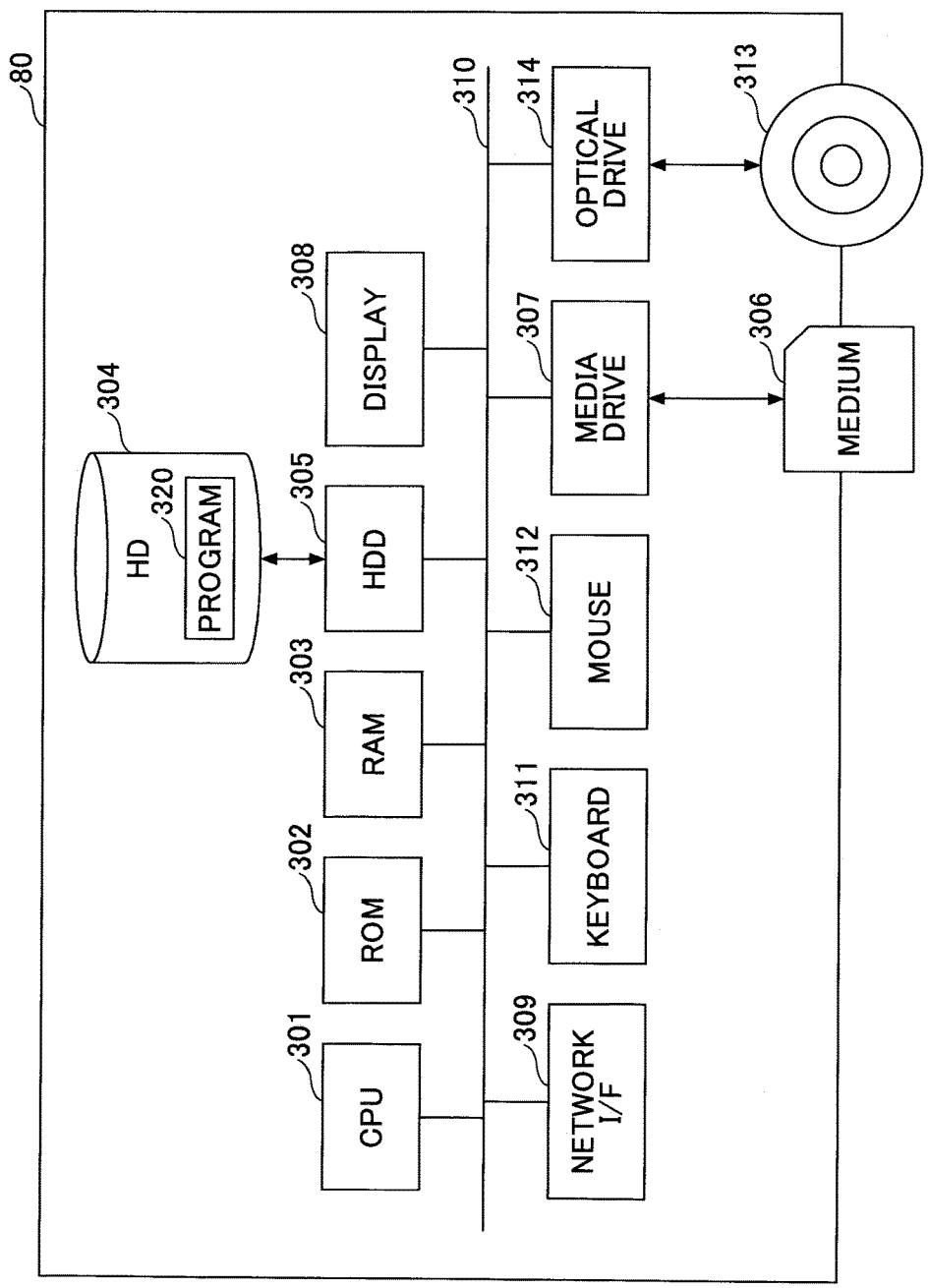

[Fig. 15]
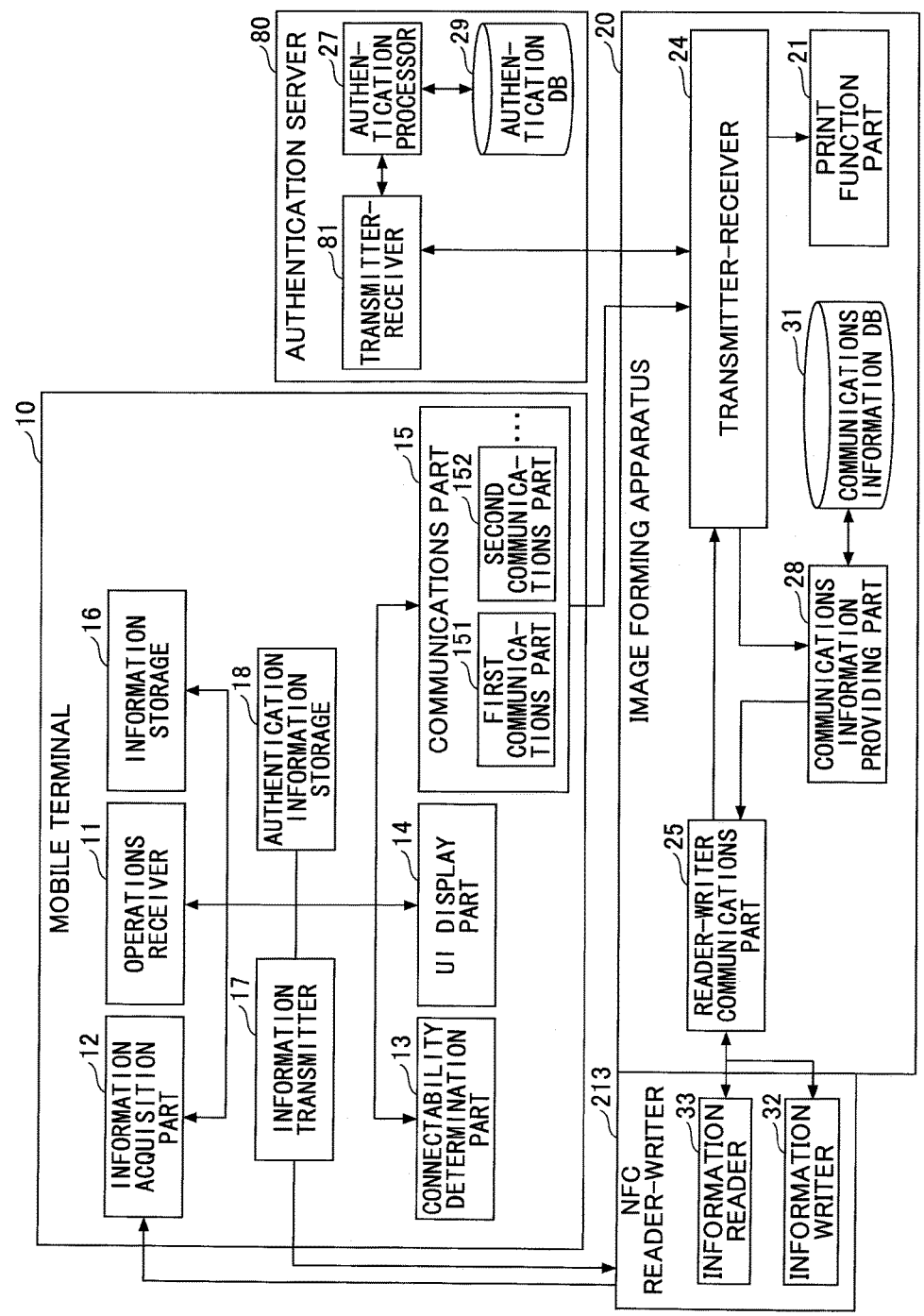

[Fig. 16]
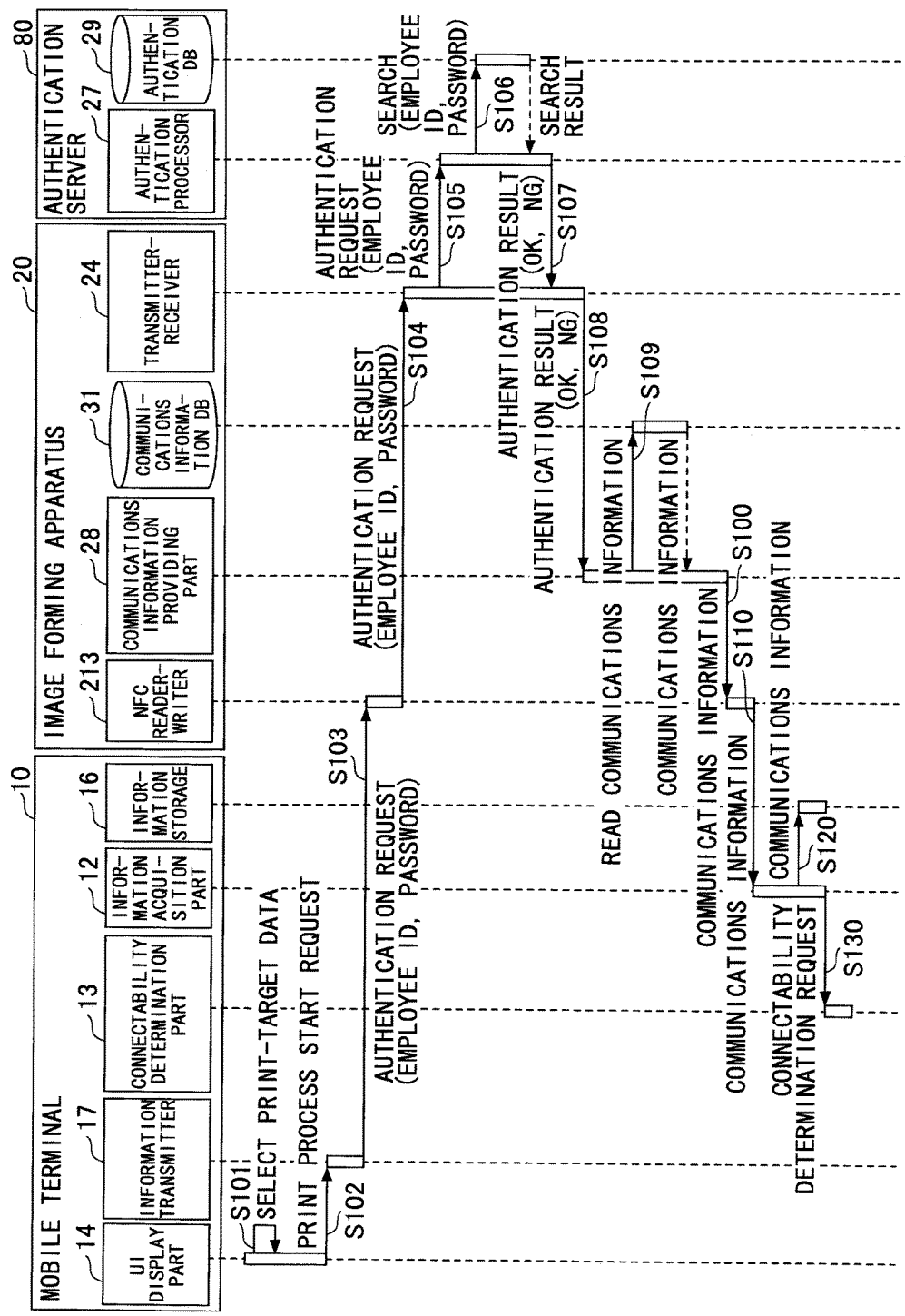

[Fig. 17]
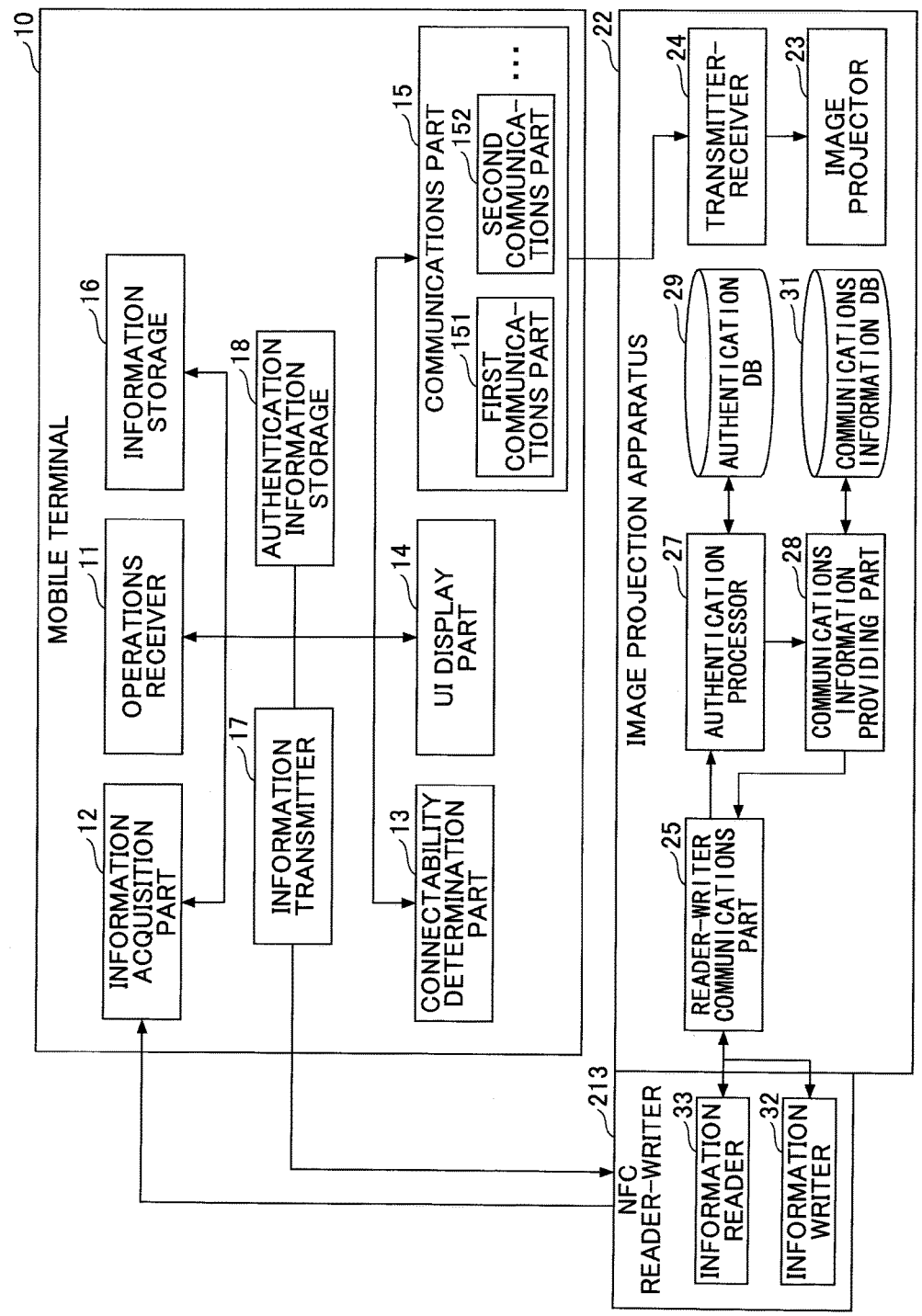

[Fig. 18]
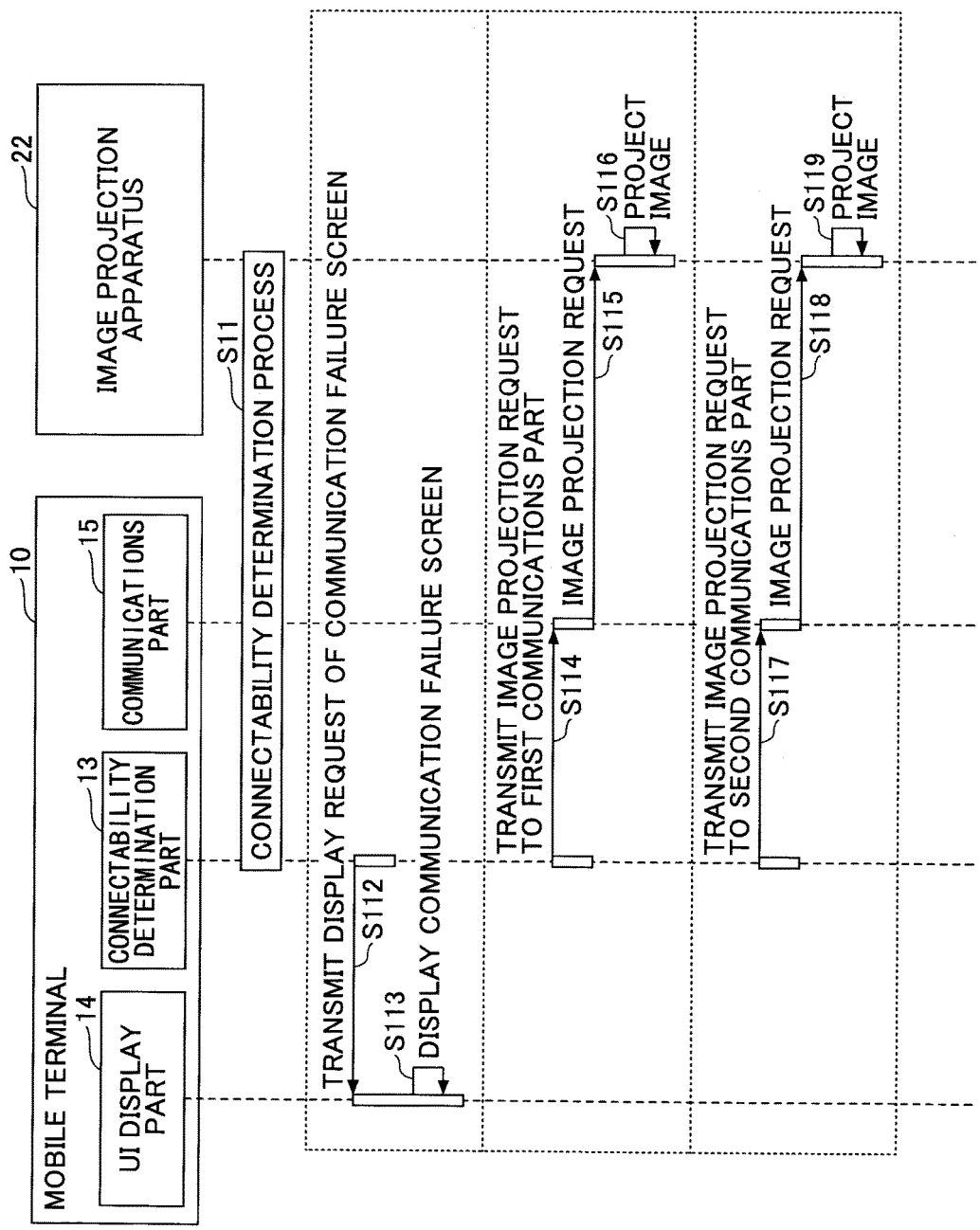

[Fig. 19]
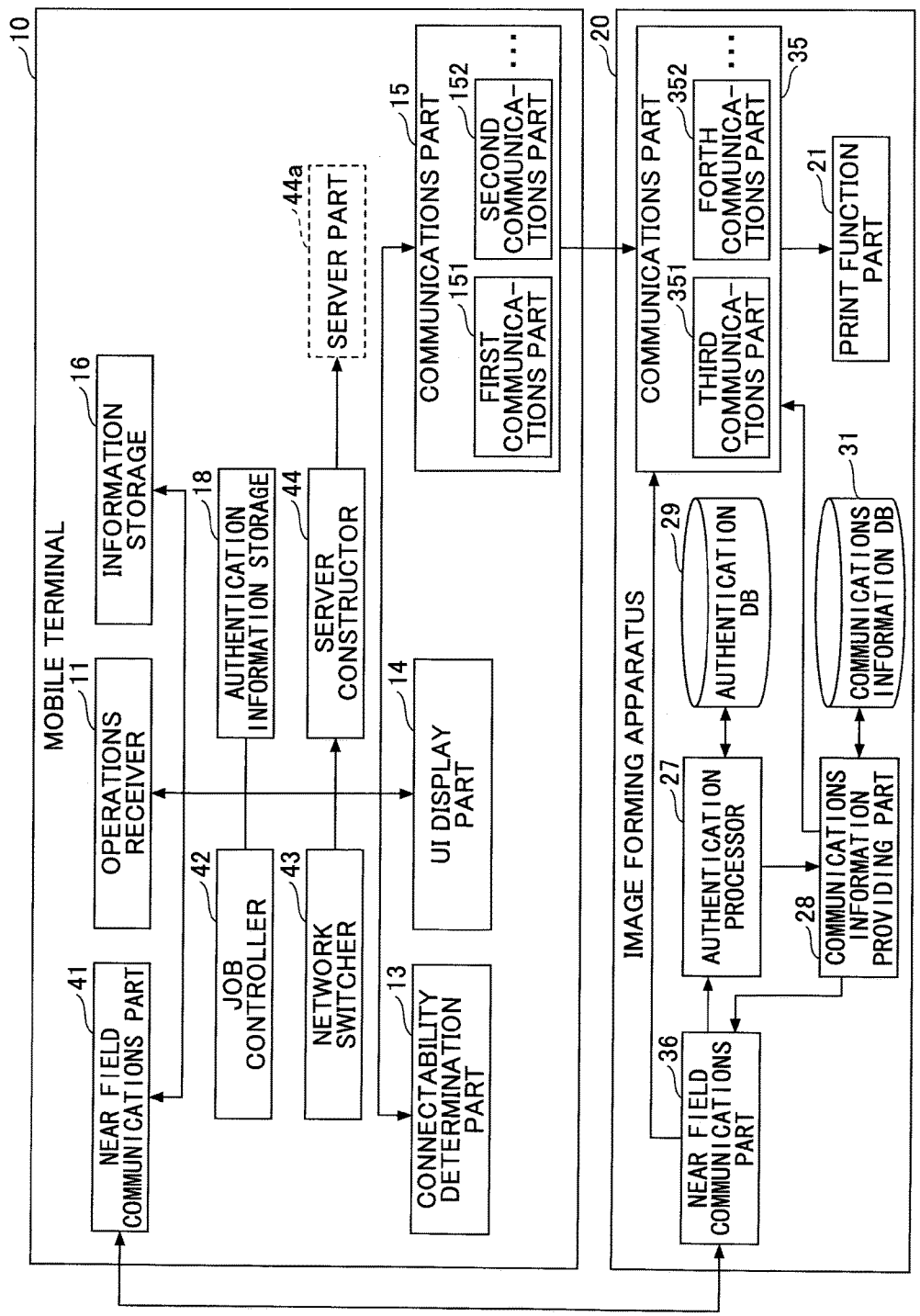

[Fig. 20]
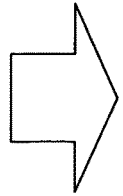
URL INFORMATION
<MOBILE TERMINAL IP ADDRESS><PORT NUMBER><ONE-TIME PASSWORD>
ex. <10.60.100.101><50000><ABCDEFGH>
http://MOBILE TERMINAL IP ADDRESS: PORT NUMBER/ONE-TIME PASSWORD
ex. http://10.60.100.101:50000/ABCDEFGH

[Fig. 21]
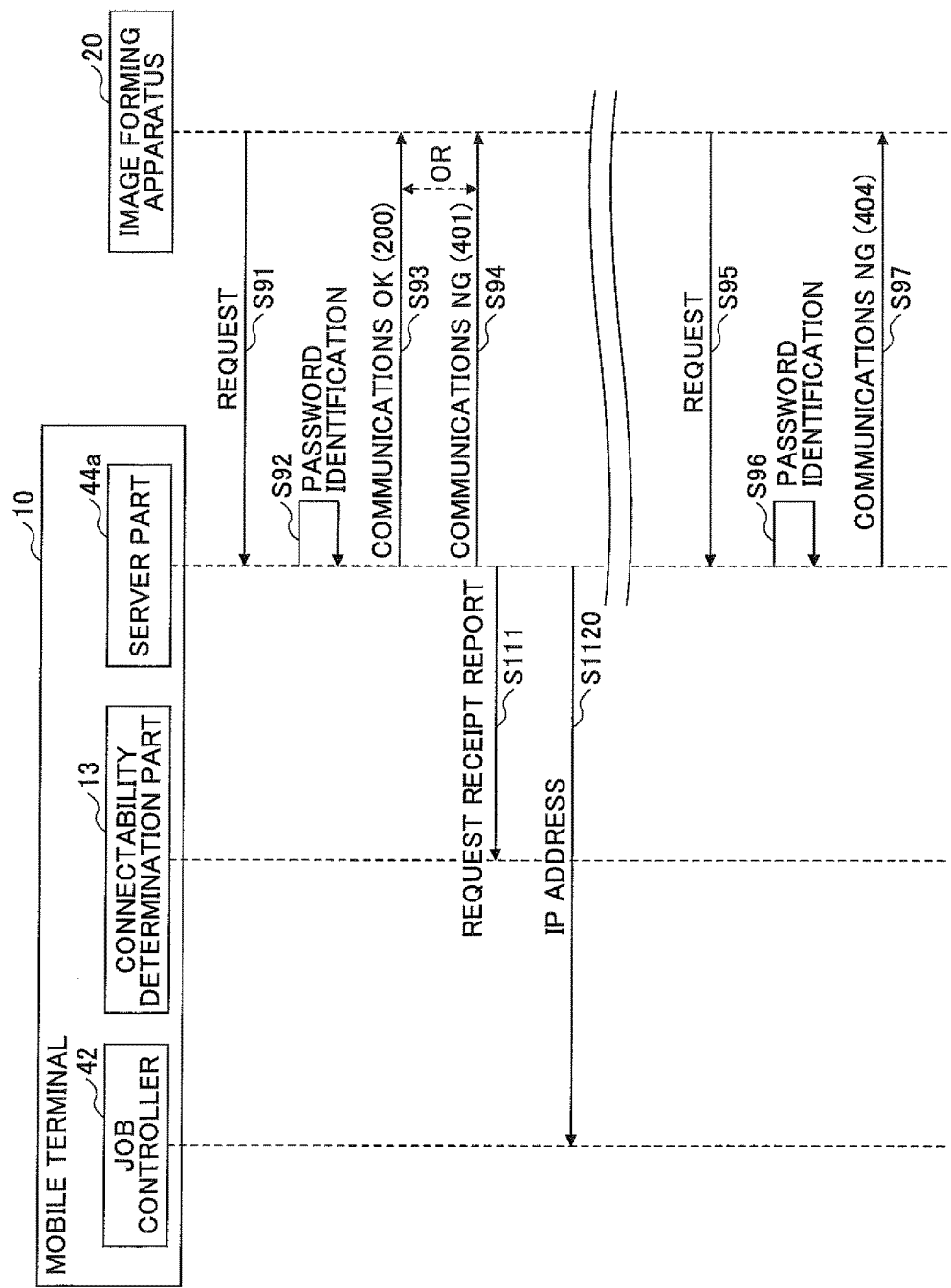

[Fig. 22]
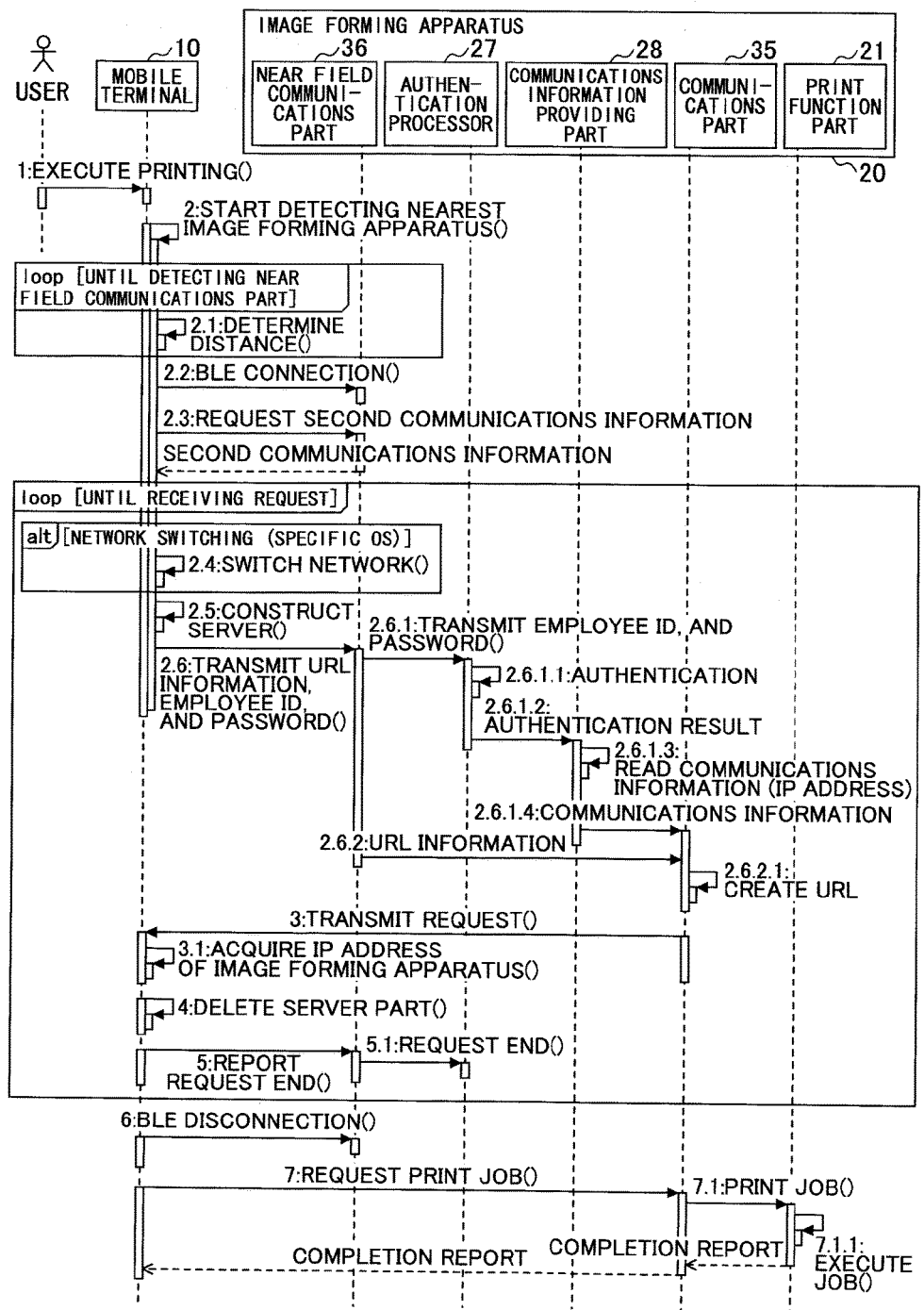

[Fig. 23]
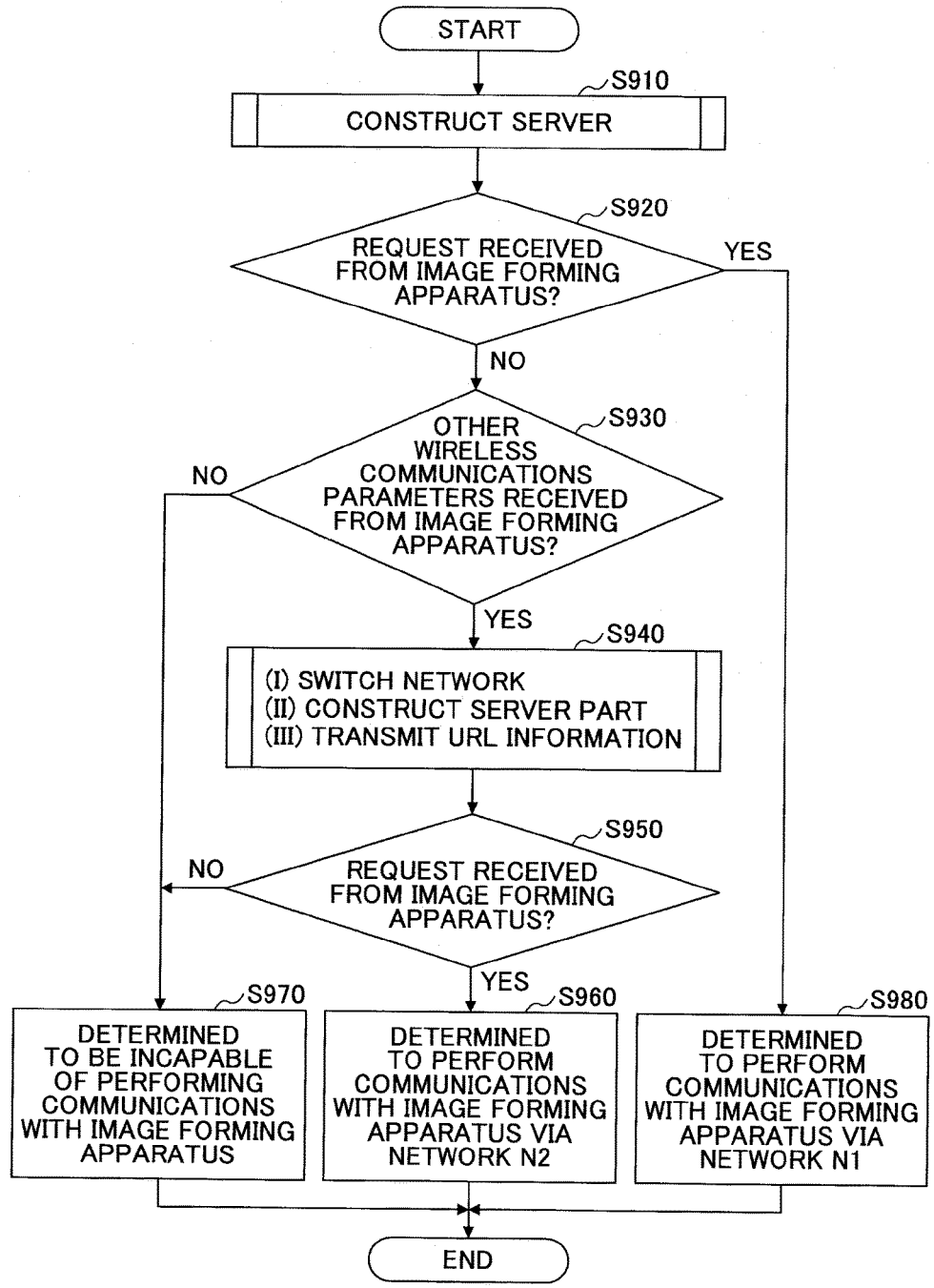

INFORMATION PROCESSING APPARATUS, COMMUNICATIONS SYSTEM, AND COMMUNICATIONS METHOD

TECHNICAL FIELD

The disclosures discussed herein relate to an information processing apparatus, a communications system, and a communications method.

BACKGROUND ART

Wireless communications technologies typically allow users' terminals to directly access other apparatuses such as image forming apparatuses to operate their functions without wired connections, which much improves convenience of users of the terminals. Allowing users' terminals to perform wireless communications with apparatuses may often require parameter settings, which generally needs to be set by the users of the terminals; however, such settings are not always easy for the users of the terminals to set.

Related art technologies propose technologies require minimizing such users settings or even require no users settings for setting the wireless communications parameters in the users' terminals (e.g., Patent Document 1). Patent Document 1, for example, discloses a technology for allowing wireless communications devices to connect to the same apparatus using different wireless communications parameters. This technology suggests a management device configured to read stored information from a near field communications (NFC) chip of a user and apply different wireless communications parameters to the same apparatus to switch between settings of domestic (home) wireless communications parameters and settings of outdoor wireless communications parameters according to the read information.

CITATION LIST

Patent Literature

[PTL 1] Japanese Patent No. 5121212

SUMMARY OF INVENTION

Technical Problem

The technology for setting the wireless communications parameters disclosed in Patent Document 1 includes allowing the apparatus to send the wireless communications parameters corresponding to two or more networks to the terminals regardless of users of the terminals. The wireless communications parameters are sent by the apparatus capable of receiving process requests from the terminals via the networks and are set by the terminals in order for the terminals to access the apparatus. For example, when an office has an employee-specific network and a guest-specific network for connecting to image forming apparatuses installed in the office, a terminal needs to have different wireless communications parameters for accessing the employee-specific network and for accessing the guest-specific network. There will not be disadvantageous effect on security for a user of the terminal who is an employee to acquire both the wireless communications parameters for accessing the employee-specific network and those for accessing the guest-specific network; however, it is not preferable for the user of the terminal who is a visitor to acquire the wireless communications parameters for accessing the employee-specific network for security reasons.

Solution to Problem

Accordingly, one object in embodiments of the present invention is to provide a communications system that enables an apparatus capable of receiving process requests from terminals via two or more networks to transmit communications information based on different users using their terminals when the apparatus transmits the communications information to the terminals for accessing the apparatus, which substantially obviates one or more problems caused by the limitations and disadvantages of the related art.

According to an aspect of embodiments, there is provided an information processing apparatus configured to receive a process request from a terminal via two or more networks. The information processing apparatus includes a storage configured to store communications information including first communications information for connecting to the information processing apparatus via a first network and second communications information for connecting to the information processing apparatus via a second network differing from the first network; an identification information receiver configured to receive identification information from the terminal, the identification information identifying a user of the terminal; a determination unit configured to determine one of the first network and the second network based on the identification information to receive the process request from the terminal; a communications information transmitter configured to transmit one of the first and the second communications information for connecting to the information processing apparatus stored in the storage via the determined one of the first and the second networks; and a request receiver configured to accept connection via the determined one of the first and second networks based on the transmitted communications information transmitted by the communications information transmitter from the terminal to receive the process request via the accepted one of the first and second networks.

BRIEF DESCRIPTION OF DRAWINGS

FIG. 1A is a diagram illustrating an example of a main use case expected in a print system of an embodiment;

FIG. 1B is a diagram illustrating another example of the main use case expected in the print system of the embodiment;

FIG. 2 is a configuration diagram illustrating an example of a print system;

FIG. 3 is a hardware configuration diagram illustrating an example of a mobile terminal;

FIG. 4 is a hardware configuration diagram illustrating an example of an image forming apparatus;

FIG. 5 is a functional block diagram illustrating an example of the print system;

FIG. 6 is a diagram illustrating an example of an authentication information input screen;

FIG. 7 is a sequence diagram illustrating an example of a print process;

FIG. 8 is a flowchart illustrating a process of step S7 of FIG. 7;

FIG. 9 is a sequence diagram illustrating an example of a print process;

FIG. 10 is a flowchart illustrating an example of a connectability determination process;

FIG. 11A is a diagram illustrating a screen example of an application displayed on a display device of a mobile terminal;

FIG. 11B is a diagram illustrating another screen example of an application displayed on the display device of the mobile terminal;

FIG. 12A is a diagram illustrating still another screen example of an application displayed on the display device of the mobile terminal;

FIG. 12B is a diagram illustrating yet still another screen example of an application displayed on the display device of the mobile terminal;

FIG. 13 is a flowchart illustrating an example of a connectability determination process based on priority;

FIG. 14 is a hardware configuration diagram illustrating an example of an authentication server;

FIG. 15 is a functional block diagram illustrating an example of a print system of a second embodiment;

FIG. 16 is a sequence diagram illustrating an example of a print process in the second embodiment;

FIG. 17 is a functional block diagram illustrating an example of a print system of a third embodiment;

FIG. 18 is a sequence diagram illustrating an example of a print process in the third embodiment;

FIG. 19 is a functional block diagram illustrating an example of a print system of a fourth embodiment;

FIG. 20 is a diagram illustrating examples of URL information and a URL;

FIG. 21 is a sequence diagram illustrating examples of functions of a server part;

FIG. 22 is a sequence diagram illustrating an example of a print process in the fourth embodiment; and FIG. 23 is a flowchart illustrating a detailed process of determining whether a mobile terminal has been successfully connected to a network N1 or N2.

DESCRIPTION OF EMBODIMENTS

The following describes embodiments of the present invention with reference to the accompanying drawings.

Use Cases of Print System of Embodiments

FIGS. 1A and 1B illustrate main use cases expected in a print system 1 (an example of a communications system) of an embodiment. FIGS. 1A and 1B are diagrams illustrating examples of the main use cases expected in the print system of the embodiment. In the use cases, an image forming apparatus 20 (an image processing apparatus) is connected to a network N1 serving as a company's internal LAN or the like. The image forming apparatus 20 may also be communicating via a network N2 that performs communications with peer-to-peer (P2P) networking.

Use Case 1

FIG. 1A illustrates a use case 1 where a visitor 9 uses his/her mobile terminal 10 to perform wireless communications with the image forming apparatus 20 for printing. The following describes the use case 1 with reference to FIG. 1A.

(1) The visitor 9 initially moves or holds the mobile terminal 10 close to a NFC reader-writer 213. Moving the mobile terminal 10 close to the NFC reader-writer 213 allows the mobile terminal 10 to transmit authentication information (employee's ID and password) 800 stored in advance in the mobile terminal 10 to the image forming apparatus 20.

(2) The image forming apparatus 20 authenticates the authentication information 800 transmitted from the mobile terminal 10 to determine whether a user of the mobile terminal 10 is an employee of the company.

(3) The visitor 9 is not an employee, and the image forming apparatus 20 transmits second communications information 1300 for accessing the image forming apparatus 20 via the network N2 to the mobile terminal 10 via the NFC reader-writer 213.

(4) The mobile terminal 10 of the visitor 9 who has attempted to perform communications using the second communications information 1300 finds that the mobile terminal 10 is able to perform communications, and thus starts communications with the image forming apparatus 20 via the network N2.

Since the mobile terminal 10 of the visitor 9 acquires only the second communications information 1300, the mobile terminal 10 of the visitor 9 may be able to perform communications with the image forming apparatus 20 without having access to the network N1 serving as the company's internal LAN.

Use Case 2

FIG. 1B illustrates a use case 2 where an employee 8 uses his/her mobile terminal 10 to perform wireless communications with an image forming apparatus 20 for printing, which is placed in a different section of the company and is thus not normally used by the employee 8. The following describes the use case 2 with reference to FIG. 1B.

(1) The employee 8 initially moves or holds the mobile terminal 10 close to the NFC reader-writer 213. Moving the mobile terminal 10 close to the NFC reader-writer 213 allows the mobile terminal 10 to transmit authentication information (employee's ID and password) 800 stored in advance in the mobile terminal 10 to the image forming apparatus 20.

(2) The image forming apparatus 20 authenticates the authentication information 800 transmitted from the mobile terminal 10 to determine whether a user of the mobile terminal 10 is an employee of the company.

(3) The employee 8 is an employee of the company, and hence, the image forming apparatus 20 transmits first communications information 1100 for accessing the image forming apparatus 20 via the network N1 and the second communications information 1300 for accessing the image forming apparatus 20 via the network N2 to the mobile terminal 10 via the NFC reader-writer 213.

(4) The mobile terminal 10 of the employee 8 has subsequently attempted to perform communications using the first communications information 1100. The mobile terminal 10 of the employee 8 has access authorization (later-described SSID and password for accessing the network N1) for accessing the network N1, and hence the mobile terminal 10 of the employee 8 is able to access the internal LAN via an access point 7 to perform communications using the first communications information 1100. The mobile terminal 10 of the employee 8 starts communications with the image forming apparatus 20 via the network N1.

As described above, the mobile terminal 10 of the employee 8 is capable of performing communications with the image forming apparatus 20 via the network N1 serving as the company's internal LAN. Even when the authentication of the employee 8 has failed or the employee 8 has failed to access the image forming apparatus 20 via the network N1, the mobile terminal 10 of the employee 8 is capable of accessing the image forming apparatus 20 via the network N2. The employee 8 may still be able to temporarily perform printing via the network N2.

The print system 1 in accordance with an embodiment may enable users such as the visitor 9 and the employee 8 to automatically select appropriate networks as well as reducing users' laborious tasks of setting the communications information.

Definitions

"Employee(s)" is an example of a user of the mobile terminal 10 and the image forming apparatus 20, who has access authorization for accessing the company's internal LAN (i.e., wireless communications parameters for accessing the company's internal LAN being set in the mobile terminal 10). This user is not necessarily called the employee 8, and may be called any name such as personnel, office worker, or staff. "Visitor(s)" is an example of a user of the mobile terminal 10 and the image forming apparatus 20, who has no access authorization for accessing the company's internal LAN. All the users other than the employees are the visitors 9. Note that the visitor 9 may also be called by any name.

First Embodiment

System Configuration

The following describes a system configuration of a print system 1 according to a first embodiment with reference to FIG. 2. FIG. 2 is a configuration diagram illustrating an example of the print system according to the first embodiment. The print system 1 of FIG. 2 includes a mobile terminal 10 and one or more image forming apparatuses 20. The mobile terminal 10 and the image forming apparatuses 20 are configured to be connectable to one another via a network N1 and a network N2 either with wired or wireless networking.

Note that the mobile terminal 10 is, as described later, an information processing apparatus carried by a user, and the mobile terminal 10 and the image forming apparatuses 20 may preferably be connectable to one another wirelessly via the network N1 and the network N2. Being connectable indicates having a connectable function; whether the devices are actually connectable may be determined differently as illustrated in FIGS. 7 to 10.

The network N1 and the network N2 both use wireless LANs but are mutually different networks. The different networks indicate that the network N1 and the network N2 need different wireless communications parameters for network connection; for example, the network N1 and the network N2 require different service set identifiers (SSIDs).

Note that the following illustrates the network N1 as an example of a company's internal LAN via which the mobile terminal 10 is connected to the image forming apparatuses 20 via a wireless local area network (LAN), and also illustrates the network N2 as an example of a network directly connecting the mobile terminal 10 to the image forming apparatuses 20 by P2P connections with Wi-Fi Direct (herein after called "Wi-Fi Direct P2P"). However, the network N1 and the network N2 are not limited to these examples. The network N1 may include other networks such as a WAN or the Internet in addition to the company's internal LAN, and may partially include mobile telephone networks. The network N2 may be a network for allowing the mobile terminal 10 to connect to the image forming apparatuses 20, for example, via a wireless LAN ad hoc mode, mobile telephone networks, infrared communications mode, and Bluetooth (registered trademark). Specifically, the network N2 may be any network that will not intrude into internal networks such as the company's internal LAN. The network N2 may be a company's internal LAN (e.g., a network having a network address differing from the network address of the network N1) for allowing the mobile terminal 10 to connect to the image forming apparatuses 20, for example, via wireless LAN provided that the network N2 has appropriate settings that are separate from the network N1.

The NFC reader-writer 213 is disposed in a housing of the image forming apparatus 20 such that information is transmitted from the mobile terminal 10 to the image forming apparatus 20 or from the image forming apparatus 20 to the mobile terminal 10 via near field wireless communications. The near field wireless communications may be performed via Bluetooth (registered trademark) or infrared rays other than the NFC reader-writer 213.

The mobile terminal 10 may be a mobile information processing apparatus such as a smartphone operated by a user. Examples of the mobile terminal 10 may include a smartphone, a tablet terminal, a gaming machine, a personal digital assistant, a digital still camera, a wearable personal computer (PC), and a notebook PC. The mobile terminal 10 is installed with applications capable of requesting the image forming apparatus 20 to provide functions (e.g., to execute an instruction to print print-target data, an instruction to scan a document, an instruction to transmit data by facsimile, and an instruction to copy data). The mobile terminal 10 is thus configured to generate a print job including the print-target data, a scan job, a facsimile transmission job, and a copying job to transmit the generated jobs to the image forming apparatus 20.

The mobile terminal 10 also includes a later-described near field wireless communications device 217 with an NFC chip. The user holds the mobile terminal 10 over the NFC reader-writer 213 attached to a predetermined position of the housing of the image forming apparatus 20 to allow the mobile terminal 10 to have communications with the image forming apparatus 20. The mobile terminal 10 may be able to cause the image forming apparatus 20 to execute the print job, which is generated based on the communications information acquired as a result of the communications performed, thereby printing the print-target data.

Note that the applications may be software that perform communications with the image forming apparatus 20 to request the image forming apparatus 20 to execute jobs such as a browser, document creating software, or viewers.

The image forming apparatus 20 may be an apparatus such as a printer configured to receive a print job from the mobile terminal 10 to print the print-target data. Note that the image forming apparatus 20 may be a multifunctional peripheral (MFP) provided with multiple functions such as a copier function, a scanner function, and a facsimile transmission function in addition to a printer function.

The image forming apparatus 20 may also serve as an output apparatus such as a scanner, a facsimile machine, an image projection apparatus (projector), a rear-projection apparatus, a head-up display (HUD) apparatus, an electronic whiteboard, and digital signage, or an acoustic output apparatus such as a speaker. The embodiments illustrate a print system as an example of an information processing system; however, the embodiments are not limited to the print system. The embodiments may, for example, be an image output system employing an image output apparatus in place of the image forming apparatus 20, or may be an acoustic output system employing a speaker apparatus in place of the image forming apparatus 20. In other words, the embodiments may be applied to various types of systems that may employ the mobile terminal(s) 10 configured to generate various types of jobs, images, or data convertible to images, and apparatus(es) (the image forming apparatuses 20 in this embodiment) configured to output the various types of jobs, images, or data convertible to images received from the mobile terminal 10(s). The embodiments may be applied to systems in which the mobile terminal 10 and the image forming apparatus 20 simply perform wireless communications without any data output.

The NFC reader-writer 213 is a near field wireless communications device disposed at a predetermined position of the housing of the image forming apparatus 20. The NFC reader-writer 213 is configured to read information from an NFC chip, and write information in the NFC chip. Specifically, the NFC reader-writer 213 is an IC tag reader.

The mobile terminal 10 is configured to perform communications with the image forming apparatus 20 via the NFC reader-writer 213 to transmit authentication information 800 to be authenticated by the image forming apparatus 20, and receive communications information according to the authentication result, for example. The mobile terminal 10 may receive communications information for communicating with the image forming apparatus 20 via the network N1, and may also receive communications information for communicating with the image forming apparatus 20 via the network N2.

The mobile terminal 10 may, as already described above, transmit a print job to the image forming apparatus 20 based on the communications information received via the NFC reader-writer 213, thereby executing the print job in the image forming apparatus 20.

Note that the above-described embodiment describes the print system 1 that has two networks N1 and N2 via which the mobile terminal 10 and the image forming apparatus 20 are connectable; however, the number of connectable networks may be one or more.

The above-described the print system 1 may be provided with a print server configured to accumulate print jobs transmitted from the mobile terminal 10. The above-described the print system 1 may also include one or more mobile terminals 10.

Hardware Configuration

Mobile Terminal

The mobile terminal 10 according to the embodiment may be implemented, for example, by a hardware configuration illustrated in FIG. 3. FIG. 3 is a hardware configuration diagram illustrating an example of a mobile terminal according to the embodiment. The mobile terminal 10 illustrated in FIG. 3 includes an input device 101, a display device 102, an external I/F 103, a random access memory (RAM) 104, a read only memory) ROM 105, a central processing unit (CPU) 106, a communications I/F 107, a solid state drive (SSD) 108, a near field wireless communications device 109, and the like, which are mutually connected via a bus B.

The input device 101 may be a touch panel or the like, which is used to input various operational signals into the mobile terminal 10. Note that the input device 101 may be a keyboard or a mouse. The display device 102 may be a liquid crystal display (LCD) or the like, which is configured to display process results of the mobile terminal 10.

The external I/F 103 serves as an interface with respect to external devices. Examples of the external devices include a recording medium 103a, and the like. The recording medium recording medium 103a may store programs to implement the embodiment. The mobile terminal 10 may be able to read the recording medium 103a or write data on the recording medium 103a via the external I/F 103.

The recording medium 103a may be a recording medium such as an SD memory card. The recording medium 103a may be a recording medium such as universal serial bus memory (USB), a digital versatile disk (DVD), a compact disk (CD), and a flexible disk.

The RAM 104 is a volatile semiconductor memory (a storage device) configured to temporarily store programs and data. The ROM 105 is a non-volatile semiconductor memory (a storage device) configured to retain programs or data even when the power supply is turned off. The ROM 105 is configured to store programs and data such as a basic input/output system (BIOS), OS settings, network settings, and the like that are executed at the startup of the mobile terminal 10.

The CPU 106 is a processor configured to implement control the overall operations or functions of the mobile terminal 10 by loading programs and data in the RAM 104 from a storage device such as the ROM 105 and the SSD 108 to execute processes in accordance with the loaded programs and data.

The communications I/F 107 is an interface for performing communications via the network N1 or the network N2. For example, the communications I/F 107 may be an interface for connecting the mobile terminal 10 to a company's internal LAN or the like via a wireless LAN. The communications I/F 107 may be an interface for connecting the mobile terminal 10 to the image forming apparatus 20 via the Wi-Fi Direct. The mobile terminal 10 may be able to perform data communications via the communications I/F 107 having the above-described configurations. Note that the communications I/F 107 may be an interface for connecting the mobile terminal 10 to mobile telephone networks or the Internet.

The SSD 108 is a non-volatile storage device configured to store programs 108a and data. The programs 108a stored in the SSD 108 may include an operation system (OS) that is basic software to control the overall operations of the mobile terminal 10, or application software (hereinafter simply called application(s)) that provides various types of functions to the OS. The SSD 108 is configured to manage the stored programs or data with a predetermined file system or a database (DB). Note that the mobile terminal 10 may further include a hard disk drive (HDD) in addition to the SSD 108.

The near field wireless communications device 109 is a communications device configured to perform communications via the NFC chip or Bluetooth low energy (registered trademark). The mobile terminal 10 may be able to perform data communications via the near field wireless communications device 109 having the above-described configurations.

The mobile terminal 10 according to the first embodiment having the above-described configuration may be able to implement various types of processing, which will be described later.

Image Forming Apparatus

FIG. 4 is a hardware configuration diagram illustrating an example of an image forming apparatus. FIG. 4 illustrates an image forming apparatus 20 is configured to have a controller 220 and an engine part 212 that are connected via a peripheral component interface (PCI) bus 216.

The controller 220 is a control device configured to control the overall operations of the image forming apparatus 20, and drawing, communications, and inputs from an operations part or the like having a touch panel. The engine part 212 may be a printer engine connectable to the PCI bus 216, and may include a black-and-white plotter, a one-drum color plotter, or a four-drum color plotter. The engine part 212 may further include a scanner engine configured to scan a document.

Note that the engine part 212 includes an image processor part configured to perform error diffusion or gamma conversion in addition to a so-called engine part such as a plotter.

The controller 220 is configured to include a CPU 201, a Northbridge (NB) 203, a system memory (MEM-P) 202, a Southbridge (SB) 204, a local memory (MEM-C) 206, an application specific integrated circuit (ASIC) 205, and a hard disk drive (HDD) 207, and have an accelerated graphic port (AGP) bus 214 connected between the Northbridge (NB) 203 and the ASIC 205.

The MEM-P 202 further includes a ROM 202a and a RAM 202b.

The CPU 201 is configured to control the overall operations of the image forming apparatus 20. The CPU 201 includes a chip set composed of the NB 203, the MEM-P 202, and the Southbridge (SB) 204, and is connected to other apparatuses via the chip set.

The NB 203 is a bridge for connecting the CPU 201 to the MEM-P 202, the SB 204, and the AGP bus 214. The NB 203 includes a memory controller configured to control reading and writing with respect to the MEM-P 202, a PCI master, and an AGP target.

The MEM-P 202 is a system memory used as a storage memory for storing programs and data, a loading memory for loading programs and data, and a printer plotting memory. The ROM 202a is a read only memory used as a storage memory for storing programs or data, the RAM 202b is a readable and writable memory used as a loading memory for loading programs and data or used as a printer plotting memory.

The SB 204 is a bridge for connecting the NB 203 to the PCI bus 216, and peripheral devises. The SB 204 is connected to the NB 203 via the PCI bus 216, and the SB 204 is connected to the network I/F 215.

The ASIC 205 is an integrated circuit (IC) for an image processor having image processing hardware elements, and serves as a bridge for connecting the AGP bus 214, the PCI bus 216, the HDD 207, and the MEM-C 206.

The ASIC 205 includes the PCI target and AGP master, an arbiter (ARB) serving as a core of the ASIC 205, a memory controller configured to control the MEM-C 206, multiple direct memory access controllers (DMACs) configured to rotate image data based on a hardware logic or the like, and a PCI unit configured to perform data transfer with the engine part 212 via the PCI bus 216.

The ASIC 205 is connected, via the PCI bus 216, to a facsimile control unit (FCU) 209, a universal serial bus (USB) 210, an IEEE 1394 (the Institute of Electrical and Electronics Engineers 1394) interface 211, and the NFC reader-writer 213.

An operations display part is directly connected to the ASIC 205, and is configured to display an operations menu and receive contents of the operations. The MEM-C 206 is a local memory used as a copying image buffer or a code buffer. The HDD 207 is a storage for accumulating image data, programs, font data, and forms.

The HDD 207 is configured to store license files of the applications executed in the image forming apparatus 20.

The AGP bus 214 is a bus interface for a graphics accelerator card for accelerating graphical processing, and accelerates the speed of the processing of the graphical accelerator card by directly accessing the MEM-P 202 with high throughput.

The NFC reader-writer 213 is a device for performing contactless communications (reading or writing data) with IC cards or IC tags. The NFC reader-writer 213 that has detected the approach of the near field wireless communications device 109 of the mobile terminal 10 performs communications with the near field wireless communications device 109 to read or write information with respect to the mobile terminal 10. Note that the NFC reader-writer 213 may be incorporated in the image forming apparatus 20 or may be provided outside the image forming apparatus 20.

The near field wireless communications device 217 is configured to perform communications with the mobile terminal 10 based on the telecommunications standard called the Bluetooth (registered trademark) low energy, in a manner similar to the near field wireless communications device 109.

The network I/F 215 is a communications device connecting to wireless or wired networks such as a LAN. The network I/F 215 in this embodiment may be able to perform communications with the Wi-Fi Direct, in addition to communications via the LAN.

Software Configuration

The print system 1 according to the first embodiment may be represented by a functional block diagram illustrated in FIG. 5. FIG. 5 is a functional block diagram illustrating an example of the print system 1 according to the first embodiment.

Functionality of Mobile Terminal

The mobile terminal 10 of the print system 1 includes an operations receiver 11, an information acquisition part 12, a connectability determination part 13, a UI display part 14, a communications part 15, an information storage 16, an information transmitter 17, and an authentication information storage 18. The communications part 15 includes a first communications part 151 and a second communications part 152.

The authentication information storage 18 is implemented by the near field wireless communications device 109 or the like, and is configured to store the authentication information 800.

TABLE 1

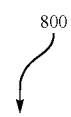

| EMPLOYEE ID | 001 |
| PASSWORD | AAA |

Table 1 illustrates an example of the authentication information 800. The authentication information 800 is information for authenticating a user of the mobile terminal 10 as being an employee of a company in which the image forming apparatus 20 is placed. The authentication information 800 may, for example, include an employee ID and a password. The employee ID is identifier information such as a language, letters, symbols, or various types of marks used for uniquely identifying each employee of a company where the image forming apparatuses 20 are placed.

The information transmitter 17 may be implemented by the CPU 106 and the near field wireless communications device 109, and is configured to transmit the authentication information 800 stored in the authentication information storage 18 to the image forming apparatus 20 with near field wireless communications.

The information acquisition part 12 may be implemented by the CPU 106 and the near field wireless communications device 109, and is configured to acquire none, or one or more pieces of communications information from the image forming apparatus 20 with near field wireless communications.

The information storage 16 may be implemented by the CPU 106, the ROM 105, and the SSD 108, and is configured to store communications information 1000 acquired by the information acquisition part 12 and read the stored communications information.

The operations receiver 11 may be implemented by the CPU 106 to execute applications in collaboration with the input device 101, and is configured to receive operations of a user.

The connectability determination part 13 may be by the CPU the like, and is configured to select one of the networks connectable to the image forming apparatus 20, based on one or more pieces of communications information acquired from the image forming apparatus 20. The connectability determination part 13 in the first embodiment specifically selects one of the network N1 and network N2 based on two or more pieces of communications information to perform communications with the image forming apparatus 20 via the selected one of the network N1 and network N2.

The UI display part 14 may be implemented by the CPU 106, the display device 102, and the like, and is configured to generate a user interface (UI) screen and display the generated UI screen.

The communications part 15 may be implemented by the communications I/F 107, and is configured to perform communications with the image forming apparatus 20. More specifically, the first communications part 151 performs communications with the image forming apparatus 20 via the network N1, and the second communications part 152 performs communications with the image forming apparatus 20 via the network N1, based on a selected result of the connectability determination part 13.

Functionality of Image Forming Apparatus

The image forming apparatus 20 of the print system 1 includes a print function part 21, a transmitter-receiver 24, a reader-writer communications part 25, an authentication processor 27, and a communications information providing part 28. The transmitter-receiver 24 may be implemented by the network I/F 215 and CPU 201, and is configured to communicate with the mobile terminal 10 to receive print jobs and the like.

The image forming apparatus 20 further includes an authentication DB 29, and a communications information DB 31.

TABLE 2

| EMPLOYEE ID | PASSWORD |
|---|---|
| 001 | AAA |
| 002 | BBB |
| 003 | CCC |
| ... | ... |

Table 2 illustrates an example of an authentication information table. The authentication DB 29 may store an authentication information table illustrated in Table 2, for example. The authentication information table includes a combination of an employee ID and password for each of the employees in the company who may be allowed to use the image forming apparatuses 20.

TABLE 3

| ITEM NAME | ITEM VALUE | |
|---|---|---|
| FIRST IP ADDRESS | 192.168.20.1 | 1100 |
| SSL COMMUNICATIONS | YES | |
| ... | | |
| ACCESSIBILITY TO NETWORK N2 | YES | 1200 |
| SECOND IP ADDRESS | 192.160.0.3 | |
| SSID | 123ABC | |
| ENCRYPTION SYSTEM | WPA/WPA2-PSK | 1300 |
| PASSWORD | ****** | |
| HTTP PORT NUMBER | 80 | |
| HTTPS PORT NUMBER | 443 | |
| ... | | |

1000

Table 3 is a diagram illustrating an example of communications information. The communications information DB 31 includes communications information 1000 illustrated in Table 3. The communications information 1000 includes first communications information 1100 for performing communications with the image forming apparatus 20 via the network N1, accessibility information 1200 indicating accessibility to the communications via the network N2, and second communications information 1300 for performing communications with the image forming apparatus 20 via the network N2. The communications information 1000 includes two or more pieces of communications information such as the first communications information 1100 and the second communications information 1300.

The first communications information 1100 serves as information necessary for the mobile terminal 10 to perform communications with the image forming apparatus 20 via the network N1 (e.g., a company's internal LAN connected via a wireless LAN). The first communications information 1100 includes a first IP address serving as an IP address of the image forming apparatus 20 in the network N1, and secure socket layer (SSL) communications information indicating availability of SSL communications in the network N1. The first communications information 1100 does not include an SSID or password for connecting from an access point 7 to the company's internal LAN. This is because an employ 8 is expected to connect to the network N1, and the mobile terminal 10 of the employee 8 already has SSID and password set in advance. However, even though the first communications information 1100 has an SSID and password for the company's internal LAN set in advance, authentication of an employee is performed before starting communications with the image forming apparatus 20 in this embodiment. Accordingly, the security level will not be degraded drastically. Thus, the first communications information 1100 may have the SSID and password set in advance. The security level may, however, be improved without storing the SSID and password in the first communications information 1100. Such communications information without storing the SSID or password may be called "employee-specific communications information (an example of first communications information)".

Note that when the first communications information 1100 includes an SSID and password, the employee 8, who is connecting his or her the mobile terminal 10 to the company's internal LAN for the first time, may be able to transmit a print request with the company's internal LAN.

A case may be assumed where the mobile terminal 10 that stores settings for connecting to the company's internal LAN is currently connected to a network (e.g., another wireless LAN, 3G, and LTE) other than the company's internal LAN. In such a case, when the first communications information 1100 includes the SSID, the mobile terminal 10 may be able to identify the settings corresponding to the company's internal LAN among the network settings stored in the mobile terminal 10, and the mobile terminal 10 may thus be able to switch from the currently connected network to the company's internal LAN. Or the mobile terminal 10 may be able to determine that the currently connected network is the company's internal LAN.

The accessibility information 1200 serves as information that indicates whether the mobile terminal 10 of the employee is capable of performing communications via the network N2 when the authentication of the employee has failed, or when the connectability determination part 13 has determined that the mobile terminal 10 of the employee is unable to communicate with the image forming apparatus 20 via the network N1. For example, the communications information 1000 depicted in Table 3 indicates that the accessibility information 1200 has a setting of "YES (accessible)". As will be described later in further detail, when the authentication of the employee has failed, or when the connectability determination part 13 has determined that the mobile terminal 10 of the employee is unable to communicate with the image forming apparatus 20 via the network N1, the mobile terminal 10 has attempted to perform communications with the image forming apparatus 20 via the network N2. On the other hand, when the accessibility information 1200 has a setting of "No (inaccessible)", the mobile terminal 10 is unable to perform communications with the image forming apparatus 20 via the network N2.

The accessibility information 1200 may be used for charging control (fee control). For example, the use of the image forming apparatus 20 may be charged for based on the "pay-as-you-go system" such as the number of printed sheets. When the image forming apparatuses 20 are placed in a company A, and the employee 8 who is an employee of the company A uses the image forming apparatuses 20 for printing, the company A is billed (charged) for the use of the image forming apparatuses 20. When, however, the image forming apparatus 20 is placed in an area of the company A where a large number of visitors 9 are received, the company A may not desire to allow those visitors 9 to use the image forming apparatus 20 for printing.

By contrast, public facilities such as a city hall and a library need to meet the visitors 9 demands for using the image forming apparatus 20 for printing. To meet such demands, a cash acceptor (a so-called "coin-mechanism" for coins and a "banknote counter" for banknotes) is placed together with the image forming apparatus 20 in highly public places to allow the visitors 9 to use the image forming apparatus 20 for printing within the range of the amount of money payed (coins or notes inserted into the cash acceptor) by the user (visitor).

The visitors 9 may be allowed to use the image forming apparatus 20 that is placed in a chargeable area or that is placed in an area where less printing is expected. The accessibility information 1200 is thus used for controlling the visitors 9 accessibility to the image forming apparatus 20.

Note the first communications information 1100 may also have a setting of the accessibility information. For example, when the network N1 has security inconvenience, the mobile terminal 10 of the employee 8 may be prevented from communicating with the image forming apparatus 20 via the network N1 based on the setting of the accessibility information of the first communications information 1100.

The second communications information 1300 serves as information necessary for the mobile terminal 10 to perform communications with the image forming apparatus 20 via the network N2 (e.g., the Wi-Fi Direct P2P). The second communications information 1300 includes a second IP address serving as an IP address of the image forming apparatus 20 in the network N2, a service set identifier (SSID) for identifying the network N2, an encryption system in the network N2, password, and the image forming apparatus 20 hypertext transfer protocol (HTTP) port number or HTTP over SSL/TLS (HTTPS) port number for performing communications via the network N2. Note that when the image forming apparatus 20 performs communications without encrypting data, the communications itself may be performed without a password. Such communications information storing the SSID or password may be called "visitor-specific communications information indicating the communications information available to visitors (an example of second communications information)".

The above-described information included in the first communications information 1100 or information included in the second communications information second communications information 1300 may only be an example. The first communications information 1100 or the second communications information 1300 may include various information pieces necessary for performing communications via a network N3, the network N2, or the network N1. The above-described communications information 1000 includes the first IP address differing from the second address; however, the first IP address may be the same as the second address.

For example, when the mobile terminal 10 and the image forming apparatus 20 are configured to be connectable further via the network N3, the communications information 1000 may further include accessibility information indicating the availability of communications via the network N3 and third communications information for performing communications with the image forming apparatus 20 via the network N3. In this case, whether the third communications information is the employee-specific communications information or visitor-specific communications information may preferably be identifiable with a flag or the like.

Functionality of Image Forming Apparatus

The print function part 21 may be implemented by the engine part 212 or the like, and is configured to print print-target data included in the print jobs requested from the mobile terminal 10. Note that the image forming apparatus 20 may further include, in addition to the print function part 21, a scanner function part configured to generate image data (electronic data) from the read document, and a copier function part configured to copy the read document, a facsimile transmission function part configured to telephonically transmit the read document or the electronic data via telephone networks.

The reader-writer communications part 25 may be implemented by the CPU 201, the PCI bus 216, or the like, and is configured to perform communications with the NFC reader-writer 213. More specifically, the reader-writer communications part 25 acquires the authentication information 800 from the NFC reader-writer 213, and transmits the communications information to the NFC reader-writer 213.

The authentication processor 27 may be implemented by the CPU 201, or the like, and is configured to authenticate the mobile terminal 10 (the user) based on whether the authentication DB 29 includes (registers) the employee ID and the password the same as the employee ID and the password included in the authentication information 800 acquired from the mobile terminal 10. Specifically, the authentication processor 27 searches the authentication information table by the employee ID and password combination the same as the employee ID and password combination included in the authentication information 800. The authentication processor 27 subsequently determines that the authentication is OK (i.e., authentication has succeeded) when the authentication information table includes the employee ID and password combination the same as the employee ID and password combination included in the authentication information 800, and determines that the authentication is NG (has failed) when the authentication information table does not include the employee ID and password combination the same as the employee ID and password combination included in the authentication information 800. The authentication result (OK or NG) is then transmitted to the communications information providing part 28.

The communications information providing part 28 is configured to read the communications information from the communications information DB 31 based on the authentication result, and transmit the read communications information to the reader-writer communications part 25.

AUTHENTICATION OK—read the first communications information and the second communications information from the communications information AUTHENTICATION NG—read the second communications information from the communications information Note that the second communications information will not be read when the accessibility information 1200 is "NO" in either cases.

An information reader 33 may be implemented by the NFC reader-writer 213, and is configured to acquire the authentication information 800 from the information transmitter 17 of the mobile terminal 10.

An information writer 32 may be implemented by the NFC reader-writer 213, and is configured to transmit the first communications information, the second communications information, the authentication information, the first communications information alone, the second communications information alone, or NULL (no communications information) to the information acquisition part 12 of the mobile terminal 10.

Employee ID and Password

The following describes the input of the employee ID and the password. FIG. 6 is a diagram illustrating an example of an authentication information input screen 941. The authentication information input screen 941 includes (displays) a message 942 presenting "Please input your employee ID and password for communicating with MFP", an MFP icon 943, an employee ID entry field 944, a password entry field 945, an OK button 946, and a cancel button 947. When the user inputs his or her employee ID into the employee ID entry field 944 and password into the password entry field 945, and subsequently presses the OK button 946, the input employee ID and password are stored in the authentication information storage 18.

The authentication information input screen 941 may be displayed on the display device 102 when the user desires to store his or her employee ID and password in the mobile terminal 10. When the employee ID and password are not stored in the information storage 16, the authentication information input screen 941 may be displayed at the time at which the user moves (holds) the mobile terminal 10 close to the NFC reader-writer 213 of the image forming apparatus 20.

The applications installed in the mobile terminal 10 may be distributed to the users of the image forming apparatus (es) 20. The users may be able to store the corresponding employee IDs and passwords in their own mobile terminals 10. As described below, however, whether the employee ID and password are stored in the mobile terminal 10 may differ according to the mobile terminal 10.

In the company A, most employees 8 of the company A are assumed to store their employee IDs and passwords in the mobile terminals 10 when the employees 8 are authenticated using their mobile terminals 10 for using the image forming apparatuses 20. Similarly, the employees 8 of a company B may store the respective employee IDs and passwords of the company B in their mobile terminals 10. The image forming apparatuses 20 accessible by the mobile terminals 10 are not installed in a company C. In this case, when the employee 8 of the company C has attempted to install the application for using the image forming apparatus 20, his or her mobile terminal 10 is unlikely to store his employee ID and password. Further, some of the employees 8 of the company A and the company B may also fail to store their employee IDs and passwords in their mobile terminals 10. Thus, some of the mobile terminals 10 do not store the corresponding employee IDs and passwords.

Details of Process

The following illustrates details of the process of the print system 1.

From Authentication to Acquisition of Communications Information

Initially a description is given of a process flow of the print system 1 from authentication to acquisition of communications information. FIG. 7 is a sequence diagram illustrating an example of the print process according to the first embodiment.

In step S1, the user selects desired print target data from the application installed in the mobile terminal 10 to transmit a print instruction via the UI display part 14. This generates a print job including the print-target data selected by the user.

In step S2, when the UI display part 14 of the mobile terminal 10 receives a print job execution report, the UI display part 14 transmits a print process start request to the information transmitter 17. This allows the mobile terminal 10 to be in a standby mode until the near field wireless communications device 109 detects the start of near field wireless communications. Note that during the standby mode, the UI display part 14 of the mobile terminal 10 may display a screen to the user to encourage the user to hold the mobile terminal 10 at a position close of the NFC chip (the NFC reader-writer 213) of the image forming apparatus 20.

In step S6, when the information transmitter 17 detects the start of the near field wireless communications, the information transmitter 17 reads the authentication information (the employee ID and password) 800 from the authentication information storage 18 and sends an authentication request together with the authentication information (the employee ID and password) 800 to the NFC reader-writer 213. When the authentication information 800 is not stored in the authentication information storage 18, indication of no authentication information or dummy authentication information (the employee ID and password) 800 may be transmitted to the NFC reader-writer 213. The dummy authentication information 800 indicates fictitious employee ID and password that satisfy the number of digits or numerical representation of the authentication information 800. The dummy authentication information 800 may be used to acquire communications information 1000 even though the authentication information (the employee ID and password) 800 is not stored in the mobile terminal 10.

In step S4, the information reader 33 of the NFC reader-writer 213 sends the acquired authentication request and authentication information (the employee ID and password) 800 to the authentication processor 27 via the reader-writer communications part 25.

In step S5, the authentication processor 27 searches the authentication DB 29 using the authentication information (the employee ID and password) 800 to determine whether the authentication DB 29 includes (registers) the same employee ID and password combination. The authentication processor 27 generates an authentication result (OK or NG) based on the search (detected) result. When the authentication processor 27 receives the indication of no authentication information or the dummy authentication information 800, the authentication processor 27 determines the authentication result as NG (authentication NG).

In step S6, the authentication processor 27 sends the authentication result (OK or NG) to the communications information providing part 28.

In step S7, the communications information providing part 28 reads the communications information 1000 from the communications information DB 31 based on the authentication result (OK or NG). The following illustrates the communications information 1000 to be read. Details of the communications information 1000 are illustrated with reference to FIG. 8.

The authentication "OK" and the accessibility information 1200 "YES" The employee-specific communications information and the visitor-specific communications information indicating the communications information available to visitors (the first communications information 1100 and the second communications information 1300)

The authentication "OK" and the accessibility information 1200 "NO" The employee-specific communications information (the first communications information 1100)

The authentication "NG" and the accessibility information 1200 "YES" The visitor-specific communications information (the second communications information 1300)

The authentication "NG" and the accessibility information 1200 "NO" NULL (no communications information)

In step S8, the communications information providing part 28 sends the communications information 1000 to the NFC reader-writer 213 via the reader-writer communications part 25.

In step S9, the information writer 32 of the NFC reader-writer 213 sends the communications information 1000 to the information acquisition part 12 of the mobile terminal 10. In this case, the information writer 32 of the NFC reader-writer 213 sends the first communications information 1100 with an ID indicating the first communications information 1100, and the second communications information 1300 with an ID indicating the second communications information 1300 to the information acquisition part 12. Note that the flags or the like that indicate the employee-specific communications information and the visitor-specific communications information may also be transmitted to the information acquisition part 12 in addition to the IDs.

In step S10, the information acquisition part 12 of the mobile terminal 10 stores the communications information 1000 in the information storage 16.

In step S11, the information acquisition part 12 of the mobile terminal 10 sends a request to the connectability determination part 13 to determine the connectability using the communications information 1000.

FIG. 8 is a flowchart illustrating a process of step S7 of FIG. 7.

Initially, the communications information providing part 28 determines whether the authentication is "OK" (step S210).

When the authentication is "OK" ("YES" in step S210), the communications information providing part 28 determines whether the accessibility information 1200 of the visitor-specific communications information (the accessibility information 1200 allowed to be accessed by the visitors) is "YES" (step S211).

When the accessibility information 1200 of the visitor-specific communications information is "YES" ("YES" in step S211), the communications information providing part 28 acquires the employee-specific communications information and the visitor-specific communications information (the first communications information 1100 and the second communications information 1300) from the communications information DB 31 (step S214).

When the accessibility information 1200 of the visitor-specific communications information is "NO" ("NO" in step S211), the communications information providing part 28 acquires the employee-specific communications information (the first communications information 1300) from the communications information DB 31 (step S213).

When the authentication is "NG" ("NO" in step S210), the communications information providing part 28 determines whether the accessibility information 1200 of the visitor-specific communications information is "YES" (step S212).

When the accessibility information 1200 of the visitor-specific communications information is "YES" ("YES" in step S212), the communications information providing part 28 acquires the visitor-specific communications information (the second communications information 1300) from the communications information DB 31 (step S215).

When the accessibility information 1200 of the visitor-specific communications information is "NO" ("NO" in step S212), the communications information providing part 28 determines a result as NULL (no communications information) (step S216).

The communications information providing part 28 may thus be able to provide the appropriate communications information to the mobile terminal 10 based on the authentication result and the accessibility information 1200.

From Connectablility Determination to Execution of Print Job

The following illustrates a process flow from the connectability determination to execution of a print job. FIG. 9 is a sequence diagram illustrating an example of a print process according to the first embodiment. The connectability determination indicates a process of connecting to the image forming apparatus 20 based on the most appropriate communications information (network N1 or network N2) from the communications information 1000 (one or more of first communications information 1100 and second communications information 1300, or NULL).

In step S11 of FIG. 9, the connectability determination part 13 of the mobile terminal 10 performs the connectability determination process in response to the connectability determination request from the information acquisition part 12. The connectability determination part 13 generates one of the following results by performing the connectability determination process. Note that details of the connectability determination process are illustrated later with reference to FIG. 10.

(1) The mobile terminal 10 is unable to perform communications with the image forming apparatus 20 via either of the network N1 and network N2 (the selected result indicates being incapable of communicating).

(2) The mobile terminal 10 performs communications with the image forming apparatus 20 via the network N1 (the selected result indicates communications performed via the first communications part).

(3) The mobile terminal 10 performs communications with the image forming apparatus 20 via the network N2 (the selected result indicates communications performed via the second communications part).

When the selected result obtained by the connectability determination part 13 is the above (1), steps S12 and S13 are processed. When the selected result obtained by the connectability determination part 13 is the above (2), steps S14 to S16 are processed. When the selected result obtained by the connectability determination part 13 is the above (3), steps S17 to and S19 are processed.

In step S12, the connectability determination part 13 of the mobile terminal 10 transmits a display request to the UI display part 14 to display a screen (communications failure screen in FIG. 12B) in order to inform the user that the mobile terminal 10 is unable to perform communications with the image forming apparatus 20.

In step S13, when receiving the display request for displaying communications failure screen, the UI display part 14 of the mobile terminal 10 generates the communications failure screen, and causes the display device 102 to display the communications failure screen. The user of the mobile terminal 10 may thus be informed that his or her mobile terminal 10 is unable to perform communications with the desired image forming apparatus 20.

In step S14, the connectability determination part 13 of the mobile terminal 10 transmits a print job execution request to the first communications part 151.

In step S15, when receiving the print job execution request, the first communications part 151 of the mobile terminal 10 transmits the received print job execution request to the image forming apparatus 20. More specifically, the mobile terminal 10 transmits a print job to the image forming apparatus 20 via the network N1 (e.g., the company's internal LAN connected via the wireless LAN).

In step S16, when receiving the print job from the mobile terminal 10, the print function part 21 of the image forming apparatus 20 executes the print job to print the print-target data. The user may thus be able to use the image forming apparatus 20 to print the desired print-target data.

In step S17, the connectability determination part 13 of the mobile terminal 10 transmits a print execution job to the second communications part 152.

In step S18, when receiving the print job execution request, the second communications part 152 of the mobile terminal 10 transmits the received print job execution request to the image forming apparatus 20. More specifically, the mobile terminal 10 transmits a print job to the image forming apparatus 20 via the network N2 (e.g., the Wi-Fi Direct P2P).

In step S19, when receiving the print job from the mobile terminal 10, the print function part 21 of the image forming apparatus 20 executes the print job to print the print-target data. The user may thus be able to use the image forming apparatus 20 to print the desired print-target data.

In the print system 1 according to the first embodiment, the mobile terminal 10 transmits the authentication information 800 to the image forming apparatus 20 and acquires the communications information in accordance with the authenticated result. The mobile terminal 10 subsequently performs communications with the image forming apparatus 20 using zero (null) or more pieces of communications information to perform printing. Specifically, the mobile terminal 10 selects one of the networks connected to the image forming apparatus 20, and performs printing by transmitting the print job to the image forming apparatus 20 via the selected one of the networks N1 and N2.

Connectability Determination Process

The following describes, with reference to FIGS. 10 to 12, a connectability determination process of step S11 in the above-described print process. The connectability determination process indicates a communications process performed with the image forming apparatus 20 utilizing the communications information 1000 (one or more of first communications information 1100 and second communications information 1300, or NULL) acquired by the information acquisition part 12. More specifically, the connectability determination process is a process of selecting one of the networks connected to the image forming apparatus 20 in order for the mobile terminal 10 to perform communications with the image forming apparatus 20 via the selected one of the networks.

FIG. 10 is a flowchart illustrating an example of a connectability determination process according to the embodiment. FIGS. 11A and 11B, and FIGS. 12A and 12B are diagrams illustrating screen examples of applications displayed on the display device 102 of the mobile terminal 10. The following illustrates a process flow illustrated in FIG. 10 with reference to FIGS. 11A and 11B, and FIGS. 12A and 12B.

The user initially selects print-target data from a list of the print-target data displayed on the display device 102 by the application. The print condition screen 901 is subsequently displayed on the display device 102 of the mobile terminal 10 as illustrated in FIG. 11A. The print condition screen 901 displays items including print-target data 902, an icon 903 of the image forming apparatus 20, the number of print sets 904, color/monochrome 905, and a sheet size 906. Each of the items of the number of print sets 904, the color/monochrome 905, and the sheet size 906 displays corresponding one of initial settings and holding the latest one of the settings set by the user. This configuration enables the user to cause the image forming apparatus 20 to print desired data by using the mobile terminal 10 based on desired settings (print conditions) with minimum setting change.

Note that an operating instructions advice 907 may include an icon 907*a* or a message 907*b* such as "touch MFP to start printing", and may encourage the user to hold the mobile terminal 10 at a position close to the NFC chip of the image forming apparatus 20. Placing the mobile terminal 10 close to the NFC chip of the image forming apparatus 20 causes the information acquisition part 12 of the mobile terminal 10 to transmit the authentication information 800 to the NFC reader-writer 213, and receive the communications information 1000 from the NFC reader-writer 213. The process of FIG. 10 starts by acquisition of the communications information 1000.

In step S701 of FIG. 10, the connectability determination part 13 of the mobile terminal 10 determines whether the mobile terminal 10 has successfully acquired the first communications information 1100 from the image forming apparatus 20. Note that whether the mobile terminal 10 has successfully acquired the first communications information 1100 may be determined based, for example, on the ID for identifying the communications information, a flag indicating the employee-specific communications information, or the like. Specifically, when the mobile terminal 10 has successfully acquired the ID indicating the first communications information 1100 or the flag indicting the employee-specific communications information, the connectability determination part 13 determines that the first communications information 1100 has been successfully acquired. When the first communications information 1100 has been successfully acquired, step S702 is processed, but when the acquisition of the first communications information 1100 has failed, step S705 is processed.

Note that the first communications information 1100 may be identified without using the ID or the flag. More specifically, when respective positions of the first communications information 1100 and second communications information 1300 in the data received by the information acquisition part 12 are predetermined, the first communications information 1100 may be acquired based on the stored position of the first communications information 1100. Alternatively, when the first communications information 1100 is configured to exclude the SSID or password, the first communications information 1100 may be identified as the communications information 1000 without the SSID or password.

When the acquire communications information 1000 is a single piece of communications information, the connectability determination process may exclude steps S701 to S705 of FIG. 10, and may only perform steps from step S706 onward (steps S706 to step S709).

Step S702 indicates that the first communications information 1100 has been successfully acquired. The user is thus assumed to be the employee 8, and the connectability determination part 13 of the mobile terminal 10 transmits a communications request for communicating with the image forming apparatus 20 via the network N1 to the first communications part 151, based on the first communications information 1100 included in the communications information 1000.

When the first communications information 1100 includes information capable of identifying a network by such as an SSID, and the network currently connected to by the mobile terminal 10 is determined to differ from that network identifiable by the SSID, the currently connected network is switched to the network N1 that is identified by the acquired SSID.

The first communications part 151 then attempts to perform communications with the image forming apparatus 20 using the first communications information 1100. Since communications radio waves spread in space reach both the image forming apparatus 20 and an access point 7, the first communications part 151 attempts to perform communications with an apparatus (the image forming apparatus 20 in this example) indicated by the first IP address included in the first communications information 1100. Note that the mobile terminal 10 that is allowed to perform communications via 3G or LTE may attempt to perform communications with an apparatus indicated by the first IP address via a base station of the carrier.

The display device 102 of the mobile terminal 10 displays a connection progress screen 911 illustrated in FIG. 11B while the first communications part 151 attempts to perform communications with the image forming apparatus 20. The connection progress screen 911 displays an icon 912 and text 913 "connecting . . . " to indicate the mobile terminal 10 is currently attempting to connect to the image forming apparatus 20. The connection progress screen 911 also displays a cancel button 914 for the user to cancel the connection or the print job.

Referring back to FIG. 10, the connectability determination part 13 of the mobile terminal 10 determines whether the first communications part 151 has successfully performed communications with the image forming apparatus 20 via the network N1 based on the communications result of the first communications part 151 in step S703. When the first communications part 151 has successfully performed communications with the image forming apparatus 20 via the network N1, step S704 is processed, whereas the communications with the image forming apparatus 20 via the network N1 has failed, step S705 is processed.

Note that the connectability determination part 13 determines whether the communications with the image forming apparatus 20 has been successfully performed using the first communications information 1100 as follows. The illustration given below includes different use cases for convenience.

Use Case 1

The connectability determination part 13 does not determine that the mobile terminal 10 of the visitor 9 has successfully acquired the first communications information 1100 in step S701. Thus, the use case 1 does not determine whether the communications have been successfully performed in step S703.

Use Case 2

In most cases, the mobile terminal 10 is assumed to be able to successfully communicate with the image forming apparatus 20 based on the first communications information 1100 while the mobile terminal 10 of the employee 8 is connected to the company's internal LAN.

However, the mobile terminal 10 of the employee 8 may be unable to connect to the image forming apparatus 20 using the first communications information 1100 while the mobile terminal 10 of the employee 8 is not connected to the company's internal LAN. When the mobile terminal 10 of the employee 8 has attempted to perform communications with the image forming apparatus 20 via a network such as LTE or 3G, which differs from the company's internal LAN, the following statuses may be obtained.

(i) There is an apparatus (the image forming apparatus 20 or another apparatus) corresponding to the IP address indicated by the first communications information of the accidentally accessed network. Hence, the mobile terminal 10 is connectable to apparatuses but the connectable apparatus is not necessarily a desired image forming apparatus 20. This indicates that there is no use in transmitting the process request to this kind of connectable apparatus.

(ii) There is no apparatus corresponding to the IP address indicated by the first communications information of the accidentally accessed network.

Hence, in order to determine that the mobile terminal 10 securely performs communications with the image forming apparatus 20 and is not in the above (i) or (ii) status, one of the following (1) to (3) processes may be performed.

(1) The first communications part 151 attempts to acquire management information base (MIB) information of the image forming apparatus 20 via the network N1. When the first communications part 151 successfully acquires the MIB information, the connectability determination part 13 of the mobile terminal 10 determines that the mobile terminal 10 successfully performs communications with the image forming apparatus 20. On the other hand, when the first communications part 151 fails to acquire the MIB information, the connectability determination part 13 determines that the mobile terminal 10 has failed to perform communications with the image forming apparatus 20. The MIB information may be a standard MIB or an extended MIB. The successful acquisition of the standard MIB indicates that the mobile terminal 10 may be able to perform data communications with some apparatus (including the possibility of it being the image forming apparatus 20). The successful acquisition of the extended MIB indicates that the mobile terminal 10 may be able to perform data communications with the image forming apparatus 20 expected by the applications of the mobile terminal 10 (the applications of the mobile terminal 10 are created based on the expected model or manufacturer of the image forming apparatus 20). Note that even if the MIB information is successfully acquired, apparatus information included in the acquired MIB information may differ from apparatus information of the desired communications-target image forming apparatus 20 (included, for example, in the communications information 1000 acquired from the NFC reader-writer 213). In such a case, the connectability determination part 13 of the mobile terminal 10 may determine that the mobile terminal 10 has failed to perform communications. The connectability determination part 13 of the mobile terminal 10 may thus be able to securely determine that the mobile terminal 10 successfully performs communications with the image forming apparatus 20 having the NFC reader-writer 213 that has read the communications information 1000. Note that the apparatus information may indicate information that uniquely identifies the image forming apparatus 20, such as a manufacturer-specific number (a serial number) of the image forming apparatus 20, or a media access control (MAC) address of the image forming apparatus 20.

(2) The first communications part 151 attempts to acquire apparatus information utilizing a web application programming interface (Web API) provided by the image forming apparatus 20 via the network N1. The Web API indicates a set of arrangements (process request method or data specification method) for an apparatus A and an apparatus B to perform processes via a network. The information storage 16 of the mobile terminal 10 stores the Web API in advance. When the apparatus information is successfully acquired, the connectability determination part 13 of the mobile terminal 10 determines that the mobile terminal 10 successfully performs communications with the image forming apparatus 20. On the other hand, when the apparatus information is not successfully acquired, the connectability determination part 13 of the mobile terminal 10 determines that the mobile terminal 10 has failed to perform communications with the image forming apparatus 20. Specifically, when the Web API is not unique to the manufacturer of the image forming apparatus 20, the connectability determination part 13 determines that the mobile terminal 10 may be able to perform data communications with some apparatus (including the possibility of it being the image forming apparatus 20). When the Web API is unique to the manufacturer of the image forming apparatus 20, the connectability determination part 13 determines that the mobile terminal 10 may be able to perform data communications with the image forming apparatus 20 expected by the applications of the mobile terminal 10 by acquiring the apparatus information. Note that when the apparatus information is successfully acquired, but the acquired apparatus information differs from the apparatus information of the desired image forming apparatus 20, the connectability determination part 13 may determine that the mobile terminal 10 has failed to perform communications with the image forming apparatus 20. The connectability determination part 13 of the mobile terminal 10 may thus be able to securely determine that the mobile terminal 10 successfully performs communications with the image forming apparatus 20 having the NFC reader-writer 213 that has read the communications information 1000.

(3) The first communications part 151 attempts to acquire the MAC address of the image forming apparatus 20 based on an address resolution protocol (ARP) via the network N1. When the MAC address is successfully acquired, the connectability determination part 13 of the mobile terminal 10 determines that the mobile terminal 10 successfully performs communications with the image forming apparatus 20. On the other hand, when the MAC address is not successfully acquired, the connectability determination part 13 of the mobile terminal 10 determines that the mobile terminal 10 has failed to perform communications with the image forming apparatus 20. The successful acquisition of the MAC address indicates existence of the apparatus (the image forming apparatus 20) indicated by the IP address included in the communications information 1000, which enables the connectability determination part 13 to determine that the mobile terminal 10 successfully performs communications with the image forming apparatus 20 having the NFC reader-writer 213 with high accuracy. Note that when the MAC address is successfully acquired but the acquired MAC address differs from the MAC address of the image forming apparatus 20 (acquired via the NFC reader-writer 213), the connectability determination part 13 may determine that the mobile terminal 10 has failed to perform communications with the image forming apparatus 20. The connectability determination part 13 may thus be able to determine that the mobile terminal 10 successfully performs communications with the image forming apparatus 20 having the NFC reader-writer 213 with high accuracy.

The mobile terminal 10 may be able to securely determine that the connected apparatus is the image forming apparatus 20 capable of accepting a process request; that is, the mobile terminal 10 may be able to securely determine that the mobile terminal 10 is connected to the image forming apparatus 20 via the network N1.

Note that when communication error has been generated in one of the processes (1) to (3), the connectability determination part 13 may have attempted to perform the corresponding process again. When the connectability determination part 13 determines that the communications by the processes (1) to (3) have failed, the connectability determination part 13 may be able to determine that the communications have failed with only the first attempt.

The use case 2 occasionally observes a case where packets transmitted by the mobile terminal 10 of the employee 8 fail to reach the image forming apparatus 20. Such a case may be caused by cut off of the power of the router in a route from the access point 7 closest to the mobile terminal 10 to the image forming apparatus 20 or by failing to reflect (send) the changed IP address of the image forming apparatus 20 to the communications information DB 31.

In these cases, the connectability determination part 13 may determine that the mobile terminal 10 is unable to communicate with the image forming apparatus 20 based on the first communications information 1100 by detecting timeout or communications error (e.g., detecting a returned status code 400 in HTTP).

In step S704, when the mobile terminal 10 successfully performs communications with the image forming apparatus 20 via the network N1, the connectability determination part 13 of the mobile terminal 10 determines that the mobile terminal 10 performs communications with the image forming apparatus 20 via the network N1 based on the first communications information 1100 included in the communications information 1000.

In such a case, the display device 102 of the mobile terminal 10 displays a transmission complete screen 921 as illustrated in FIG. 12A. The transmission complete screen 921 indicates that transmission of the print job from the mobile terminal 10 to the image forming apparatus 20 has completed. The transmission complete screen 921 displays a message 922 indicating "transmission complete" and an icon 923 indicating that the transmission is complete. The transmission complete screen 921 stops being displayed automatically after a predetermined time, and the print condition screen 901 illustrated in FIG. 11A is displayed. Note that the print condition screen 901 illustrated in FIG. 11A may be displayed by the user's depressing (touching) the icon 923.

The subsequent illustration is given by referring back to FIG. 10. When the connectability determination part 13 of the mobile terminal 10 determines that the first communications information is not successfully acquired in step S701, or when the connectability determination part 13 determines that the communications have failed in step S701, step S705 is processed.

In step S705, the connectability determination part 13 of the mobile terminal 10 determines whether the mobile terminal 10 has acquired the second communications information 1300 from the image forming apparatus 20. Note that whether the mobile terminal 10 has successfully acquired the second communications information 1300 may be determined based, for example, on the ID for identifying the communications information, a flag indicating the visitor-specific communications information, or the like. Note that the second communications information 1300 may be identified without using the ID or the flag. More specifically, when respective positions of the first communications information 1100 and second communications information 1300 in the data received by the information acquisition part 12 are predetermined, the second communications information 1300 may be acquired based on the stored position of the second communications information 1300. Or when the first communications information 1100 does not include the SSID or password and only the second communications information 1300 includes the SSID or password, the second communications information 1300 may be identified as the communications information 1000 having the SSID or password. When the second communications information 1300 has been successfully acquired, step S706 is processed, but when the acquisition of the second communications information 1300 has failed, step S709 is processed.

The mobile terminal 10 may be able to acquire the second communications information 1300 when the accessibility information 1200 is "YES". The connectability determination part 13 of the mobile terminal 10 may thus be able to determine whether the mobile terminal 10, though being connectable to the image forming apparatus 20 via the network N2 that is the Wi-Fi Direct P2P, is authorized for P2P connection. This process is performed because, in addition to the above-described fee charge reason, the security level of the connection via the P2P is generally lower than the connection via the company's internal LAN with the wireless LAN. More specifically, when the mobile terminal 10 of the employee 8 fails to connect to the network N1, the employee 8 will not be allowed to connect via the P2P even temporarily. The security level may thus be improved based on the accessibility information 1200.

In step S706, the connectability determination part 13 of the mobile terminal 10 transmits to the second communications part 152 a communications request for performing communications with the image forming apparatus 20 via the network N2 based on the second communications information 1300. The second communications part 152 subsequently attempts to perform communications with the image forming apparatus 20 via the network N2 based on the second communications information 1300. Specifically, the second communications part 152 attempts to perform communications with the image forming apparatus 20 indicated by the second IP address included in the second communications information 1300.

In step S707, the connectability determination part 13 of the mobile terminal 10 determines whether the second communications part 152 has successfully performed communications with the image forming apparatus 20 via the network N2 based on the communications result of the second communications part 152. When the second communications part 152 has successfully performed communications with the image forming apparatus 20 via the network N2, step S708 is processed, whereas the communications with the image forming apparatus 20 via the network N2 has failed, step S709 is processed. The connection progress screen 911 illustrated in FIG. 11B continues to be displayed while step S707 is processed.

Note that the connectability determination part 13 determines whether the communications with the image forming apparatus 20 has been successfully performed using the second communications information 1300 as follows. The determination in step S706 may similarly be performed in both the use cases 1 and 2.

Specifically, both the mobile terminal 10 of the visitor 9 and the mobile terminal 10 of the employee 8 may be able to use the second communications information 1300 to transmit packets to the image forming apparatus 20 and receive packets from the image forming apparatus 20. Thus, this is determined based, for example, on the determination criteria (1) to (3) of step S702

Note that occasionally, the mobile terminal 10 may fail to transmit packets to the image forming apparatus 20 or receive packets from the image forming apparatus 20 due to the power not being supplied to the network I/F 215 of the image forming apparatus 20 or due to the communications failure occurred in the network I/F 215. In such cases, the connectability determination part 13 of the mobile terminal 10 determines that the mobile terminal 10 is unable to perform communications with the image forming apparatus 20 based on the second communications information 1300 by detecting no response, timeout, or a communication error from the image forming apparatus 20.

In step S708, when the mobile terminal 10 successfully perform communications with the image forming apparatus 20 via the network N2, the connectability determination part 13 of the mobile terminal 10 determines that the mobile terminal 10 performs communications with the image forming apparatus 20 via the network N2 based on the second communications information 1300 included in the communications information 1000.

In such a case, the display device 102 of the mobile terminal 10 displays the transmission complete screen 921 of FIG. 12A. Specifically, since the display device 102 of the mobile terminal 10 displays the same transmission complete screen 921 regardless of the print job being transmitted via the network N1 or the network N2, the user does not need to pay attention to the network being used. Note that the mobile terminal 10 may display on the display device 102 one of the network N1 or the network N2 when the print job is transmitted. The user serving as the employee 8 may thus be able to check whether the print job is transmitted via the company's internal LAN having the high security level. Further, the user serving as the visitor may be able to recognize that the own print job is transmitted via the P2P network.

Referring back to FIG. 10, when the mobile terminal 10 fails to perform communications with the image forming apparatus 20 via either the network N1 or network N2, the connectability determination part 13 of the mobile terminal 10 determines that the mobile terminal 10 is unable to perform communications with the image forming apparatus 20.

In such a case, the display device 102 of the mobile terminal 10 displays a communications failure screen 931 as illustrated in FIG. 12B. The communications failure screen 931 displays a message 932 indicating "cannot connect to apparatus", and an OK button 933. When the user depresses (touches) the OK button 933, the display device 102 displays the print condition screen 901 of FIG. 11A.

The print system 1 of the first embodiment enables, as illustrated in the flowchart of FIG. 10, the mobile terminals 10 of the users to automatically select appropriate networks as well as reducing burdens on the users to set the first communications information 1100 and the second communications information 1300 with respect to the image forming apparatuses 20 that are connected to the networks. Since the user who is the employee 8 is able to acquire the first communications information 1100, the mobile terminal 10 of the employee 8 initially attempts to perform communications with the image forming apparatus 20 via the network N1, and only attempts to perform communications with the image forming apparatus 20 via the network N2 when the communications attempted via the network N1 fails. This allows the employee 8 to perform communications via the safer network N1 with high priority as well as allowing the employee 8 to perform communications via the less safe network N2 with low priority. The print system 1 of the first embodiment may also prevent the mobile terminal 10 of the user who is the visitor 9 from connecting to the network N1 of the company's internal LAN, but may allow the mobile terminal 10 of the visitor 9 to perform communications via the network N2.

Other Aspects of Communications Information

In the above system, the connectability determination part 13 attempts to perform communications with the image forming apparatus 20 using the first communications information 1100 in step S702, and attempts to perform communications with the image forming apparatus 20 using the second communications information 1300 in step S706. This illustrates that the order of access to the first communications information 1100 and the second communications information 1300 is fixed to the recording order (e.g., address order) of the first communications information 1100 and the second communications information 1300 in the communications information 1000 of FIG. 7.

The following illustrates a case where the connectability determination part 13 attempts to perform communications with the image forming apparatus 20 with the second communications information 1300 first, and attempts to perform communications with the image forming apparatus 20 with the first communications information 1100 second. Note that the accessibility information 1200 and 1400 are both assumed to be "YES".

Use Case 1

The mobile terminal 10 of the visitor 9 acquires the second communications information 1300 alone. Step S701 determines whether the second communications information 1300 has been acquired. The connectability determination part 13 subsequently attempts to perform communications with the image forming apparatus 20 using the second communications information 1300, and the mobile terminal 10 of the visitor 9 successfully performs communications with the image forming apparatus 20 with the second communications information 1300 as a result.

Use Case 2

The mobile terminal 10 of the employee 8 acquires both the first communications information 1100 and the second communications information 1300. Step S701 determines whether the second communications information 1300 has been acquired. The connectability determination part 13 initially attempts to perform communications with the image forming apparatus 20 using the second communications information 1300. The mobile terminal 10 of the employee 8 successfully performs communications with the image forming apparatus 20. However, constantly allowing the mobile terminal 10 of the employee 8 connect to the network N2 is not desirable.

Thus, this system may be convenient for the visitors 9 but may undesirably allow the employees 8 to have access to the network N2. The order of the communications information used for attempting to perform communications may preferably be the first communications information 1100 for the employees first, and the second communications information 1300 for the visitors second.

The above aspect may similarly be applied to a case when the communications information 1000 includes third communications information. Specifically, when the third communications information is employee-specific communications information, the third communications information is desirably used for attempting to perform communications prior to the second communications information 1300. On the other hand, when the third communications information is visitor-specific communications information, the third communications information is desirably used for attempting to perform communications after the first communications information 1100.

As a technique to control the connecting order of the communications information, the communications information 1000 may be provided with flags to indicate whether the communications information is the employee-specific communications information or the visitor-specific communications information. Alternatively, the employee-specific communications information may be provided with higher priority than that of the employee-specific communications.

TABLE 4

| PRIORITY | ITEM NAME | ITEM VALUE | |
|---|---|---|---|
| 1 | FIRST IP ADDRESS | 192.168.20.1 | 1100 |
|   | SSL COMMUNICATIONS | YES | |
|   | ... | | |
| 3 | ACCESSIBILITY TO NETWORK N2 | YES | 1200 |
|   | SECOND IP ADDRESS | 192.160.0.3 | 1300 |
|   | SSID | 123ABC | |
|   | ENCRYPTION SYSTEM | WPA/WPA2-PSK | |
|   | PASSWORD | ****** | |
|   | HTTP PORT NUMBER | 80 | |
|   | HTTPS PORT NUMBER | 443 | |
|   | ... | | |
| 2 | ACCESSIBILITY TO NETWORK N3 | YES | 1400 |
|   | THIRD IP ADDRESS | 192.160.0.10 | 1500 |
|   | SSID | 987XYZ | |
|   | ENCRYPTION SYSTEM | WPA/WPA2-PSK | |
|   | PASSWORD | ****** | |
|   | HTTP PORT NUMBER | 80 | |
|   | HTTPS PORT NUMBER | 443 | |
|   | ... | | |

Table. 4 is a diagram illustrating an example of communications information. Table 4 indicates priority 1 being applied to the first communications information 1100 of the network N1, priority 3 being applied to the second communications information 1300 of the network N2, and priority 2 being applied to third communications information 1500 of the network N3, among the multiple networks. When priority levels are applied to respective pieces of information (e.g., first, second, and third communications information) of the communications information 1000, the image forming apparatus 20 transmits the communications information 1000 together with the applied priority levels to the mobile terminal 10. The connectability determination part 13 attempts to perform communications with the image forming apparatus 20 using the communications information in the order of the first communications information 1100 (network N1), the third communications information 1500 (network N3), and the second communications information 1300 (network N2).

Note that when the priority level of 1 or lower is set to the company's internal communications information for the applications, the connectability determination part 13 may be able to attempt to initially connect to the company's internal communications information.

In such a case, the communications information providing part 28 of the image forming apparatus 20 may acquire the communications information from the communications information DB 31 as noted below. Note that the accessibility information 1200 and 1400 are both assumed to be "YES".

Authentication Ok

To acquire the communications information with the priority being set at a threshold or lower (1 or lower) and the communications information with the priority being set at higher than the threshold (higher than 1). The priority being set at the threshold or lower indicates "the priority being a predetermined level or higher", and the priority being set at higher than the threshold indicates "the priority being lower than the predetermined level".

Authentication Ng

To acquire the communications information with the priority being set at higher than the threshold (higher than 1).

FIG. 13 is a flowchart illustrating an example of a connectability determination process based on priority. Note that FIG. 13 mainly illustrates the difference from FIG. 10.

When the communications information having the priority being set at the threshold or lower is acquired in step S801, the connectability determination part 13 attempts to perform communications using the communications information having the priority being set at the threshold or lower (step S802). The communications information is naturally connected in the order of the priority levels.

In the connectability determination part 13, as illustrated in step S802, all the communications information having the priority being set at the threshold or lower have attempted to be used for performing communications. When there is communications information with which the mobile terminal 10 is capable of performing communications ("YES" in step S803), among all the communications information, the connectability determination part 13 determines that the communications is performed by the communications part 15 corresponding to such communications information as illustrated in step S804.

When the mobile terminal 10 fails to perform communications using the communications information having the priority being set at the threshold or lower ("YES" in step S8100), step S805 is processed, and connections are attempted using the communications information having the priority being set at higher than the threshold in the order of priority (step S806).

When the communications information having the priority being set at the threshold or lower is not acquired in step S801, connections are attempted using all the communications information having the priority being set at higher than the threshold in step S805 and step S806. When there is communications information with which the mobile terminal 10 is capable of performing communications (YES in step S807), among all the communications information, the connectability determination part 13 determines that the communications is performed by the communications part 15 corresponding to such communications information as illustrated in step S808. When the determination in step S8200 is YES, step S809 is processed.

The print system 1 may thus enable the mobile terminal 10 of the employee 8 to connect to the company's internal network N1 and enable the mobile terminal 10 of the visitor 9 to connect to the P2P network N2, based on the priority.

Communications Attempted Based on IP Address

The connectability determination part 13 of the mobile terminal 10 may be able to determine to perform communications with the image forming apparatus 20 via a desired one of networks, based on an IP address of the mobile terminal 10 and an IP address of the image forming apparatus 20. For example, assume that the IP address of the mobile terminal 10 is "192.160.0.4", a first IP address of the image forming apparatus 20 connected to the network N1 is "192.160.0.3", and a second IP address of the image forming apparatus 20 connected to the network N2 is "192.168.20.1". In the above case, the network N1 having the same subnetwork address part "192.160.0.0" for the users of the image forming apparatus 20 may be set as a network capable of being communicated with the employee-specific communications information, whereas the network N2 may be set as a network capable of being communicated with the visitor-specific communications information.

When the authentication is "OK", the communications information providing part 28 of the image forming apparatus 20 acquires from the communications information DB 31 the communications information of IP addresses having the same subnetwork address as the employee-specific communications information, and acquires the communications information having IP addresses other than the above IP addresses as the visitor-specific communications information. When the authentication is "NG", the communications information providing part 28 of the image forming apparatus 20 acquires the communications information having the IP address other than the above IP address having the different subnetwork addresses as the visitor-specific communications information.

When the mobile terminal 10 is able to acquire the communications information of the IP address having the subnetwork address identical to that of its own IP address, the mobile terminal 10 determines to have acquired the employee-specific communications information.

Performing communications with the image forming apparatus 20 via the network N1 indicates performing the communications within the identical subnetwork. This may be able to prevent the network traffic from increasing.

Outline

In the print system 1 according to the first embodiment, the mobile terminal 10 transmits the authentication information 800 to the image forming apparatus 20 and acquires zero or more pieces of the communications information in accordance with the authenticated result. The mobile terminal 10 subsequently performs communications with the image forming apparatus 20 based on the acquired zero or more pieces of communications information to perform printing. Specifically, the mobile terminal 10 selects one of the networks connected to the image forming apparatus 20, and performs printing by transmitting the print job to the image forming apparatus 20 via the selected one of the networks. This configuration may enable the mobile terminal 10 of the user to perform communications via the appropriate network without setting the communications information of the multiple networks in the own mobile terminal 10. Thus, the users and the administrators of the print system 1 may have less management burden. Further, the image forming apparatus 20 capable of receiving the process requests of the terminals from the multiple networks may be able to transmit an appropriate one of communications information 1000 in accordance with the user of the mobile terminal 10 when transmitting the communications information 1000 for connecting to the image forming apparatus 20 to the mobile terminal 10.

The present invention is not limited to the examples or the embodiment disclosed above. Various modifications or alteration may be made without departing from the scope of the claims of the present invention.

Second Embodiment

The first embodiment illustrates the print system 1 in which the image forming apparatus 20 is configured to authenticate the user (the mobile terminal 10 of the user). A second embodiment illustrates a print system 1 in which an authentication server is configured to authenticate the user (the mobile terminal 10 of the user).

In the following description, components provided with the same reference numerals serve as the same functions of the above-described components; duplicated illustration of the same components is omitted and only the difference will be described below.

Hardware Configuration

FIG. 14 is a diagram illustrating a hardware configuration example of an authentication server 80. The authentication server 80 is an example of an authentication apparatus. The authentication server 80 includes a CPU 301, a ROM 302, a RAM 303, an HDD 305, a display 308, a network I/F 309, a keyboard 311, a mouse 312, a media drive 307, and an optical drive 314 that are connected to a bus 310. The CPU 301 is configured to control overall operations of the authentication server 80 by executing a program 320 stored in an HD 304. The ROM 302 is configured to store programs such as IPL for driving the CPU 301. The RAM 303 is configured to serve as a work area for the CPU 301. The HD 304 is a storage device having nonvolatile memory that stores the program 320 for use in authentication, OS and the like.

The HDD 305 is configured to control reading or writing of various types of data with respect to the HD 304 based on the control of the CPU 301. The display 308 is configured to display various types of information such as cursor, menus, windows, characters and images. The network I/F 309 serves as an interface with networks such as a LAN or the Internet. The keyboard 311 or mouse 312 is an input device; the keyboard 311 includes multiple keys for a user to input characters, numeric values, and various types of instructions, and is configured to receive the input characters, numeric values, and various types of instructions. The mouse 312 is configured to move a mouse pointer, select or execute various types of instructions, and configured to receive the selection of a process target.

The media drive 307 is configured to control reading or writing (storing) of data with respect to a medium 306 such as flash memory. The optical drive 314 is configured to control reading or writing of various types of data with respect to removable media such as a compact disc read only memory (CD-ROM) 313.

Note that the above-described program 320 may be distributed in a form of a computer-readable recording medium such as the recording medium 306, the CDROM 313, and the like storing the programs in files of an installable format or executable format. Alternatively, the program 320 may be distributed in a format to be downloaded from a server-type information processing apparatus.

Note that the authentication server 80 may be implemented by cloud computing. This indicates that the hardware of the authentication server 80 does not necessarily have a physical entity of an apparatus covered with a case but merely represents hardware-like components desirable for the authentication server 80.

Software Configuration

The print system 1 according to the second embodiment may be represented by a functional block diagram illustrated in FIG. 15. FIG. 15 is a functional block diagram illustrating an example of the print system 1 according to the second embodiment. The print system 1 according to the second embodiment differs from the print system 1 according to the first embodiment illustrated in FIG. 5 as follows. The print system 1 according to the second embodiment includes the authentication 80 having a transmitter-receiver 81, an authentication processor 27, and an authentication DB 29.

The transmitter-receiver 81 is implemented by the CPU 301, the network I/F 309, and the like illustrated in FIG. 14, and configured to perform communications between the authentication server 80 and the image forming apparatus 20. The function of the authentication processor 27 is similar to that of the authentication processor 27 of the image forming apparatus 20 illustrated in the first embodiment. The authentication information table stored in the authentication DB 29 is similar to that stored in the authentication DB 29 of the image forming apparatus 20 illustrated in the first embodiment. Specifically, the authentication server 80 is configured to authenticate users instead of the image forming apparatus 20.

Details of Process

The following illustrates details of the process of the print system 1.

From Authentication to Acquisition of Communications Information

Initially a description is given of a process flow of the print system 1 from authentication to acquisition of communications information. FIG. 16 is a sequence diagram illustrating an example of a print process according to the second embodiment. Note that steps S101 to S103 are similar to steps S1 to S3 illustrated in FIG. 7 of the first embodiment. Illustration of S101 to S103 is thus omitted, and steps from S104 onward are illustrated.

In step S104, the information reader 33 of the NFC reader-writer 213 sends the acquired authentication request and authentication information (the employee ID and password) 800 to the transmitter-receiver 24 of the image forming apparatus 20 via the reader-writer communications part 25.

In step S105, the transmitter-receiver 24 of the image forming apparatus 20 sends the authentication request and authentication information (the employee ID and password) 800 to the authentication server 80.

In step S106, the authentication processor 27 searches the authentication DB 29 by the authentication information (the employee ID and password) 800 to determine whether the authentication DB 29 includes (registers) the same employee ID and password combination. The authentication processor 27 generates an authentication result (OK or NG) based on the search (detected) result.

In step S107, the authentication processor 27 of the authentication server 80 sends the authentication result (OK or NG) to the transmitter-receiver 24 of the image forming apparatus 20.

In step S108, the transmitter-receiver 24 of the image forming apparatus 20 sends the authentication result (OK or NG) to the communications information providing part 28.

In step S109, the communications information providing part 28 of the image forming apparatus 20 reads communications information 1000 from the communications information DB 31 based on the authentication result (OK or NG). The communications information 1000 is already illustrated in the first embodiment.

In step S100, the communications information providing part 28 sends the communications information 1000 to the NFC reader-writer 213 via the reader-writer communications part 25.

In step S110, the information writer 32 of the NFC reader-writer 213 sends the communications information 1000 to the information acquisition part 12 of the mobile terminal 10.

In step S120, the information acquisition part 12 of the mobile terminal 10 stores the communications information 1000 in the information storage 16.

In step S130, the information acquisition part 12 of the mobile terminal 10 sends a request to the connectability determination part 13 to determine the connectability using the communications information 1000.

The connectability determination process thereafter is the same and already described in the first embodiment with reference to FIGS. 9 and 10, and duplicated illustration is thus omitted.

The print system 1 according to the second embodiment enables the authentication server 80 to authenticate the users instead of the image forming apparatus 20. This configuration enables the authentication servers 80 fewer than the number of the image forming apparatuses 20 to authenticate the employees even though a large number of the image forming apparatuses 20 are disposed within the print system 1.

Note that FIG. 14 illustrates the authentication server 80 as an information processing apparatus; however, the authentication server 80 may be any apparatus that is provided with predetermined functions other than the authentication function.

Third Embodiment

The first embodiment already illustrates that the image forming apparatus 20 may be an apparatus such as an image projection apparatus (a projector). The third embodiment illustrates an example where the image forming apparatus 20 is an image projection apparatus (a projector).

In the following description, components provided with the same reference numerals serve as the same functions of the above-described components; duplicated illustration of the same components is omitted and only the difference will be described below.

FIG. 17 is a functional block diagram illustrating an example of the print system 1 according to the third embodiment. The configuration of the mobile terminal 10 in FIG. 17 is similar to that of the mobile terminal 10 illustrated in FIG. 5. However, the mobile terminal 10 of FIG. 17 is configured to perform communications with an image projection apparatus 22 instead of the image forming apparatus 20. The image projection apparatus 22 is provided with an NFC reader-writer 213, and the image projection apparatus 22 includes an image projector 23.

The image projection apparatus 22 is configured to modulate image data by a digital light processing (DLP) system or a liquid crystal system and project images onto a screen or a wall. The image data are transmitted from the mobile terminal 10 via a network N1 or a network N2. The image projector 23 is implemented by a CPU or a DLP or liquid crystal projection engine of the image projection apparatus 22, and configured to generate projection images based on the image data.

FIG. 18 is a sequence diagram illustrating an example of a print process according to the third embodiment. The sequence of the third embodiment may be similar to the sequence of the first embodiment illustrated in FIG. 7. Further, steps S112 to S113 in FIG. 18 in the third embodiment are similar to the steps S12 to S13 in FIG. 9. However, steps S114 to S119 in FIG. 18 in the third embodiment differ from the steps S14 to S19 in FIG. 9 in the first embodiment, and hence the following describes only steps S114 to S119.

In step S114, the connectability determination part 13 of the mobile terminal 10 transmits an image projection request to the first communications part 151.

In step S115, when the first communications part 151 of the mobile terminal 10 receives the image projection request in step S114, the first communications part 151 transmits the received image projection request to the image projection apparatus 22. More specifically, the mobile terminal 10 transmits image data to the image projection apparatus 22 via the network N1 (e.g., the company's internal LAN connected via the wireless LAN). The image data may, for example, be generated based on the image currently displayed on the display device 102 of the mobile terminal 10, or may be generated based on the image selected by the user.

In step S116, when the image projector 23 of the image projection apparatus 22 receives the image projection request from the mobile terminal 10, the image projector 23 projects the corresponding image. The user may thus be able to use the image projection apparatus 22 to project the desired data.

In step S117, the connectability determination part 13 of the mobile terminal 10 transmits an image projection request to the second communications part 152.

In step S118, when the second communications part 152 of the mobile terminal 10 receives the image projection request, the second communications part 152 transmits the received image projection request to the image projection apparatus 22. More specifically, the mobile terminal 10 transmits a print job to the image projection apparatus 22 via the network N2 (e.g., the Wi-Fi Direct P2P).

In step S119, when the image projector 23 of the image projection apparatus 22 receives the image projection request from the mobile terminal 10, the image projector 23 projects the corresponding image. The user may thus be able to use the image projection apparatus 22 to project the desired data.

Note that when the mobile terminal 10 causes the image forming apparatus 20 to perform printing, the mobile terminal 10 may merely transmit the print job to the image forming apparatus 20, and wait until the printing is complete. By contrast, when the mobile terminal 10 causes the image projection apparatus 22 to project an image, the mobile terminal 10 needs to project the image multiple times.

For example, when the mobile terminal 10 updates a still image displayed on the display device 102 (e.g., switches, enlarges, reduces images, and changes a display range), or when the user reselects the image, the mobile terminal 10 transmits image data. When the mobile terminal 10 displays a video (moving images) on the display device 102, the mobile terminal 10 periodically acquires images to generate image data and transmits the generated image data. Note that the format of the image data may be any format such as JPEG, TIFF, GIF, and PNG insofar as the format is compatible with the image projection apparatus 22.

Further, the mobile terminal 10 may transmit a file including images without any conversion processing or the like. For example, the mobile terminal 10 may transmit a PDF file, an MPEG file, and the like without any conversion processing. In such a case, the image projection apparatus 22 opens the received file, converts the file into images, and projects the converted images.

As described above, the print system 1 according to the third embodiment may be able to perform communications with an appropriate network that performs wireless communications with the mobile terminal 10 to transmit necessary data such as the image data, in addition to the effect obtained in the first embodiment.

Fourth Embodiment

The following describes a print system 1 according to a fourth embodiment. In the print system 1 according to the fourth embodiment, the mobile terminal 10 constructs a server, and the image forming apparatus 20 transmits a request to the server, which enables the mobile terminal 10 to acquire an IP address of the image forming apparatus 20 in the network N1 or the network N2.

Software Configuration

FIG. 19 is a functional block diagram illustrating an example of the print system 1 according to the fourth embodiment. In the print system 1 according to the fourth embodiment, components provided with the same reference numbers of the print system 1 according to the first embodiment illustrated in FIG. 5 implement the same functional components. Hence, merely main components of the fourth embodiment may be described.

Functionality of Mobile Terminal

The mobile terminal 10 of the fourth embodiment newly includes a near field communications part 41, a job controller 42, a network switcher 43, and a server constructor 44. Note that a server part 44a illustrated with a broken line will be described later.

The near field communications part 41 may be implemented by the CPU 106, the near field wireless communications device 109, and the like illustrated in FIG. 3, and is configured to wirelessly perform communications with the image forming apparatus 20 located within a distance range of several meters. As will be described later, main information received by the near field communications part 41 includes the second communications information 1300, and main information transmitted by the near field communications part 41 includes later-described URL information 5000, an employee ID, and a password. The near field communications part 41 performs communications in accordance with communication standards of the Bluetooth (registered trademark) low energy (hereinafter called "BLE"); however, a description of its communications procedure is known to the public and is thus omitted.

In addition, the second communications information 1300 does not include the second IP address in the fourth embodiment. Table 5 illustrates an example of the second communications information 1300 according to the fourth embodiment.

TABLE 5

| NETWORK N2 | |
|---|---|
| ITEM NAME | ITEM VALUE |
| SSID | 456DEF |
| PASSWORD | ****** |
| ENCRYPTION SYSTEM | WPA/WPA2-PSK |
| HTTP PORT NUMBER | 80 |
| HTTPS PORT NUMBER | 443 |
| PORT NUMBER OF MOBILE TERMINAL SERVER | 50000 |
| ... | ... |

} 1300

Table 5 illustrates the second communications information 1300 that includes no IP address of the image forming apparatus 20. This is because the IP address of the image forming apparatus 20 is reported from the image forming apparatus 20 to the mobile terminal 10 when the image forming apparatus 20 performs communications with the server part 44a of the mobile terminal 10. Further, the second communications information 1300 includes a port number of the mobile terminal 10.

The job controller 42 may be implemented by the CPU 106, and the like illustrated in FIG. 3, and is configured to perform processes such as requesting the image forming apparatus 20 to execute a job such as printing.

When the connectability determination part 13 determines that the mobile terminal 10 is unable to connect to the network N1, the network switcher 43 switches a connecting destination of the mobile terminal 10 from the network N1 (or another network currently connected to by the mobile terminal 10) to the network N2. Specifically, the network switcher 43 creates the second communications part 152 to which the second communications information 1300 is applied (i.e., sets the second communications information 1300 in the second communications part 152). However, such network switching may require the user's authorization or the user's operations depending on the OS of the mobile terminal 10. Note that the mobile terminal 10 may be connected to none of the networks. In such a case, the mobile terminal 10 may be connected to the network N2.

The server constructor 44 may be implemented by the CPU 106, or the like illustrated in FIG. 3, and is configured to construct a server in the mobile terminal 10. The constructed server is the server part 44a. Constructing a server indicates preparation of a response to a request from HTTP (or HTTPS). The function of the server part 44a will be described later with reference to FIG. 21. In general, the mobile terminal 10 is configured to be not accessible from outside (e.g., from the image forming apparatus 20) due to security reasons. However, the communications may be performed with the mobile terminal 10 from outside via HTTP communications by constructing the server part 44a.

Further, the server constructor 44 creates the URL information 5000 for accepting the communications with the constructed server part 44a. The URL information 5000 includes information for the image forming apparatus 20 to generate a URL. A method for creating the URL information 5000 will be described with reference to FIG. 20. The URL information 5000 is transmitted by the near field communications part 41 to the image forming apparatus 20.

Image Forming Apparatus

The image forming apparatus 20 according to the fourth embodiment newly includes a communications part 35 and a near field communications part 36. The near field communications part 36 may be implemented by the CPU 201, the near field wireless communications device 217, and the like illustrated in FIG. 4, and is configured to wirelessly perform communications with the mobile terminal 10 located within a distance range of several meters. As will be described later, main information received by the near field communications part 36 includes the URL information 5000, the employee ID, and the password, and main information transmitted by the near field communications part 36 includes the second communications information 1300.

The communications part 35 includes a third communications part 351 and a fourth communications part 352. The third communications part 351 is configured to connect to the network N1 to perform communications with the mobile terminal 10, and the fourth communications part 352 is configured to connect to the network N2 to perform communications with the mobile terminal 10. The third communications part 351 includes the IP address of the first communications information 1100 in the first to the third embodiments, the fourth communications part 352 includes the IP address of the second communications information 1300 in the first to the third embodiments.

Note that the fourth embodiment is based on the assumption that the near field wireless communications device 109 and the near field wireless communications device 217 are configured to perform communications using BLE. The fourth embodiment does not require the NFC reader-writer 213 accordingly. However, the near field wireless communications device 109 and the near field wireless communications device 217 may be configured to use the NFC reader-writer 213 or infrared radiation.

URL Information 5000

The following illustrates the URL information 5000 with reference to FIG. 20. FIG. 20 is a diagram illustrating examples of URL information and a URL. The URL information 5000 created by the server constructor 44 of the mobile terminal 10 includes three pieces of information, including an IP address of the mobile terminal 10, a port number, and one-time password.

The IP address of the mobile terminal 10 indicates an IP address fixed to the mobile terminal 10 or an IP address assigned by a DHCP server. The IP address may be detected by a command such as "ipconfig", and known to the mobile terminal 10.

The port number indicates a "port number of a server of the mobile terminal 10" in the second communications information 1300 transmitted from the image forming apparatus 20. The port number is used for allowing the mobile terminal 10 to be ready to receive communications from the image forming apparatus 20.

The one-time password indicates information used by the mobile terminal 10 for authenticating the image forming apparatus 20. The one-time password is changed every time the server constructor 44 creates the URL information 5000. The one-time password may, for example, be a combination of randomized alphameric characters. The image forming apparatus 20 that specifies the one-time password to connect to the mobile terminal 10 may be authenticated as being the image forming apparatus 20 to which the mobile terminal 10 has transmitted the URL information 5000.

The URL information 5000 may be able to provide information such as the IP address or the port number necessary for the image forming apparatus 20 to perform communications with the server part 44a of the mobile terminal 10. The communications part 35 (both the third communications part 351 and the fourth communications part 352) of the image forming apparatus 20 is configured to create a URL in accordance with specifications of the HTTP communications using the URL information 5000. The communications part 35 of the image forming apparatus 20 may thus be able to perform communications with the server part 44a constructed in the mobile terminal 10. Note that the server constructor 44 of the mobile terminal 10 may transmit a URL itself to the image forming apparatus 20 instead of transmitting the URL information 5000.

The URL is address information for allowing the image forming apparatus 20 to perform communications with the server part 44a. Hence, when the image forming apparatus 20 performs communications with the server part 44a, the mobile terminal 10 may be able to identify that the image forming apparatus 20 performs communications using the URL information 5000.

The URL information 5000 is transmitted from the mobile terminal 10 to the image forming apparatus 20 with respect to each of the network N1 and the network N2 (every time the network is switched). The IP address depends on an IP address fixed to the mobile terminal 10 or an IP address assigned by the DHCP server, and the port number depends on the "port number of the server of the mobile terminal 10" transmitted by the image forming apparatus 20. Thus, no change may be made in the URL information 5000 excluding the one-time password. The URL information 5000 is transmitted every time the network is switched because of the following reasons; switching of the network may change the IP address of the URL information 5000, switching of the network may trigger the image forming apparatus 20 to start communications with the server part 44a, and transmitting the one-word password.

Note that the transmitted URL information 5000 may include a host name instead of the IP address in the IP address part. In such a case, the server constructor 44 may register the host name corresponding to the IP address (URL without the port number) of the mobile terminal 10 in a domain name system (DNS) server.

Function of Server Part 44A

Initially, a server refers to a service providing part (computer or apparatus) that provides own functions, services, data, and the like with respect to other computers. The service providing part may specifically be called a "server" or a "server apparatus". The server part 44*a* of the fourth embodiment may operate as such a server. However, the server part 44*a* includes a function to detect that the image forming apparatus 20 has connected to the mobile terminal 10, and a function to acquire address information of the image forming apparatus 20. The address information of the image forming apparatus 20 indicates information for uniquely identifying the image forming apparatus 20 over the network N1 or the network N2. Specific examples of such information include the URI, URL, host mane, IP address, or the like of the image forming apparatus 20. The following embodiment is illustrated with the IP address as an example.

FIG. 21 is a sequence diagram illustrating examples of functions of the server part 44*a*. FIG. 21 specifically illustrates a process after the URL information 5000 is transmitted to the image forming apparatus 20.

In step S91, the image forming apparatus 20 specifies a URL and transmitting an HTTP communications request or the like to access the mobile terminal 10. This is because the mobile terminal 10 includes the server part 44*a* as described above.

In step S92, the server part 44*a* acquires a password transmitted via the URL, and determines whether the acquired password matches the password included in the URL information 5000.

In step S93, when the two passwords match, the server part 44*a* transmits "communications OK" (status code: 200) to the image forming apparatus 20 via one of the first communications part 151 and the second communications part 152. The communications OK (status code 200) indicates that the communications have been successfully performed (authorized).

In step S94, when the two passwords do not match, the server part 44*a* transmits "communications NG" (status code 401) to the image forming apparatus 20 via one of the first communications part 151 and the second communications part 152. The communications NG (status code 401) indicates that the communications have failed (unauthorized). The status code 401 may be a different status code in the 400s.

In steps S95 to S97, the image forming apparatus 20 repeatedly transmits the HTTP communications request to the server part 44*a* (because it is not clear whether the request in step 91 has arrived when the status is other than the communications OK). The constructed server part 44*a* returns the communications OK only to a first request after the construction of the server part 44*a*, and returns the communications NG to requests received from the second request onward (status code 404) despite the two passwords being matched. The status code 404 indicates that resources corresponding to the request are not detected (not found). Note that other responses in the 400s may be generated with respect to the requests after the second request.

Returning the communications NG with respect to the requests after the second request may prevent the mobile terminal 10 from confusing the image forming apparatus 20 with apparatuses other than the image forming apparatus 20 when the mobile terminal 10 receives requests transmitted from other apparatuses.

In step S111, the server part 44*a* reports to the connectability determination part 13 that the server part 44*a* has received the request from the image forming apparatus 20. The connectability determination part 13 may thus be able to determine that the mobile terminal 10 (the server part 44*a*) has successfully accessed the network N1 or the network N2 (successfully performed communications with the image forming apparatus 20).

In step S1120, the server part 44*a* acquires the IP address of the image forming apparatus 20, and reports the acquired IP address to the job controller 42. The IP address of the image forming apparatus 20 is included in an IP header transmitted or received in a TCP/IP layer. The IP address of the image forming apparatus 20 may thus be acquired when one of the first communications part 151 and the 152 receives the request.

The mobile terminal 10 may be able to determine the connectability, to acquire the IP address, and the like without acquiring the IP address of the image forming apparatus 20 from the image forming apparatus 20 via BLE, as described above.

Details of Process

The following illustrates details of the process of the print system 1.

Overall Operations

The following describes a print process of a the print system according to the fourth embodiment with reference to FIG. 22. FIG. 22 is a sequence diagram illustrating an example of the print process according to the fourth embodiment.

In step S1, a user operates a screen displayed by the UI display part 14 of the mobile terminal 10 to give an instruction to execute printing. The operations receiver 11 of the mobile terminal 10 receives a print execution operation. The user selects desired print-target data from the applications installed on the mobile terminal 10, and gives an instruction to execute printing. This generates a print job including the print-target data selected by the user. In such a case, the display device 102 of the mobile terminal 10 displays the print condition screen 901 of FIG. 11A.

In step S2, the user moves his or her mobile terminal 10 close to the near field wireless communications device 217 of the image forming apparatus 20 by following the instruction presented on the screen. The BLE allows apparatuses to mutually communicate with one another within a distance range of several meters. Note that the mobile terminal 10 is configured to detect that the user intentionally moves the mobile terminal 10 close to a position within a predetermined distance from a particular image forming apparatus 20 because two or more image forming apparatus 20 may be placed within a close range. More specifically, the near field communications part 41 detects that the mobile terminal 10 has moved close to a position within a distance shorter than 10 to 50 cm from the image forming apparatus 20. The predetermined distance may be set by the user.

The following illustrates detection of a distance. The image forming apparatus 20 transmits advertisement packets within a BLE communications allowable range (several meters). The advertisement packets include an output of the near field wireless communications device 217. The near field wireless communications device 109 is configured to detect radio field intensity upon receiving the radio waves of BLE. The near field communications part 41 of the mobile terminal 10 is configured to convert the difference between the output and the radio field intensity, or the ratio of the output and the radio field intensity into a distance, based on a predetermined conversion formula or a conversion table. The near field communications part 41 of the mobile terminal 10 may thus be able to detect a distance between the own mobile terminal 10 and the image forming apparatus 20.

Note that the near field communications part 41 may start communicating with the image forming apparatus 20 without determining whether the mobile terminal 10 resides within the predetermined distance.

In step S2.1, the near field communications part 41 of the mobile terminal 10 starts receiving radio waves by being moved close to a position within a distance range of several meters from the image forming apparatus 20, and repeatedly detects the distance from the image forming apparatus 20 until the mobile terminal 10 approaches a position within the predetermined distance from the image forming apparatus 20.

In step S2.2, when he near field communications part 41 of the mobile terminal 10 determines that the mobile terminal 10 has approached a position within the predetermined distance from the image forming apparatus 20, the near field communications part 41 starts communicating with the image forming apparatus 20 (declare starting communications). The near field communications part 41 of the mobile terminal 10 has thus connected to the BLE network.

In step S2.3, the near field communications part 41 of the mobile terminal 10 requests the image forming apparatus 20 to provide the second communications information 1300 via the BLE network. More specifically, the near field communications part 41 requests the image forming apparatus 20 to provide the second communications information 1300 by specifying a characteristic for requesting second communications information 1300. The near field communications part 36 of the image forming apparatus 20 acquires the request of the second communications information 1300, reads the second communications information 1300 from the communications information DB 31, and transmits the read second communications information 1300 to the mobile terminal 10. The near field communications part 41 of the mobile terminal 10 transmits the second communications information 1300 to the server constructor 44.

Subsequent steps S2.4 to S5.1 are repeatedly executed in each of the determinations as to whether the mobile terminal 10 is connected to the network N1, and whether the mobile terminal 10 is connected to the network N2 (these steps are repeated for the number of networks). However, when the mobile terminal 10 is determined to be connected to the network N1, determination as to whether the mobile terminal 10 is connected to the network N2 will not be performed.

In step S2.4, the network switcher 43 switches the network connected to the mobile terminal 10 from the network N1 (or from another network connected to the mobile terminal 10) to the network N2. The above process is performed when the near field communications part 41 has determined that the mobile terminal 10 is not connected to the network N1. Details will be described later.

In step S2.5, when the mobile terminal 10 has connected to the BLE network, the server constructor 44 of the mobile terminal 10 constructs the server part 44a. The server constructor 44 also creates the URL information 5000 based on the second communications information 1300 acquired from the image forming apparatus 20. The IP address of the mobile terminal 10 is already known, the port number is stated in the second communications information 1300, and one-time password may be created at random.

In step S2.6, the near field communications part 41 of the mobile terminal 10 transmits the URL information 5000, the employee ID, and password to the image forming apparatus 20 via the BLE network. More specifically, the near field communications part 41 transmits the URL information 5000, the employee ID, and the password by specifying a characteristic for transmitting the URL information 5000, the employee ID, and the password to store the URL information 5000, the employee ID, and the password. The transmission of the employee ID and password corresponds to the authentication request in the first embodiment.

Note that the near field communications part 41 preferably encrypts the URL information 5000, the employee ID, and the password. The fixed values set in advance in the programs 108a of the mobile terminal 10 and the programs 215a of the image forming apparatus 20 may be use for encrypting the URL information 5000, the employee ID, and the password. Alternatively, the above fixed values may be exchanged in step S2.2 to start BLE communications.

Note that when the near field communications part 36 of the image forming apparatus 20 detects a non-existing characteristic (a characteristic not on a list of the above data) in the image forming apparatus 20, an error is detected, and subsequent steps will not be performed.

When the mobile terminal 10 transmits the URL information 5000, the employee ID, and the password, the display device 102 of the mobile terminal 10 displays the connection progress screen 911 illustrated in FIG. 11B.

In step S2.6.1, the near field communications part 36 of the image forming apparatus 20 transmits the employee ID and password to the authentication processor 27.

In step S2.6.2, the near field communications part 36 of the image forming apparatus 20 transmits URL information to the communications part 35.

In step S2.6.1.1, the authentication processor 27 of the image forming apparatus 20 searches the authentication DB 29 by the authentication information (the employee ID and password) to determine whether the authentication DB 29 includes (registers) the same employee ID and password combination. The authentication processor 27 generates an authentication result (OK or NG) based on the search (detected) result. This step S2.6.1.1 may be the same as step S5 of FIG. 7 in the first embodiment.

In step S2.6.1.2, the authentication processor 27 sends the authentication result (OK or NG) to the communications information providing part 28.

In step S2.6.1.3, the communications information providing part 28 reads the communications information 1000 from the communications information DB 31 based on the authentication result (OK or NG). The method of determining the communications information 1000 to be read is similar to that illustrated in FIG. 8; however, the second communications information 1300 (not including the IP address) of the communications information 1000 is already transmitted in step S2.3. The practical information of the first communications information 1100 is an IP address. The IP address is read in step S2.6.1.3 based on the authentication result (OK or NG).

In step S2.6.1.4, the communications information providing part 28 sends the communications information 1000 to the communications part 35.

In step S2.6.2.1, the communications part 35 of the image forming apparatus 20 creates a URL illustrated in FIG. 20 based on the URL information 5000.

The communications part 35 of the image forming apparatus 20 attempts to perform communications with the server part 44a of the mobile terminal 10 via the network N1 by the acquisition of the URL information 5000 as a trigger. Note that it is assumed that the third communications part 351 of the image forming apparatus 20 has already been connected to the network N1. It is also assumed that the fourth communications part 352 of the image forming apparatus 20 has already been connected to the network N2 or the fourth communications part 352 will not have any interference with connecting to the network.

The communications part 35 determines to use one or both of the third communications part 351 and the fourth communications part 352 according to the communications information (IP address) (or may be described as "according to the authentication result") acquired by the communications information providing part 28. The following illustrates the example more specifically.

The authentication "OK" and the accessibility information 1200 "YES"

The third communications part 351 connected to the network N1, and the fourth communications part 352 connected to the network N2 sequentially perform communications with the mobile terminal 10. The third communications part 351 sets the IP address of the first communications information 1100 to be connected to the network N1, and the fourth communications part 352 sets the IP address of the second communications information 1300 to be connected to the network N2. Sequentially performing communications indicates that the third communications part 351 performs communications with the mobile terminal 10 at a first transmission of URL information, and the fourth communications part 352 performs communications with the mobile terminal 10 at a second transmission of the URL information.

The authentication "OK" and the accessibility information 1200 "NO"

Only the third communications part 351 having setting of the IP address of the first communications information 1100 and being connected to the network N1 perform communications with the mobile terminal 10. In this case, even if the fourth communications part 352 receives the URL information at the second transmission, the fourth communications part 352 will not perform communications with the mobile terminal 10.

The authentication "NG" and the accessibility information 1200 "YES"

Only the fourth communications part 352 having setting of the IP address of the second communications information 1300 and being connected to the network N2 performs communications with the mobile terminal 10. In this case, even if the third communications part 351 receives the URL information at the first transmission, the third communications part 351 will not perform communications with the mobile terminal 10.

The authentication "NG" and the accessibility information 1200 "NO"

The image forming apparatus 20 does not perform communications with the mobile terminal 10 via the network N1 or the network N2.

The IP address to be reported to the mobile terminal 10 may thus be controlled by selecting one of the network N1 and network N2 used by the image forming apparatus 20 based on the authentication result.

In step S3, the connectability determination part 13 of the mobile terminal 10 is, after the near field communications part 41 transmits the URL information 5000, in a standby mode to be ready to receive a HTTP communications request from the image forming apparatus 20 to the server part 44a. The connectability determination part 13 of the mobile terminal 10 may be in a standby mode for a few seconds, but the duration of the standby mode is not limited to a few seconds. The duration may preferably be sufficiently long enough for the user to perform settings from the screen. The third communications part 351 of the image forming apparatus 20 transmits the HTTP communications request by specifying the IP address of the server part 44a and the port number via a URL. The request includes one-time password Various methods may serve as the HTTP communications request; examples of such methods include POST and GET. Any methods may be used in this embodiment. This is because the HTTP communications request is used by the image forming apparatus 20 to report the IP address of the image forming apparatus 20 to the mobile terminal 10. Note that IP protocol may be used for reporting the IP address, and the communications protocol superior to the IP protocol is not limited to the HTTP communications. Examples of the communications protocols superior to the IP protocol may include HTTPSs, HTTP/2, a file transfer protocol (FTP), and the like. Further, the embodiment may employ UDP instead of TCP.

When the third communications part 351 of the image forming apparatus 20 transmits the HTTP communications request, the first communications part 151 of the mobile terminal 10 receives the request, and report the request to the server part 44a. When the one-time passwords match, the server part 44a returns a response of the status code 200 to a first request received since the URL information 5000 has been transmitted, and returns a response of the status code 404 to a second request onward. When the status code is not 200, whether the mobile terminal 10 has received the request is unclear. Hence, transmission of the request in step S5 repeatedly performed.

In step S3.1, the server part 44a of the mobile terminal 10 receives the request, and transmits a request receipt report that the server part 44a has received the request to the connectability determination part 13. This allows the connectability determination part 13 to determine that the mobile terminal 10 has connected to the network N1. This also allows the mobile terminal 10 to acquire the IP address of the image forming apparatus 20 (the IP address of the first communications information 1100 of the network N1).

In step S4, the server constructor 44 deletes the server part 44a. This is because the mobile terminal 10 has acquired the IP address of the image forming apparatus 20, and the server part 44a is no longer necessary.

In step S5, the near field communications part 41 of the mobile terminal 10 transmits a request end report to the image forming apparatus 20. This is because the mobile terminal 10 has acquired the IP address of the image forming apparatus 20, and transmission of the request from the image forming apparatus 20 is no longer necessary. More specifically, the near field communications part 41 writes a predetermined value (zero) in a characteristic for reporting an end of the request (transmitting the request end report).

In step S5.1, the near field communications part 36 of the image forming apparatus 20 acquires the request end report to allow the third communications part 351 to terminate transmission of the request.

When the mobile terminal 10 fails to receive the request in step S3, the mobile terminal 10 currently connected to the network N1 executes step S2.4 to switch the network N1 into the network N2, and subsequently executes steps S2.5 to S5.1. The second URL information 5000 is thus transmitted to the image forming apparatus 20 (the URS transmitted for the second time). Note that transmission of the employee ID and password in step S2.6 may be unnecessary in a loop of transmitting the URL information 5000 from the second time onward.

In step S6, the near field communications part 41 of the mobile terminal 10 ends the BLE communications (declare the end of communications). The mobile terminal 10 does not connect to the BLE thereafter.

Subsequent steps include a process of transmitting a job execution request from the mobile terminal 10 to the image forming apparatus 20.

In step S7, since the mobile terminal 10 has acquired the IP address of the image forming apparatus 20 connected to the network N1 or the network N2, the first communications part 151 or the second communications part 152 of the mobile terminal 10 transmits a print jo request to the image forming apparatus 20 via the network N1 or the network N2. The mobile terminal 10 may thus be able to perform communications with the image forming apparatus 20 with the communications protocol such as an HTTP.

Upon execution of step S7, a screen illustrated in FIG. 12A is displayed. When the mobile terminal 10 fails to connect either of the network N1 and the network N2, the UI display part 14 of the mobile terminal 10 displays a screen illustrated in FIG. 12B.

In step S7.1, the third communications part 351 or the fourth communications part 352 of the image forming apparatus 20 receives a print job request via the network N1 or the network N2, and reports to the print job to the print function part 21.

In step S7.1.1, the print function part 21 of the image forming apparatus 20 executes the print job. When ending the execution of the print job, the print function part 21 transmits a print job completion report to the third communications part 351. The third communications part 351 transmits the print job completion report to the mobile terminal 10. Note that the image forming apparatus 20 may transmit the print job completion report to the mobile terminal 10 using the URL information 5000 (in this case, the server part 44a will be deleted after the completion of the job execution), or the image forming apparatus 20 may transmit the completion report as a response to the HTTP communications in step S7.

The mobile terminal 10 may thus transmit the URL information 5000 to the image forming apparatus 20, and acquire the IP address report from the image forming apparatus 20 as described above. The print system 1 may be able to execute the print job.

Determination of Connectability

FIG. 23 is a flowchart illustrating a detailed process of determining whether the mobile terminal 10 has been successfully connected to a network N1 or N2. The process of FIG. 23 is performed subsequently to step S2.5 of FIG. 22. The process of FIG. 23 includes determination on connecting to the network N1 and determination on connecting to the network N2.

The mobile terminal 10 constructs the server constructor server part 44a for allowing the image forming apparatus 20 to perform communications with the mobile terminal 10 via the network N1 (step S910). The mobile terminal 10 transmits the URL information 5000, the employee ID, and the password to the image forming apparatus 20.

When the mobile terminal 10 transmits the URL information 5000, the connectability determination part 13 determines whether the HTTP communications request has been received from the image forming apparatus 20 (step S920). The following describes use cases based on the following assumptions; the third communications part 351 of the image forming apparatus 20 is connected to the network N1, and the fourth communications part 352 of the image forming apparatus 20 is connected to the network N2. Note that the accessibility information 1200 is assumed to be "YES".

Use Case 1

The mobile terminal 10 of the visitor 9 may be connected or not be connected to any of the networks (other than network N1, network N2, and BLE). The visitor 9 will not be authorized (the authentication of the visitor 9 will fail); the third communications part 351 of the image forming apparatus 20 hence transmits no request in accordance with the authentication result. The first communications part 151 of the mobile terminal 10 receives no request. In the use case 1, it is determined that a request is not acquired in step S920.

Use Case 2

The mobile terminal 10 of the employee 8 is assumed to be connected to the company's internal LAN (network N1). The employee 8 will be authorized (the authentication of the employee 8 will succeed). Hence, the third communications part 351 of the image forming apparatus 20 may frequently be able to perform communications with the server part 44a of the mobile terminal 10 via a URL generated based on the URL information 5000. However, the following cases may be expected even if the mobile terminal 10 is connected to the network N1.

There may be a case where an apparatus has an IP address the same as the IP address of the URL of the URL information 5000. The apparatus here may be the image forming apparatus 20 or not be the image forming apparatus 20. In this case, communications may be unstable if the network N1 performs communications with the mobile terminal 10. However, this will case little inconvenience; the IP address of the image forming apparatus 20 may be acquired when the mobile terminal 10 has received the request even just for once. A case where the image forming apparatus 20 fails to perform any communications with the mobile terminal 10 may be handled similar to the user case 1.

Further, when the mobile terminal 10 of the employee 8 is not connected to the company's internal LAN, the image forming apparatus 20 is unable to perform communications with the image forming apparatus 20. This case is also handled similar to the user case 1.

As descried above, when the mobile terminal 10 of the employee 8 in the user case 2 is connected to the company's internal LAN, the determination "YES" is frequently made in step S920.

In step S920, when the image forming apparatus 20 is able to transmit a request to the mobile terminal 10 via the network N1, the IP address of the image forming apparatus 20 on the network N1 is acquired. Hence, the connectability determination part 13 of the mobile terminal 10 determines that the mobile terminal 10 performs communications with the image forming apparatus 20 via the network N1 (step S980).

When the determination in step S920 is "NO", the network switcher 43 determines whether other wireless communications parameters from the image forming apparatus 20 is stored (step S930). Other wireless communications parameters indicate the wireless communications parameters corresponding to which the connectability determination part 13 has not determined whether the request has been received. Examples of such wireless communications parameters include wireless communications parameters other than first communications information 1100 (the second communications information 1300 in this embodiment).

When the determination in step S930 is "NO", step S970 is processed. In this case, the request is not transmitted from the image forming apparatus 20, and there are no wireless communications parameters. The connectability determination part 13 thus determines that the mobile terminal 10 is unable to perform communications with the image forming apparatus 20 (step S970). In such a case, the display device 102 of the mobile terminal 10 displays a communications failure screen 931 as illustrated in FIG. 12B.

When the determination in step S930 is "YES", the image forming apparatus 20 performs the following processes (step S940).

(i) Network switching
(ii) Construction of server part 44a
(iii) Transmission of URL information 5000

The connectability determination part 13 determines whether the HTTP communications request has been received from the image forming apparatus 20 (step S950) in a manner similar to step S920. The following describes use cases based on the following assumptions; the third communications part 351 of the image forming apparatus 20 is connected to the network N1, and the fourth communications part 352 of the image forming apparatus 20 is connected to the network N2. Note that the accessibility information 1200 is assumed to be "YES".

Use Case 1

The mobile terminal 10 of the visitor 9 is connected to the network N2. The fourth communications part 352 of the image forming apparatus 20 performs communications with the mobile terminal 10 via a URL generated based on the URL information 5000 (transmitting a HTTP communications request).

The network N2 is P2P communications; the presence of the apparatus having the IP address the same as the IP address of the mobile terminal 10 needs not to be considered.

Use Case 2

When the mobile terminal 10 of the employee 8 is not connected to the company's internal LAN (the network N1), the mobile terminal 10 of the employee 8 is also connected to the network N. The fourth communications part 352 of the image forming apparatus 20 performs communications with the mobile terminal 10 via a URL generated based on the URL information 5000 (transmitting a HTTP communications request).

When the determination in step S950 is "NO", the connectability determination part 13 determines that the mobile terminal 10 is unable to perform communications with the image forming apparatus 20 (step S970). Note that failing to receive the request despite the process in step S940 being successful may result from some kind of defect of the image forming apparatus 20 or congested radio waves.

When the determination in step S950 is "YES", the IP address of the image forming apparatus 20 on the network N2 is acquired. Hence, the connectability determination part 13 of the mobile terminal 10 determines that the mobile terminal 10 performs communications with the image forming apparatus 20 via the network N2 (step S960).

In steps S960 and 970, the display device 102 of the mobile terminal 10 displays the transmission complete screen 921 of FIG. 12A. Specifically, since the display device 102 of the mobile terminal 10 displays the same transmission complete screen 921 regardless of the print job being transmitted via any of the network N1 and the network N2, the user does not need to recognize the difference between the networks being used. Note that the mobile terminal 10 may display on the display device 102 one of the network N1 or the network N2 via the print job is transmitted. The user serving as the employee 8 may thus be able to check whether the print job is transmitted via the company's internal LAN having the high security level. Further, the user serving as the visitor may be able to recognize that the own print job is transmitted via the P2P network.

The print system 1 of the fourth embodiment enables, as illustrated above, the mobile terminals 10 of the users to automatically select appropriate networks as well as reducing burdens on the users to set the first communications information 1100 and the second communications information 1300 in the mobile terminals 10 with respect to the image forming apparatuses 20 that are connected to the two or more networks.

Other Embodiments

The preferred embodiments and examples are described above; however, the present invention is not limited to those embodiments and examples. Various alteration and modification may be made within the scope without departing from the gist of the present invention.

Note that the network N1 is an example of a first network, and the network N2 is an example of a second network. The NFC reader-writer 213 is an example of a storage. The information reader 33 is an example of an identification information receiver. The communications information providing part 28 is an example of a determination unit. The information writer 32 is an example of a communications information transmitter. The transmitter-receiver 24 is an example of a request receiver. The authentication processor 27 is an example of an authentication unit. The information acquisition part 12 is an example of a receiver. The authentication information storage 18 is an example of an authentication information storage. The connectability determination part 13 is an example of a communications capability determination unit. The communications part 15 is an example of a communications unit. The process of the image forming apparatus 20 illustrate in the above embodiments is an example of a communications method.

According to the above-described embodiments, there is provided a communications system that enables an apparatus capable of receiving process requests from terminals via two or more networks to transmit communications information based on different users using their terminals when the apparatus transmits the communications information to the terminals for accessing the apparatus, which substantially obviates one or more problems caused by the limitations and disadvantages of the related art.

REFERENCE SIGNS LIST 1 print system
10 mobile terminal
11 operations receiver
12 information acquisition part
13 connectability determination part
15 communications part
16 information storage
17 information transmitter
18 authentication information storage
20 image forming apparatus
21 print function part
22 image projection apparatus
23 image projector
80 authentication server The present application is based on and claims the benefit of priority of Japanese Priority Application No. 2015-035826 filed on Feb. 25, 2015, and Japanese Priority Application No. 2016-015931 filed on Jan. 29, 2016, the entire contents of which are hereby incorporated herein by reference.

The invention claimed is:

1. An information processing apparatus configured to receive a process request from a terminal via two or more networks, the information processing apparatus comprising:
   a memory configured to store communications information including first communications information for connecting to the information processing apparatus via a first network and second communications information for connecting to the information processing apparatus via a second network differing from the first network; and
   a processor that is coupled to the memory and that is configured to
   receive identification information from the terminal, the identification information identifying a user of the terminal;
   determine one of the first network and the second network based on the identification information to receive the process request from the terminal;
   transmit one of the first and the second communications information for connecting to the information processing apparatus stored in the memory via the determined one of the first and the second networks;
   accept connection via the determined one of the first and second networks based on the transmitted communications information from the terminal to receive the process request via the accepted one of the first and second networks;
   perform authentication based on the received identification information;
   determine to receive the process request from the terminal via the first network when the authentication has succeeded; and
   determine to receive the process request from the terminal via the second network when the authentication has not succeeded,
   wherein the processor transmits the first communications information that is predetermined communications information to the terminal when the authentication has succeeded, and the processor transmits the second communications information to the terminal when the authentication has not succeeded.

2. The information processing apparatus according to claim 1, wherein
   the processor transmits the first communications information and the second communications information to the terminal when the processor determines to receive the process request from the terminal via the first network.

3. The information processing apparatus according to claim 1, wherein
   the processor transmits the first communications information and the second communications information that is differing from the first communications information to the terminal when the authentication has succeeded, and the processor transmits the second communications information to the terminal when the authentication has failed.

4. The information processing apparatus according to claim 3, wherein
   the first communications information is configured to enable wireless communications when the terminal is connected to the network in which the information processing apparatus is present, and
   the second communications information is configured to enable wireless communications when the terminal is connected or is not connected to the network in which the information processing apparatus is present.

5. The information processing apparatus according to claim 4, wherein
   the communications information includes priority settings for respective pieces of the communications information, and wherein the first communications information includes the priority being a predetermined level or higher, and the second communications information includes the priority being lower than the predetermined level.

6. The information processing apparatus according to claim 3, wherein
   the processor refers to accessibility information attached to the communications information and acquires one or more pieces of the communications information having the accessibility information indicating the communications information being accessible.

7. The information processing apparatus according to claim 1, wherein
   when the terminal has no identification information, the identification information receiver acquires from the terminal information indicating that the terminal has no identification information, and the processor determines that the authentication fails.

8. The information processing apparatus according to claim 1, wherein
   the processor performs authentication by comparing the identification information acquired from the terminal with authentication information stored in the memory.

9. The information processing apparatus according to claim 1, wherein
   the processor transmits the identification information acquired from the terminal to an external authentication apparatus, and receives an authentication result from the external authentication apparatus.

10. The information processing apparatus according to claim 1, wherein
    the identification information receiver acquires the identification information from an NFC chip included in the terminal via near field wireless communications, and
    the processor transmits the communications information to the NFC chip via the near field wireless communications.

11. The information processing apparatus according to claim 1,
    wherein the process request is a print job, and
    wherein the identification information includes an ID and a password for identifying the user of the terminal.

12. The information processing apparatus according to claim 1, wherein the second network does not intrude into the first network.

13. The information processing apparatus according to claim 12, wherein the first network is a company's internal local area network and the second network is a network directly connecting the terminal to the information processing apparatus with Wi-Fi Direct.

14. A communications system comprising:
    an information processing apparatus; and a terminal, wherein the information processing apparatus includes
    a memory configured to store communications information including first communications information for connecting to the information processing apparatus via a first network and second communications information for connecting to the information processing apparatus via a second network; and
    a first processor that is coupled to the memory and that is configured to receive identification information from the terminal, the identification information identifying a user of the terminal;
determine one of the first network and the second network based on the identification information to receive a process request from the terminal;
transmit one of the first and the second communications information for connecting to the information processing apparatus stored in the memory via the determined one of the first and the second networks; and
accept connection from the terminal via the determined one of the first and second networks based on the corresponding one of the first and the second communications information to receive the process request via the accepted one of the first and second networks, and wherein the terminal includes a second processor that is configured to
receive one or more pieces of the communications information from the information processing apparatus;
attempt to have wireless connection with the information processing apparatus based on a corresponding one of the pieces of the communications information; and
perform wireless communications with the information processing apparatus based on the determined pieces of the communications information with which the second processor determines to enable the wireless connection with the information processing apparatus,
wherein authentication is performed based on the identification information,
wherein the first processor determines to receive the process request from the terminal via the first network when the authentication has succeeded,
wherein the first processor determines to receive the process request from the terminal via the second network when the authentication has not succeeded, and
wherein the first processor transmits the first communications information that is predetermined communications information to the terminal when the authentication has succeeded, and the first processor transmits the second communications information to the terminal when the authentication has not succeeded.

15. A communications method performed by an information processing apparatus, the information processing apparatus being configured to receive a process request from a terminal via two or more networks, the method comprising:
receiving identification information from the terminal, the identification information identifying a user of the terminal;
determining one of the first network and the second network based on the identification information to receive the process request from the terminal;
reading communications information for connecting the information processing apparatus via the determined one of the first and the second networks from a memory to transmit the read communications information to the terminal, the memory being configured to store the communications information including first communications information for connecting to the information processing apparatus via the first network and second communications information for connecting to the information processing apparatus via the second network differing from the first network;
accepting connection via one of the first and second networks based on the transmitted communications information from the terminal to receive the process request via the accepted one of the first and second networks
performing authentication based on the received identification information;
determining to receive the process request from the terminal via the first network when the authentication has succeeded; and
determining to receive the process request from the terminal via the second network when the authentication has not succeeded,
transmitting the first communications information that is predetermined communications information to the terminal when the authentication has succeeded; and
transmitting the second communications information to the terminal when the authentication has not succeeded.

* * * * *